(12) United States Patent
Kobayashi et al.

(10) Patent No.: US 9,390,030 B2
(45) Date of Patent: Jul. 12, 2016

(54) INFORMATION PROCESSING DEVICE, INFORMATION STORAGE DEVICE, INFORMATION PROCESSING SYSTEM, INFORMATION PROCESSING METHOD, AND PROGRAM

(71) Applicant: SONY CORPORATION, Minato-Ku (JP)

(72) Inventors: Yoshiyuki Kobayashi, Tokyo (JP); Hiroshi Kuno, Kanagawa (JP); Takamichi Hayashi, Tokyo (JP)

(73) Assignee: SONY CORPORATION, Minato-Ku, Tokyo (JP)

( * ) Notice: Subject to any disclaimer, the term of this patent is extended or adjusted under 35 U.S.C. 154(b) by 89 days.

(21) Appl. No.: 14/345,543

(22) PCT Filed: Oct. 19, 2012

(86) PCT No.: PCT/JP2012/077066
§ 371 (c)(1),
(2) Date: Mar. 18, 2014

(87) PCT Pub. No.: WO2013/073335
PCT Pub. Date: May 23, 2013

(65) Prior Publication Data
US 2014/0380063 A1   Dec. 25, 2014

(30) Foreign Application Priority Data

Nov. 17, 2011   (JP) .................. 2011-251734

(51) Int. Cl.
G06F 12/14 (2006.01)
H04L 9/32 (2006.01)
G06F 21/10 (2013.01)

(52) U.S. Cl.
CPC ............ *G06F 12/1408* (2013.01); *G06F 21/10* (2013.01); *H04L 9/3236* (2013.01); *H04L 9/3247* (2013.01); *H04L 9/3263* (2013.01); *G06F 12/14* (2013.01)

(58) Field of Classification Search
CPC . G06F 12/14; G06F 12/1408; G06F 12/1466; G06F 12/16; G06F 21/10; H04L 9/3247; H04L 9/3263; H04L 12/40104
See application file for complete search history.

(56) References Cited

U.S. PATENT DOCUMENTS 6,002,772 A * 12/1999 Saito .................. G06F 21/10
                                                              348/E7.056
8,831,228 B1 * 9/2014 Agrawal ............... H04L 9/0822
                                                              380/277

(Continued)

FOREIGN PATENT DOCUMENTS

JP   2005-20703   1/2005
JP   2007-124055  5/2007

(Continued)

OTHER PUBLICATIONS

International Search Report issued Nov. 20, 2012 in PCT/JP2012/077066.

Primary Examiner — Krisna Lim
(74) Attorney, Agent, or Firm — Chip Law Group

(57) ABSTRACT

Provided is an information storage device including a storage unit configured to store encrypted content and an encryption key to be applied to decryption of the encrypted content, wherein the storage unit stores a converted encryption key generated through an arithmetic operation of the encryption key and an electronic signature that is constituent data of an encrypted content signature file set corresponding to the encrypted content, wherein the electronic signature is an electronic signature for data that includes constituent data of the encrypted content and the encryption key, and wherein a reproduction device configured to read the encrypted content from the storage unit and execute a decryption process is able to be caused to perform acquisition of the encryption key through an arithmetic operation of applying the electronic signature to the converted encryption key.

16 Claims, 35 Drawing Sheets

(56) References Cited

U.S. PATENT DOCUMENTS

| | | | |
|---|---|---|---|
| 9,100,525 B2* | 8/2015 | Kobayashi | H04N 1/00838 |
| 2004/0243814 A1 | 12/2004 | Nakano et al. | |
| 2007/0061569 A1* | 3/2007 | Lee | H04L 9/0833 713/163 |
| 2007/0186110 A1* | 8/2007 | Takashima | H04L 9/0836 713/173 |
| 2007/0219915 A1* | 9/2007 | Hatano | H04L 9/0825 705/57 |
| 2008/0022110 A1* | 1/2008 | Hung | H04L 63/126 713/176 |
| 2008/0063199 A1 | 3/2008 | Kimura et al. | |
| 2009/0003608 A1* | 1/2009 | Lee | G06F 21/10 380/277 |
| 2009/0161869 A1* | 6/2009 | Chow | H04N 7/1675 380/259 |
| 2010/0058047 A1* | 3/2010 | Medvinsky | H04L 9/321 713/2 |
| 2010/0202606 A1* | 8/2010 | Almeida | H04L 9/0863 380/28 |
| 2011/0016311 A1 | 1/2011 | Durand et al. | |
| 2012/0102329 A1* | 4/2012 | Mittal | G06F 21/10 713/176 |
| 2012/0303968 A1* | 11/2012 | Balinsky | H04L 9/14 713/189 |
| 2013/0054971 A1* | 2/2013 | Yamaguchi | H04L 9/083 713/171 |
| 2015/0229479 A1* | 8/2015 | Cho | H04L 9/3247 713/156 |

FOREIGN PATENT DOCUMENTS

| | | |
|---|---|---|
| JP | 2007-299475 | 11/2007 |
| WO | WO 2009/124715 A1 | 10/2009 |

* cited by examiner

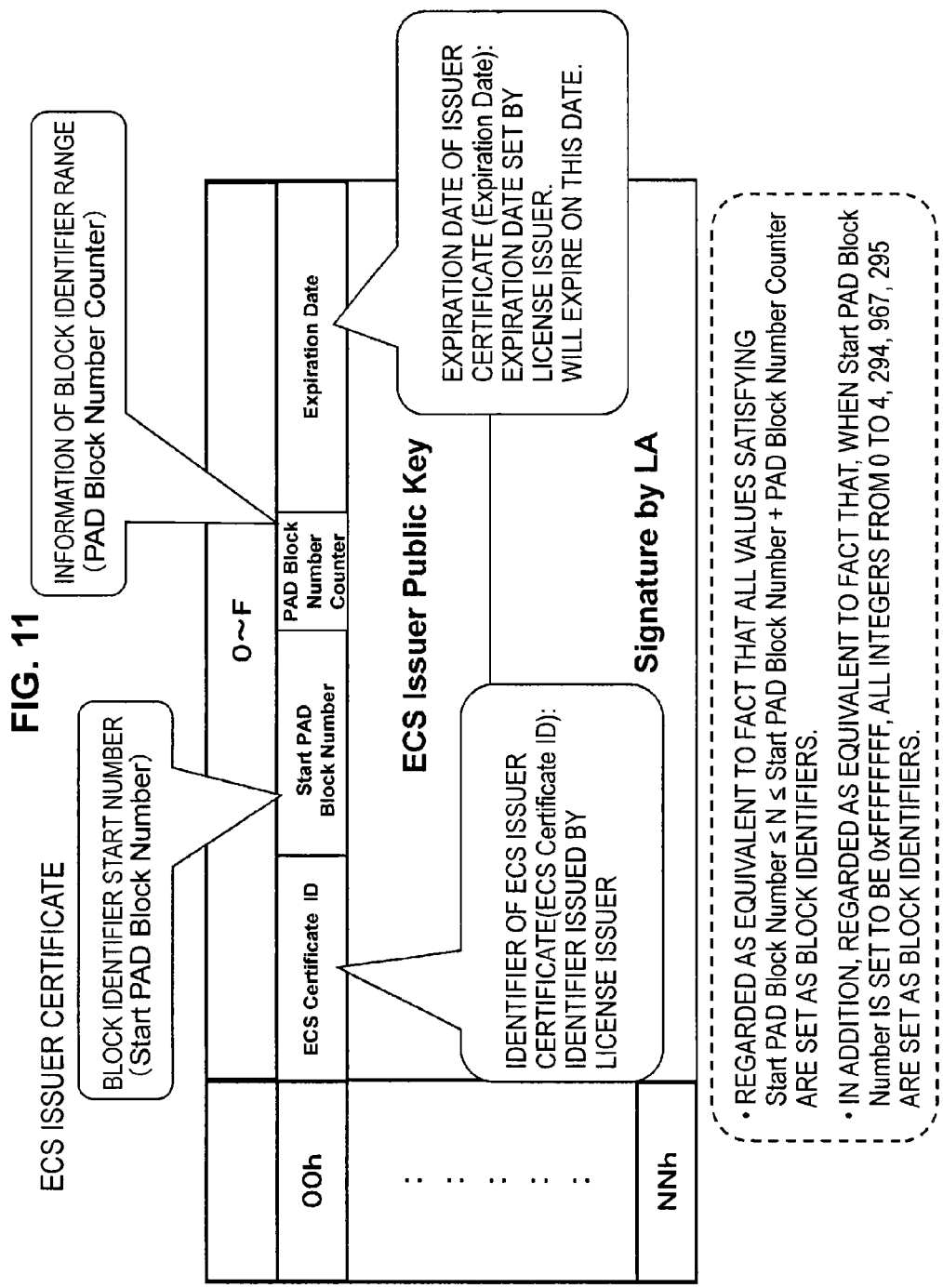

FIG. 12

ECS ISSUER CERTIFICATE (PUBLIC KEY) REVOCATION LIST
(ECS Issuer Key Revocation List)

| VERSION (Version) ||
|---|---|
| NUMBER OF ENTRIES (Number of entries) ||
| REVOKED ECS ISSUER CERTIFICATE IDENTIFIER #1 (Revoked ECS Issuer Certificate ID #1) | DATE OF REVOCATION #1 (Revoked Date #1) |
| ... ||
| REVOKED ECS ISSUER CERTIFICATE IDENTIFIER #N (Revoked ECS Issuer Certificate ID #N) | DATE OF REVOCATION #N (Revoked Date #N) |
| LA SIGNATURE (Signature by LA) ||

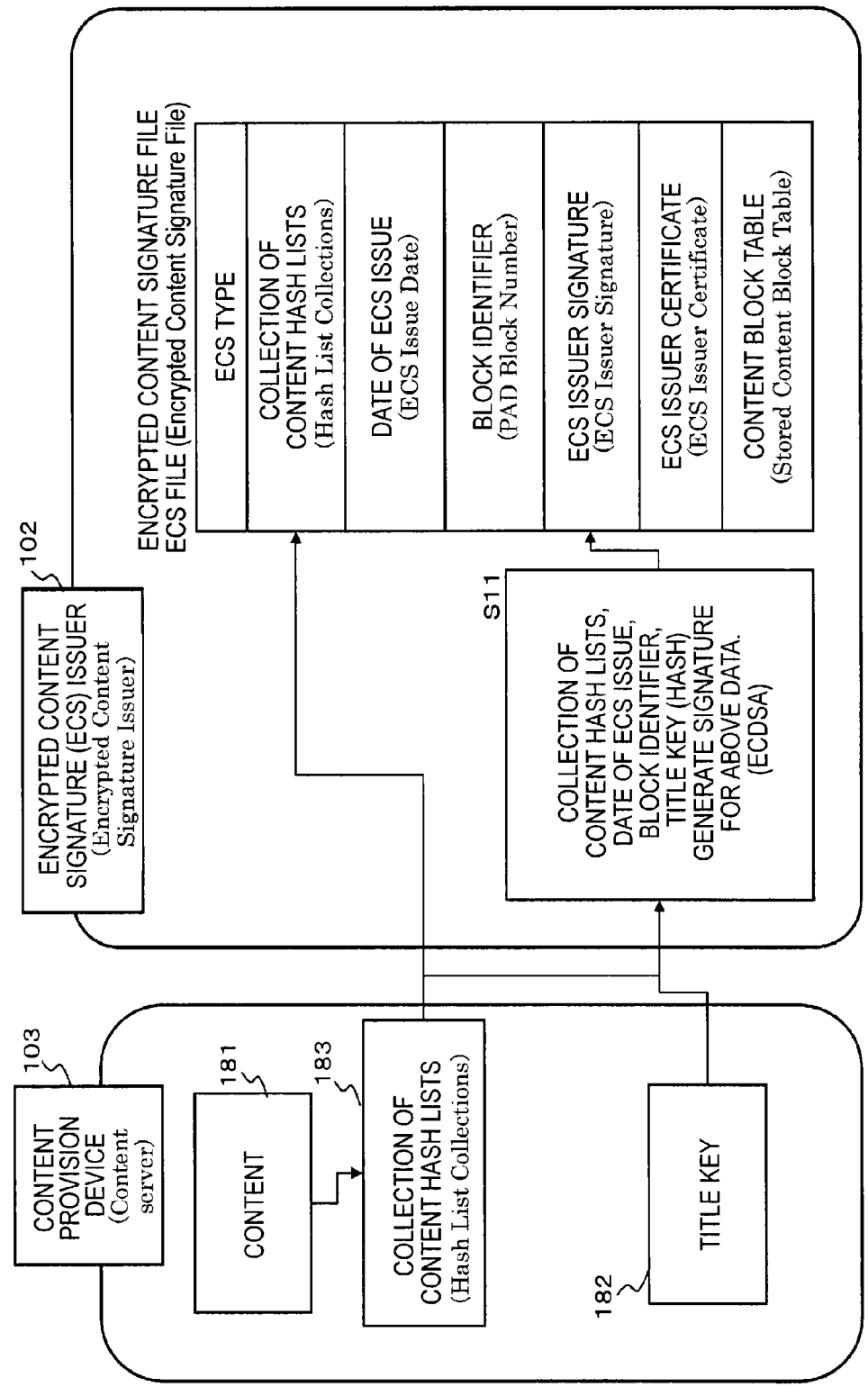

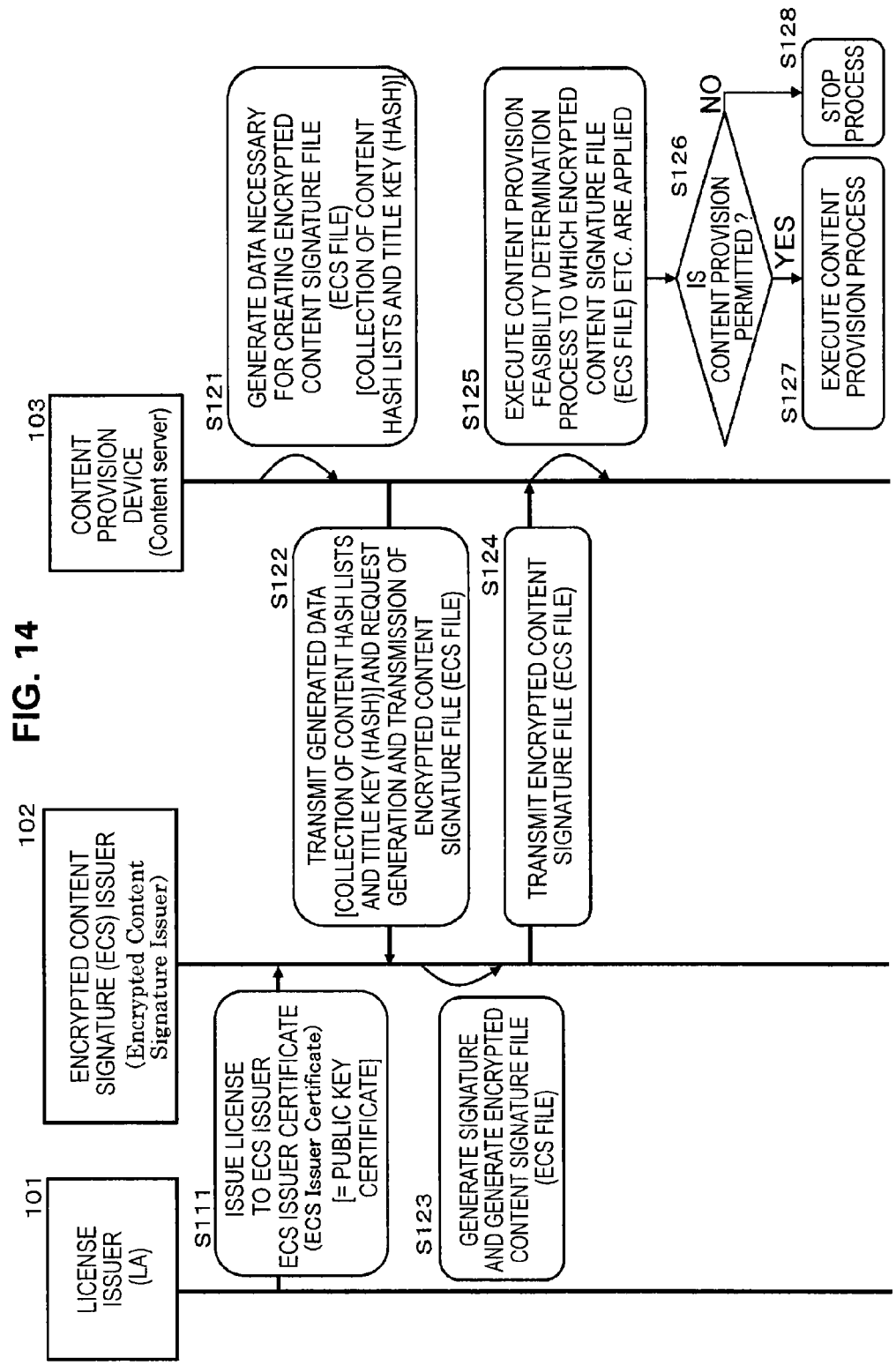

FIG. 21

| | PROTECTED AREA (Protected Area) | | GENERAL-PURPOSE AREA (General Purpose Area) |
|---|---|---|---|
| | BLOCK #0 | BLOCK #1 | |
| SERVER A | Kt(a1)⊕(UR(a1)\|\|ECSSig(a1))hash<br>Kt(a2)⊕(UR(a2)\|\|ECSSig(a2))hash<br>Kt(a3)⊕(UR(a3)\|\|ECSSig(a3))hash | --- | Con(a1), UR(a1), ECS(a1)<br>Con(a2), UR(a2), ECS(a2)<br>Con(a3), UR(a3), ECS(a3) |
| SERVER B | --- | Kt(b1)⊕(UR(b1)\|\|ECSSig(b1))hash<br>Kt(b2)⊕(UR(b2)\|\|ECSSig(b2))hash | Con(b1), UR(b1), ECS(b1)<br>Con(b2), UR(b2), ECS(b2) |

FIG. 22

| | PROTECTED AREA (Protected Area) | | GENERAL-PURPOSE AREA (General Purpose Area) |
|---|---|---|---|
| | BLOCK #0 | BLOCK #1 | |
| SERVER A | Kt(a1)⊕(UR(a1)∥ECSSig(a1))hash<br>Kt(a2)⊕(UR(a2)∥ECSSig(a2))hash<br>Kt(a3)⊕(UR(a3)∥ECSSig(a3))hash | --- | Con(a1), UR(a1), ECS(a1)<br>Con(a2), UR(a2), ECS(a2)<br>Con(a3), UR(a3), ECS(a3) |
| SERVER B | Kt(b1)⊕(UR(b1)∥ECSSig(b1))hash<br>Kt(b2)⊕(UR(b2)∥ECSSig(b2))hash | --- | Con(b1), UR(b1), ECS(b1)<br>Con(b2), UR(b2), ECS(b2) |
| SERVER C | --- | Kt(c1)⊕(UR(c1)∥ECSSig(c1))hash | Con(c1), UR(c1), ECS(c1) |
| SERVER D | --- | Kt(d1)⊕(UR(d1)∥ECSSig(d1))hash<br>Kt(d2)⊕(UR(d2)∥ECSSig(d2))hash | Con(d1), UR(d1), ECS(d1)<br>Con(d2), UR(d2), ECS(d2) |

INFORMATION PROCESSING DEVICE, INFORMATION STORAGE DEVICE, INFORMATION PROCESSING SYSTEM, INFORMATION PROCESSING METHOD, AND PROGRAM

TECHNICAL FIELD

The present disclosure relates to an information processing device, an information storage device, an information processing system, an information processing method, and a program. Particularly, the disclosure relates to an information processing device, an information storage device, an information processing system, an information processing method, and a program that prevent unauthorized uses of content.

BACKGROUND ART

Content, for example, videos, music, and the like, is provided to users via various kinds of media including a DVD (Digital Versatile Disc), a Blu-ray Disc (registered trademark), a flash memory, a network such as the Internet, broadcasting waves, and the like. The users can reproduce the content using, for example, a recording and reproduction device such as a PC, a mobile terminal, or a BD player, or various kinds of information processing devices such as a television.

However, producers or distributors of many kinds of content such as music data, image data, and the like provided to users hold copyrights, distribution rights, and the like. Thus, in many cases when content is provided to the users, content providers impose restrictions on content uses.

There is a problem arising in digital recording devices and recording media in that, since recording and reproduction can be repeated without deteriorating images and sounds, uses of unauthorized copied content including distribution of such unauthorized copied content through the Internet or distribution of so-called pirated discs are prevalent.

In order to stop such unauthorized copying of data, various technologies for preventing illegal copying using digital recording devices and recording media have been put into practice.

For example, a content encryption process is an aspect thereof. A key used in decrypting encrypted data is given only to a reproduction device that owns a license that is a content use right. Such a license is given to reproduction devices that are designed to comply with predetermined operation regulations, for example, prohibition of unauthorized copying. On the other hand, since a reproduction device that does not own a license does not have a key used in decrypting encrypted data, it is difficult to decrypt such encrypted data.

However, even when content has been encrypted as described above, unauthorized uses of content are prevalent in the present state.

An example of an unauthorized use of content will be described in detail.

A configuration in which a content server distributes encrypted content to a user device, for example, a user device of a recording and reproduction device, a PC, or a mobile terminal, or the like is assumed.

When the content server distributes the encrypted content to the user device, the content server distributes the following pieces of data to the user device via, for example, a network:
(a) the encrypted content
(b) an encryption key applied to encryption and decryption of the encrypted content.

When the same content such as the same movie is provided to a number of user devices, for example, there are, for example, two process aspects as follows as process aspects executed by the content server.

(A) Different pieces of encrypted content are generated by applying different individual encryption keys, and provided to each of the user devices.

(B) The same encrypted content obtained from encryption using the same encrypting key is generated and provided to the plurality of user devices.

When security for preventing unauthorized uses of the content is considered, the process (A) described above is effective.

In order to perform the process (A) described above, however, there are problems in that a process of generating individual pieces of encrypted content by setting individual encryption keys for a number of respective users is necessary and a processing load on the server caused by generation and management of the encryption keys, a generation process of the encrypted content, and the like increases according to the number of users to whom the content is distributed.

Thus, in many cases, the process (B) described above, in other words, a process of generating the same encrypted content obtained from encryption using the same encryption key and providing the same content to a plurality of users is performed.

For example, one encryption key (=a title key) is set with respect to content with a certain title, the same encrypted content is generated by applying the one title key, and then the following data set is distributed to a number of users:
(a) the encrypted content; and
(b) the title key.

By performing the process, a processing load imposed on the content server is reduced.

Note that, hereinafter, description will be provided referring to an encryption key set in units of titles of content as a "title key."

Note that the title key is applied to encryption and decryption processes of encrypted content of the title.

However if the same data set, in other words, a combination of the same data of:
(a) the encrypted content; and
(b) the title key,
is distributed to a number of users as described above, there is a possibility of the following process being performed by a certain "unauthorized user."

(1) The "unauthorized user" reads the title key received from the server and discloses the read title key to a number of unspecified users.

Alternatively,
(2) the "unauthorized user" uses a title key A corresponding to certain encrypted content A to encrypt totally different content B, and distributes combined data of
(X) the title key A; and
(Y) the encrypted content B encrypted using the title key A to a number of unspecified users.

There is a possibility of execution of such an unauthorized use.

When the process (1) described above is performed, for example, a number of the users who have acquired the title key that had been disclosed without authorization illegitimately use the content encrypted using the title key.

In addition, when the process (2) described above is performed, an unauthorized data set generated by the "unauthorized user" described above, in other words,
(X) the title key A; and
(Y) the encrypted content B encrypted using the title key A are acquired from the "unauthorized user," which leads to unauthorized uses of the encrypted content B by a number of the users.

As a result, the number of users who are willing to formally purchase the original formal data set, in other words, the encrypted content B and a title key B corresponding to the encrypted content B, reduces, and accordingly, profits earned by the owner(s) of the copyright and distribution right are significantly lessened.

Furthermore, a specific example of an unauthorized process will be described.

A content server is assumed to retain the following data sets (1) to (3) of encrypted content (C) and title keys (Kt).

(1) (Kt11, C11)
(2) (Kt12, C12)
(3) (Kt13, C13)

Wherein Cnn indicates a content file and Ktnn indicates a title key used in encryption of content.

(Kt11, C11) is a data set of a title key (Kt11) and content (C11) that has been encrypted using the title key (Kt11).

For example, a certain "unauthorized user Ux" is assumed to purchase a total of the three data sets described above, which are:

(1) (Kt11, C11);
(2) (Kt12, C12); and
(3) (Kt13, C13).

It is assumed that the purchase process itself is performed according to a predetermined legitimate purchase procedure implemented between a user device owned by the "unauthorized user Ux," for example, a PC and the content server.

The "unauthorized user Ux" records the data sets (1) to (3) described above in a medium such as a hard disk of, for example, the PC that is the user device.

The "unauthorized user Ux" reads the data sets (1) to (3) described above from the medium such as a hard disk of a user device PC such as a PC, and decrypts all pieces of the encrypted content first, thereby obtaining the following data.

Title keys: Kt11, Kt12, and Kt13
Decrypted content: C11, C12, and C13

Note that, when a formal content reproduction program is used in an authorized reproduction device, it is not possible to read title keys from outside; however, there is a possibility of the title keys being read using a method of installing an unauthorized program in a device such as a PC or the like, and it is difficult at present to completely prevent the title keys from being read.

Furthermore, the "unauthorized user Ux" generates:

$C11\|C12\|C13$, which is data obtained by connecting the pieces of decrypted content of C11 to C13, and encrypts the connected data using the title key Kt11.

In other words, the following data set is generated:

$(Kt11, C11\|C12\|C13)$, and this data set is, for example, distributed via a network without authorization, sold at a low price, or provided to many users free of charge.

When the process as described above is performed, many general users can acquire the illegitimately created data set, in other words, the unauthorized data set of (Kt11, C11∥C12∥C13), from the "unauthorized user Ux."

This data set includes a set of pieces of data, which are
(a) the encrypted content obtained from encryption using the title key Kt11; and
(b) the title key Kt11, and has the same data configuration as data set content provided from a formal content provider to users.

Therefore, a legitimate reproduction device that retains a legitimate content reproduction program with a license can decrypt and reproduce the encrypted content [C11∥C12∥C13] using the title key Kt11 without problems.

As a result, unauthorized uses without formally purchasing content are prevalent, the number of users who formally purchase the content of C11 to C13 and the like accordingly reduces, and thereby profits of legitimate right holders are impaired.

Further detailed description will be provided. For example, in series content, for example, a drama or the like that is constituted by 12 titles of Episode 1 to Episode 12, it is assumed that a content purchase unit is set in units of episodes:

Episode 1 = $(Kt01, C01)$

Episode 2 = $(Kt02, C02)$

Episode 3 = $(Kt03, C03)$ $\vdots$

Episode 12 = $(Kt12, C12)$.

In such a case, one "unauthorized user" purchases all of the series of 12 titles including Episode 1 to Episode 12, connects the content of Episode 1 to Episode 12 of C01 to C12, then generates a data set re-encrypted using the title key Kt01 corresponding to Episode 1, that is, $(Kt01, C01\|C02\|C03 \ldots \|C12)$, and discloses the data set on a network. Alternatively, the user performs a process of selling the data set without authorization.

In this case, it is possible for a number of user devices to acquire, reproduce and use the unauthorized data set (Kt01, C01∥C02∥C03 . . . ∥C12) generated by the "unauthorized user."

It is assumed that, for example, a normal price per unit of each episode among the 12 episodes described above is 2,000 yen.

In this case, if all of the 12 episodes are purchased, the total price is:

12×2,000 yen=24,000 yen.

The "unauthorized user" sells the unauthorized data set (Kt01, C01∥C02∥C03 . . . ∥C12) at a price of, for example, 6,000 yen. In this case, many users purchase the cheaper content, formal content sales are hindered as a result, and profits and rights of the original owner(s) of the copyrights and distribution rights are infringed.

In addition to the example described above, by using the title key Kt11 set corresponding to one piece of content C11 in encryption of various pieces of content Cxx which are irrelevant to the above content, Cxx can be set in various kinds of content formats such as content (Kt11, Cxx), and accordingly, there is a problem in that all pieces of content can be unlimitedly decrypted and reproduced using the one title key.

In other words, even if a reproduction device by which reproduction of plain text content is prohibited is created, the same decryption and reproduction as those of formally purchased content are possible using the unauthorized data set.

Furthermore, the "unauthorized user" can also make it possible to replace the title key and to set re-encryption as a service, and can behave as if he or she were an authorized server.

As described above, it is difficult to prevent unauthorized uses of content with only a countermeasure of the content encryption process.

As an unauthorized content use elimination technique different from the encryption process, there is a technique of causing a reproduction device to verify content tampering. When any change (tampering) is made in content in the course of distributing unauthorized content, for example, uses of such tampered content can be stopped by applying the technique.

To be specific, a user device that reproduces content has a control configuration configured such that content reproduction is permitted only when a verification process of content tampering is executed and the content is confirmed to be free from tampering, and content reproduction is not executed when tampering with content is determined.

For example, Patent Literature 1 (JP 2002-358011A) discloses a control configuration in which a hash value is calculated from a content file to be reproduced, comparison to a reference hash value prepared in advance, in other words, a reference hash value that has been calculated based on authorized content data, is performed, and when the newly computed hash value is the same as the reference hash value, absence of content tampering is determined, and accordingly a content reproduction process is performed.

However, when the process of computing the hash value based on content is performed as described above, if a capacity of content data as original data for the computation of the hash value is large, a processing load and processing time necessary for the calculation increase. In recent years, as higher quality moving image data has progressed, there are many cases in which one piece of content has a data amount of several GB to dozens of GB. When a user device that executes content reproduction is caused to perform the process of computing a content hash value based on data of a large capacity, there are problems of excessive data processing performance required for the user device, and of inefficiency in performing the content reproduction process due to lengthening of a time necessary for verifying the content.

In addition, Patent Literature 2 (JP 4576936B) discloses a configuration in which hash values for respective hash units set as fragmented data of stored content of an information recording medium are recorded in a content hash table and stored in the information recording medium together with the content.

According to the disclosed configuration, an information processing device that executes content reproduction executes a hash value reference process based on one or more hash units selected at random. According to the configuration, regardless of a data amount of content, computation and reference processes of the hash values are possible based on the hash units of a small data amount, and efficient convent verification in a user device that executes content reproduction is possible.

However, the configuration described in Patent Literature 2 is based on the premise of the process performed on the stored content of the information recording medium. The disclosed configuration can be used when, for example, the hash values are recorded on the medium together with content at the time of manufacturing the information recording medium; however, there is a problem in that the configuration is difficult to apply to content downloaded from, for example, a server.

In addition, there is another problem in that both Patent Literature 1 and Patent Literature 2 described above focus on verification of content tampering, and thus have a difficulty in controlling distribution of unauthorized copied content that has not been tampered with.

As described above, the content encryption and tampering verification processes as techniques of the related art currently do not exhibit satisfactory preventive effects against distribution of unauthorized copied content and disclosure of a content encryption key.

CITATION LIST

Patent Literature

Patent Literature 1: JP 2002-358011A
Patent Literature 2: JP 4576936B

SUMMARY OF INVENTION

Technical Problem

The present disclosure takes, for example, the above-described problems into consideration, and aims to provide an information processing device, information storage device, information processing system, information processing method, and program that realize effective prevention of unauthorized uses of content.

Solution to Problem

According to the first aspect of the present disclosure, there is provided an information storage device including a storage unit configured to store encrypted content and an encryption key to be applied to decryption of the encrypted content. The storage unit stores a converted encryption key generated through an arithmetic operation of the encryption key and an electronic signature that is constituent data of an encrypted content signature file set corresponding to the encrypted content. The electronic signature is an electronic signature for data that includes constituent data of the encrypted content and the encryption key. A reproduction device configured to read the encrypted content from the storage unit and execute a decryption process is able to be caused to perform acquisition of the encryption key through an arithmetic operation of applying the electronic signature to the converted encryption key.

Further, according to an embodiment of the present disclosure, the converted encryption key may be a result of an arithmetic operation of exclusive OR of the encryption key and a hash value of connected data of use control information set corresponding to the encrypted content and the electronic signature.

Further, according to an embodiment of the present disclosure, the storage unit may have a protected area to which access restriction is set. The converted encryption key may be configured to be stored in the protected area.

Further, according to an embodiment of the present disclosure, the information storage device may further include a data processing unit configured to determine access feasibility to the protected area based on a certificate received from an access requesting device with respect to the protected area.

Further, according to an embodiment of the present disclosure, the storage unit may have a protected area to which access restriction is set and a general-purpose area to which access restriction is not set. The converted encryption key may be stored in the protected area. The encrypted content and the encrypted content signature file may be configured to be stored in the general-purpose area.

Further, according to an embodiment of the present disclosure, the electronic signature may be an electronic signature for data that includes the constituent data of the encrypted content, the encryption key, and even constituent data of the encrypted content signature file.

Further, according to an embodiment of the present disclosure, the electronic signature may be an electronic signature for data that includes information of the date of issue of the encrypted content signature file that is the constituent data of the encrypted content signature file.

Further, according to the second aspect of the present disclosure, there is provided an information processing device including a data processing unit configured to execute decryption and reproduction processes of encrypted content recorded in a medium. When a decryption process of the encrypted content is to be executed, the data processing unit reads a converted encryption key that is converted data of an encryption key to be applied to decryption of the encrypted content recorded in the medium, executes an arithmetic operation process for the converted encryption key, and then executes an acquisition process of the encryption key. The converted encryption key is a converted encryption key generated through an arithmetic operation of the encryption key and the electronic signature that is constituent data of an encrypted content signature file set corresponding to the encrypted content. The data processing unit acquires the electronic signature that is the constituent data of the encrypted content signature file recorded in the medium, executes an arithmetic operation process to which the acquired electronic signature is applied, and then executes the acquisition process of the encryption key.

Further, according to an embodiment of the present disclosure, the electronic signature may be an electronic signature for data that includes constituent data of the encrypted content and the encryption key.

Further, according to an embodiment of the present disclosure, the converted encryption key may be a result of an arithmetic operation of exclusive OR of the encryption key and a hash value of connected data of use control information set corresponding to the encrypted content and the electronic signature. The data processing unit may acquire the electronic signature that is the constituent data of the encrypted content signature file recorded in the medium and the use control information recorded in the medium, executes an arithmetic operation process to which the acquired data is applied, and then executes the acquisition process of the encryption key.

Further, according to an embodiment of the present disclosure, the data processing unit may execute a signature verification process on the electronic signature that is the constituent data of the encrypted content signature file recorded in the medium. Under a condition that the signature verification process succeeds and legitimacy of the encrypted content signature file is confirmed, the acquisition process of the encryption key may be performed.

Further, according to the third aspect of the present disclosure, there is provided an information processing device including a data processing unit configured to output encrypted content recorded in a medium and a converted encryption key that is converted data of an encryption key to be applied to decryption of the encrypted content. The data processing unit generates the converted encryption key through an arithmetic operation process of the encryption key and an electronic signature that is an electronic signature that is constituent data of an encrypted content signature file set corresponding to the encrypted content and for data that includes constituent data of the encrypted content and the encryption key.

Further, according to an embodiment of the present disclosure, the data processing unit may generate the converted encryption key by executing an arithmetic operation of exclusive OR of the encryption key and a hash value of connected data of use control information set corresponding to the encrypted content and the electronic signature.

Further, according to the fourth aspect of the present disclosure, there is provided an information processing method executed in an information processing device, the method including a data processing step, by a data processing unit, of reading a converted encryption key that is converted data of an encryption key to be applied to decryption, executing an arithmetic operation process for the converted encryption key, and then performing an acquisition process of the encryption key when a decryption process of encrypted content recorded in a medium is to be executed. The converted encryption key is a converted encryption key generated through an arithmetic operation of the encryption key and an electronic signature that is constituent data of an encrypted content signature file set corresponding to the encrypted content. In the data processing unit step, the data processing unit acquires the electronic signature from the encrypted content signature file recorded in the medium, executes an arithmetic operation process to which the acquired electronic signature is applied, and then executes the acquisition process of the encryption key.

Further, according to the fifth aspect of the present disclosure, there is provided an information processing method executed in an information processing device, the method including a data processing step, by a data processing unit, of outputting encrypted content recorded in a medium and a converted encryption key that is converted data of an encryption key to be applied to decryption of the encrypted content. In the data processing step, the converted encryption key is generated through an arithmetic operation process of the encryption key and an electronic signature that is an electronic signature that is constituent data of an encrypted content signature file set corresponding to the encrypted content and for data that includes constituent data of the encrypted content and the encryption key.

Further, according to the sixth aspect of the present disclosure, there is provided a program causing an information processing device to execute information processing, the program causing: a data processing unit to execute a data processing step of reading a converted encryption key that is converted data of an encryption key to be applied to decryption and acquiring the encryption key through an arithmetic operation process for the converted encryption key when a decryption process of encrypted content recorded in a medium is to be performed. The converted encryption key is a converted encryption key generated through an arithmetic operation of the encryption key and an electronic signature that is constituent data of an encrypted content signature file set corresponding to the encrypted content. In the data processing unit step, an acquisition process of the electronic signature from the encrypted content signature file recorded in the medium and an acquisition process of the encryption key through an arithmetic operation process to which the acquired electronic signature is applied are executed.

Further, according to the sixth aspect of the present disclosure, there is provided a program causing an information processing device to execute information processing, the program causing: a data processing unit to execute a data processing step of outputting encrypted content recorded in a medium and a converted encryption key that is converted data of an encryption key to be applied to decryption of the encrypted content. In the data processing step, the converted encryption key is generated through an arithmetic operation process of the encryption key and an electronic signature that is an electronic signature that is constituent data of an encrypted content signature file set corresponding to the encrypted content and for data that includes constituent data of the encrypted content and the encryption key.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The object, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

Advantageous Effects of Invention

According to a configuration of an embodiment of the present disclosure, a device and a method that effectively prevent unauthorized uses of content are realized.

To be specific, when a decryption process of encrypted content is to be executed, a converted encryption key that is converted data of an encryption key to be applied to decryption of the encrypted content recorded in a medium is read, an arithmetic operation process for the converted encryption key is executed, and thereby an acquisition process of the encryption key is executed. The converted encryption key is a converted encryption key generated from an arithmetic operation of the encryption key and an electronic signature that is constituent data of an encrypted content signature file set corresponding to the encrypted content, and a reproduction device acquires the electronic signature that is the constituent data of the encrypted content signature file recorded in the medium, and executes the acquisition process of the encryption key by executing the arithmetic operation process to which the acquired electronic signature is applied. The electronic signature is set as an electronic signature for data that includes the constituent data of the encrypted content and the encryption key.

By setting signature data of the encrypted content signature file to be constituent data of the converted encryption key, it is possible to prevent unauthorized uses of content caused by a key replacement process, or the like.

BRIEF DESCRIPTION OF DRAWINGS

FIG. 11 is a diagram for describing a configuration example of an ECS issuer certificate included in the encrypted content signature file (ECS file).

FIG. 12 is a diagram for describing a configuration example of an ECS issuer certificate revocation list.

FIG. 13 is a diagram for describing an overview of a generation process and data structure of the encrypted content signature file (ECS file).

FIG. 14 is a sequence diagram for describing a processing sequence of generation of the encrypted content signature file (ECS file), and provision and use of content.

FIG. 21 is a diagram for describing a configuration example of recorded data of the memory card.

FIG. 22 is a diagram for describing another configuration example of recorded data of the memory card.

DESCRIPTION OF EMBODIMENTS

Figure 1:
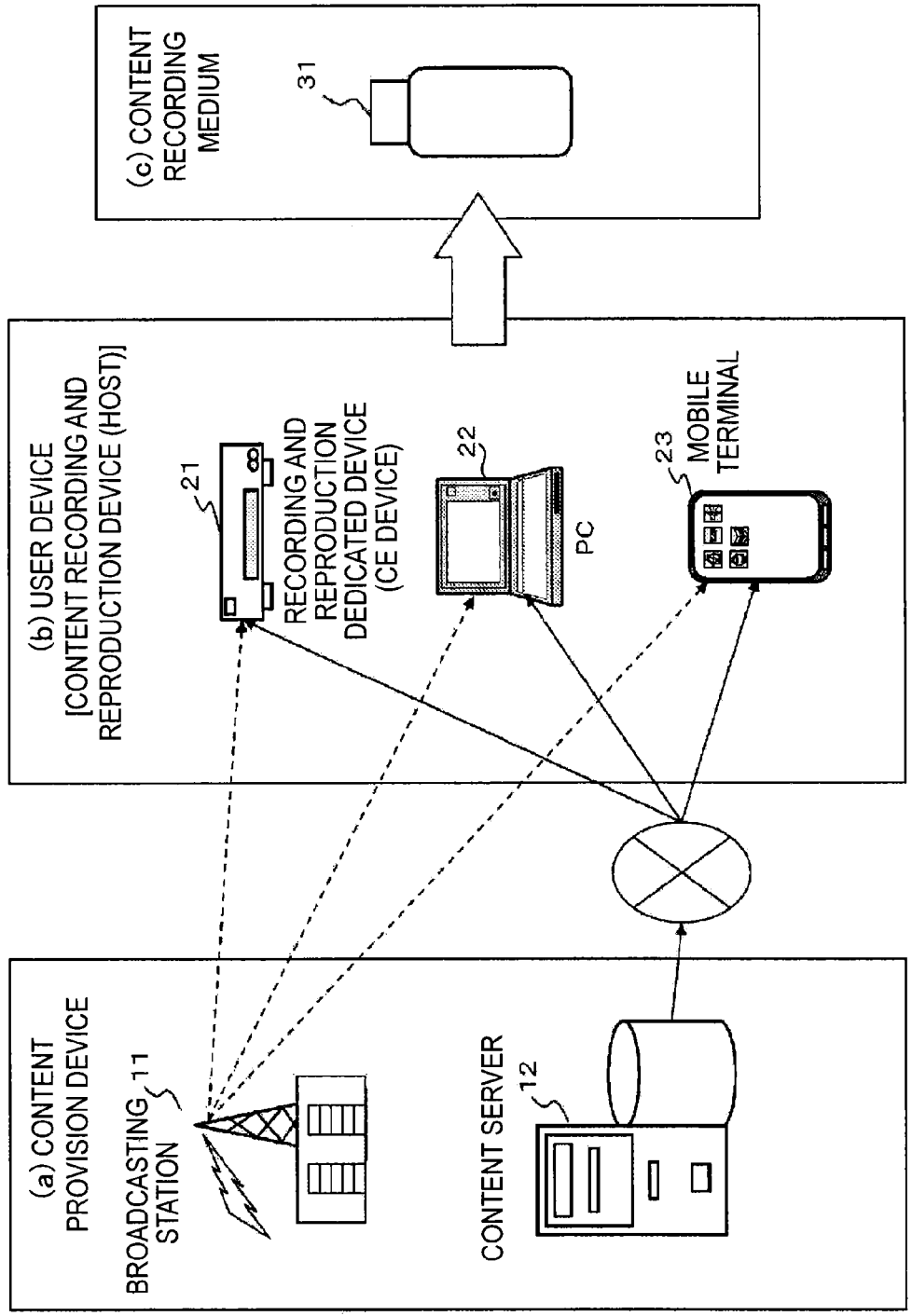
FIG. 1 is a diagram illustrating an overview of a content provision process and a use process.

Hereinafter, an information processing device, information storage device, information processing system, information processing method, and program will be described in detail with reference to the drawings. Note that description will be provided according to the following subjects.

1. Regarding an overview of content provision process and use process
2. Regarding a configuration example and a use example of a memory card
3. Regarding a certificate having access permission information with respect to a protected area
4. Regarding an example of an access process to a memory card to which a certificate of each device is applied
5. Regarding a content provision system using an encrypted content signature (ECS) issuer
6. Regarding a configuration example of an ECS file
7. Regarding a configuration of an ECS issuer certificate revocation list
8. Regarding a generation process of an encrypted content signature file (ECS file)
9. Regarding a process to which an ECS file and date information of an ECS issuer certificate are applied
10. Regarding a configuration of association of an encryption key and an ECS issuer signature
11. Regarding a process of applying a block identifier recorded in an encrypted content signature (ECS) file
12. Regarding a hardware configuration example of each device
13. Conclusion of the configuration of the present disclosure

[1. Regarding an Overview of Content Provision Process and Use Process]

Hereinafter, an information processing device, an information processing method, and a program of the present disclosure will be described in detail with reference to the drawings.

First, an overview of a content provision process and use process will be described with reference to FIG. 1 and succeeding drawings.

FIG. 1 illustrates, from the left, examples of:
(a) a content provision device;
(b) a content recording and reproduction device (host); and
(c) a content recording medium.

The (c) content recording medium is a medium used by a user in recording content and in a reproduction process of the content. Herein, a memory card 31 that is an information storage device, for example, a flash memory or the like, is illustrated.

Note that, in embodiments that will be described below, an example in which content provided by a content provision device is encrypted content will be described as a representative example; however, a configuration of the present disclosure is not limited to the case in which provided content is encrypted content, and can also be applied to a case in which the provided content is plain text content that is not encrypted.

A user records various kinds of content, for example, music, movies, and the like, in the memory card 31 for their use. Such content includes content of which use should be controlled, for example, content of which copyright should be managed.

Content of which use should be controlled is, for example, content of which illegal copying, distribution of copied data or the like is prohibited, or content of which a use period is restricted. Note that when use-controlled content is recorded in the memory card 31, use control information (Usage Rule) corresponding to the content is also recorded.

In the use control information (Usage Rule), for example, information relating to content uses such as a permitted content use period, and the permitted number of copies, is recorded.

A content provision device provides content and use control information corresponding to the content.

The (a) content provision device is a providing source of content such as music, movies, and the like. FIG. 1 shows a broadcasting station 11 and a content server 12 as content providing devices as an example.

The broadcasting station 11 is, for example, a television station, and provides user devices (the (b) content recording and reproduction device (host)) with various kinds of broadcast content by carrying the content on ground waves or satellite waves via satellites.

The content server 12 is a server that provides content such as music, movies, and the like via a network such as the Internet.

A user can load the memory card 31 that is the (c) content recording medium on the (b) content recording and reproduction device (host) to record content provided by the broadcasting station 11 or the content server 12 on the memory card 31 via a reception unit of the (b) content recording and reproduction device (host) itself or a reception device connected to the content recording and reproduction device (host).

The (b) content recording device (host) with the memory card 31 loaded therein that is the (c) content recording medium records the content received from the broadcasting station 11 or the content server 12 which is the (a) content providing device on the memory card 31.

As the (b) content recording and reproduction device (host), there is a recording and reproduction dedicated device (CE device: Consumer Electronics device) 21, for example, a DVD player that is provided with a hard disk, a DVD, a BD, or the like. Furthermore, there are a PC 22, a mobile terminal 23 such as a smartphone, a mobile telephone, a mobile player, or a tablet terminal, or the like. All of them are devices in which the memory card 31 that is the (c) content recording medium can be loaded.

The user receives the content such as music or movies from the broadcasting station 11 or the content server 12 using the recording and reproduction dedicated device 21, the PC 22, the mobile terminal 23, or the like, and records the content on the memory card 31.

A form of using the content recorded on the memory card 31 will be described with reference to FIG. 2.

The memory card 31 that is an information storage device is a recording medium that can be attached to or detached from a content reproduction device, for example, a PC or the like, and can be freely detached from a device executing content recording and loaded in another user device.

Figure 2:
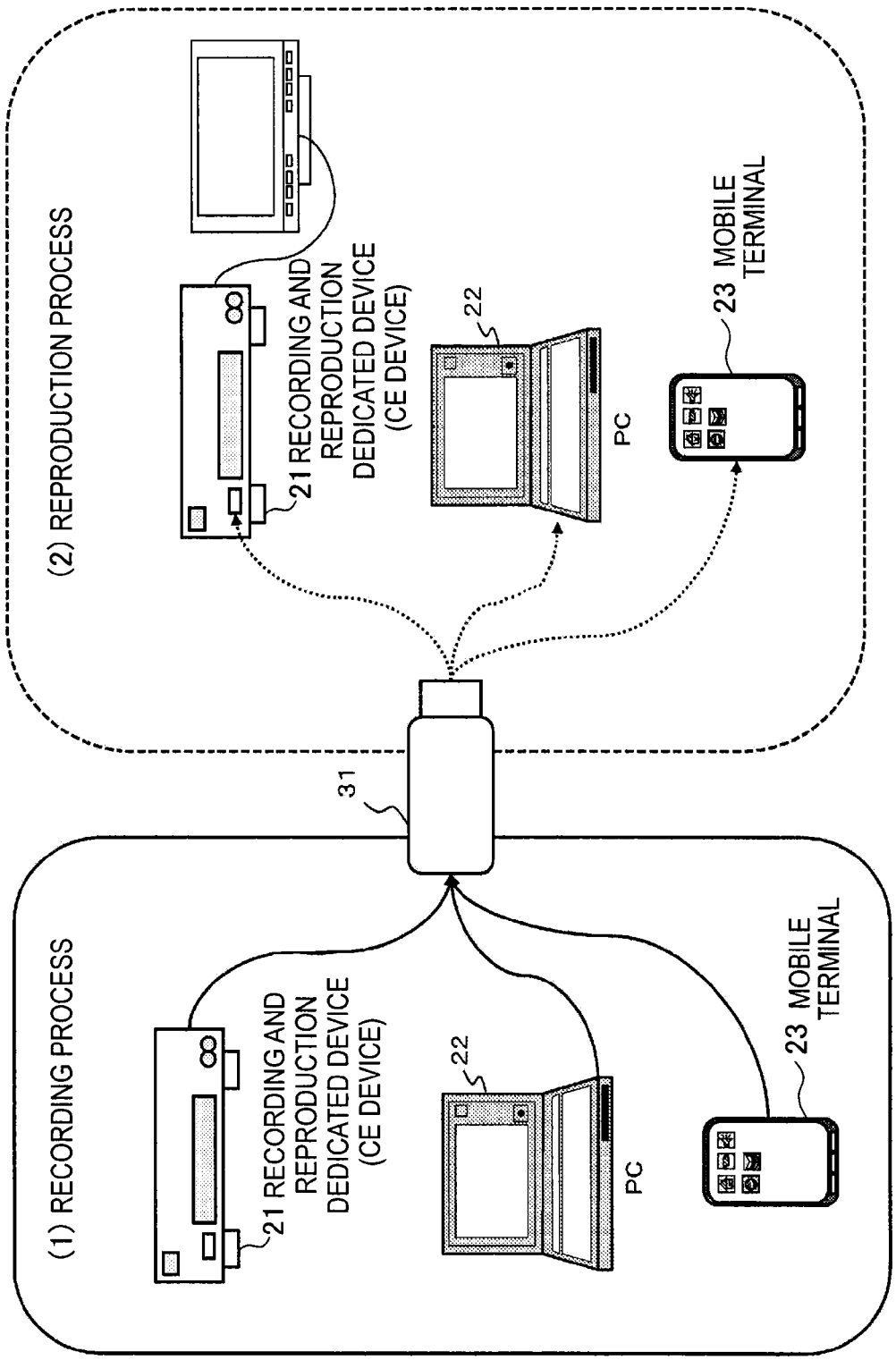
FIG. 2 is a diagram illustrating a form of using content recorded in a memory card.

In other words, as illustrated in FIG. 2, the following processes are executed:

(1) recording process, and
(2) reproduction process.

Note that there is a device that executes only one process of recording or reproduction.

In addition, it is not necessary that devices that execute the processes of recording and reproduction be the same, and a user can freely select and use a recording device and a reproduction device.

Note that, in many cases, use control content recorded on the memory card 31 is recorded as encrypted content, and a content reproduction device such as the recording and reproduction dedicated device 21, the PC 22, or the mobile terminal 23 executes a decryption process following a predetermined sequence and then reproduces the content.

In addition, the reproduction process or the like is performed according to a form of use permission recorded in the use control information (Usage Rule) set corresponding to the content.

In the (b) content recording and reproduction device (host), a program (host application) for executing content uses and the content decryption process following the use control information (Usage Rule) is stored, and content reproduction is executed according to the program (host application).

[2. Regarding a Configuration Example and a Use Example of a Memory Card]

Next, a configuration example and a use example of a memory card such as a flash memory used as a content recording medium will be described.

Figure 3:
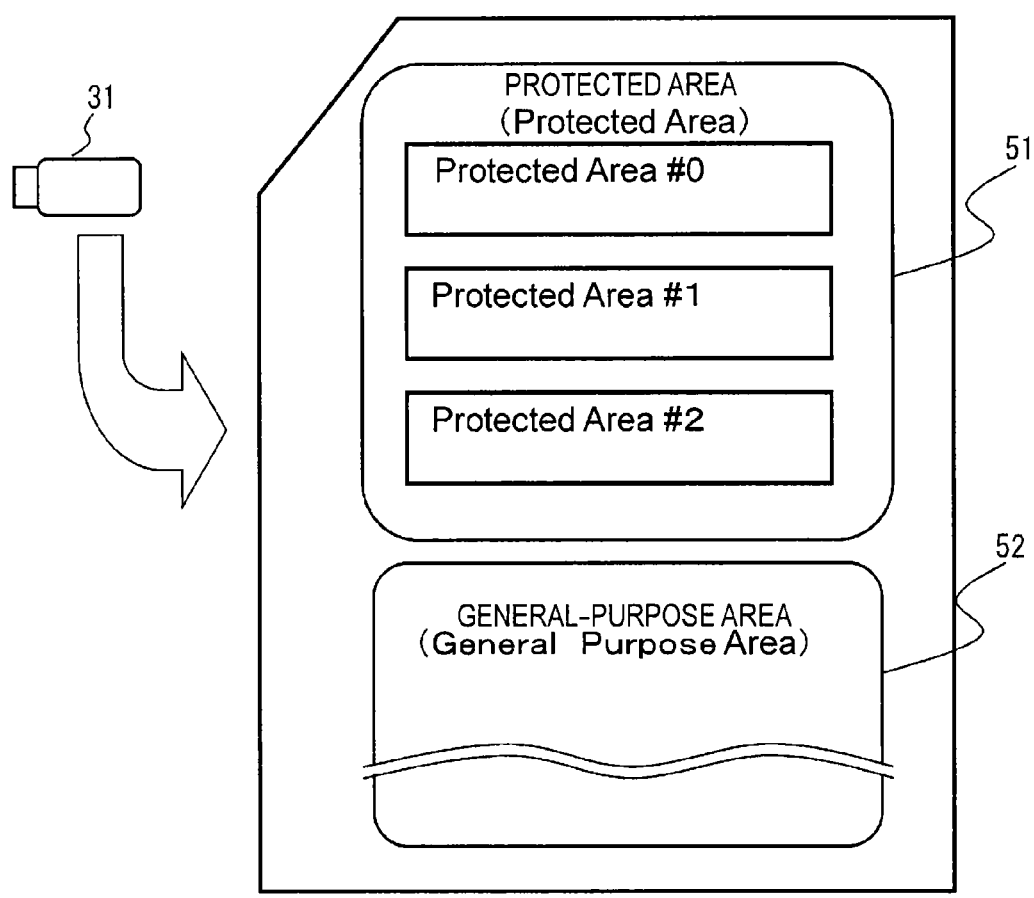
FIG. 3 is a diagram illustrating a specific configuration example of storage areas of the memory card.

A specific configuration example of a storage area of the memory card 31 is shown in FIG. 3.

As shown in FIG. 3, the storage area of the memory card 31 includes the following two areas.

(a) Protected area (Protected Area) 51
(b) General-purpose area (General Purpose Area) 52

The (b) general-purpose area (General Purpose Area) 52 is an area that a recording and reproduction device used by a user can freely access, and in which content, use control information (Usage Rule) corresponding to the content, other general content management data, and the like are recorded.

The general-purpose area (General Purpose Area) 52 is an area in which data can be freely written and read by, for example, a server or a recording and reproduction device of a user.

On the other hand, the (a) protected area (Protected Area) 51 is an area to which free access is not permitted.

The protected area (Protected Area) 51 is divided into blocks (#0, #1, #2, . . . ) as a plurality of segmented areas, and access rights are set in units of the blocks.

When writing or reading of data is to be performed using a recording and reproduction device used by a user, a server connected via a network, or the like, a data processing unit of the memory card 31 decides feasibility of reading (Read) or writing (Write) in units of blocks for each of the devices according to the program stored in the memory card 31 in advance.

The memory card 31 includes the data processing unit for executing the program stored in advance and an authentication processing unit that executes an authentication process, and the memory card 31 first performs the authentication process with respect to a device that attempts to execute data writing or reading with respect to the memory card 31.

In the stage of the authentication process, a device certificate such as a public key certificate is received from a counterpart device, i.e., an access requesting device.

When the access requesting device is a server, for example, a server certificate (Server Certificate) owned by the server is received, and then it is determined whether or not access to the protected area (Protected Area) 51 in units of blocks (segmented areas) should be permitted based on information described in the certificate.

In addition, when the access requesting device is a host device, for example, a recording and reproduction device (host) as a user device, a host certificate (Host Certificate) owned by the recording and reproduction device (host) is received, and then it is determined whether or not access to each block (segmented area) of the protected area (Protected Area) 51 should be permitted based on information described in the certificate.

The access right determination process is performed in units of blocks (the areas #0, #1, #2, . . . shown in the drawing) within the protected area (Protected Area) 51 shown in FIG. 3. The memory card 31 causes the server or the host to execute only a process (a process such as data reading or writing) allowed in units of blocks.

Reading and writing restriction information with respect to a medium (PAD Read/PAD Write) is set in units of, for example, a device that attempts to access, for example, the content server or the recording and reproduction device (host). The information is recorded in the server certificate (Server Certificate) or host certificate (Host certificate) corresponding to each device.

Note that "Certificate" hereinbelow will be simply abbreviated to "Cert."

As described above, the memory card 31 verifies recorded data of the server certificate (Server Cert) or the host certificate (Host Cert) following the regulated program stored in advance in the memory card 31, and performs a process of permitting access with respect only to areas to which access is permitted.

[3. Regarding a Certificate Having Access Permission Information with Respect to a Protected Area]

Next, configuration examples of certificates that should be presented to the memory card when a host device (=recording and reproduction device) that is a server or a user device attempts to access the protected area (Protected Area) 51 of the memory card 31 described above will be described with reference to FIGS. 4 and 5.

As described above, the memory card 31 performs the authentication process with respect to a device that attempts to execute data writing or reading with the memory card 31. In the stage of the authentication process, a device certificate (for example, the server certificate (Server Cert) or the host certificate (Host Cert) such as a public key certificate is received from a counterpart device, i.e., an access requesting device, and then it is determined whether or not access to each segmented area of the protected area (Protected Area) 51 should be permitted based on information described in the certificate.

As an example of the device certificate used in the authentication process, a configuration example of the host certificate (Host Cert) stored in a user device (host device) such as the recording and reproduction dedicated device 21, the PC 22, or the mobile terminal 23 shown in FIG. 1 will be described with reference to FIG. 4.

The host certificate (Host Cert) is provided by, for example, an authentication authority that is a principal entity of the public key certification issuance to each user device (host device). The host certificate (Host Cert) is, for example, a user device certificate issued to a user device (host device) of which a content use process is approved by the authentication authority and a certificate in which a public key or the like is stored. The host certificate (Host Cert) is set with a signature using a secret key of the authentication authority, and configured as anti-tampering data.

Note that a device certificate can be stored in advance in a memory inside a device based on, for example, device verification of a type of the device or the like during manufacturing of the device. When such a certificate is acquired after purchase of a user, the certificate may be configured to be issued to each device and stored in a memory inside the device after performing an ascertaining process for a type of a device, a type of available content according to a predetermined sequence of the device, the authentication authority, or another management authority.

Note that a server that accesses the protected area of the memory card 31 retains a server public key that has the same configuration as the host certificate and the server certificate (Server Cert) in which access permission information to the memory card is recorded.

Figure 4:
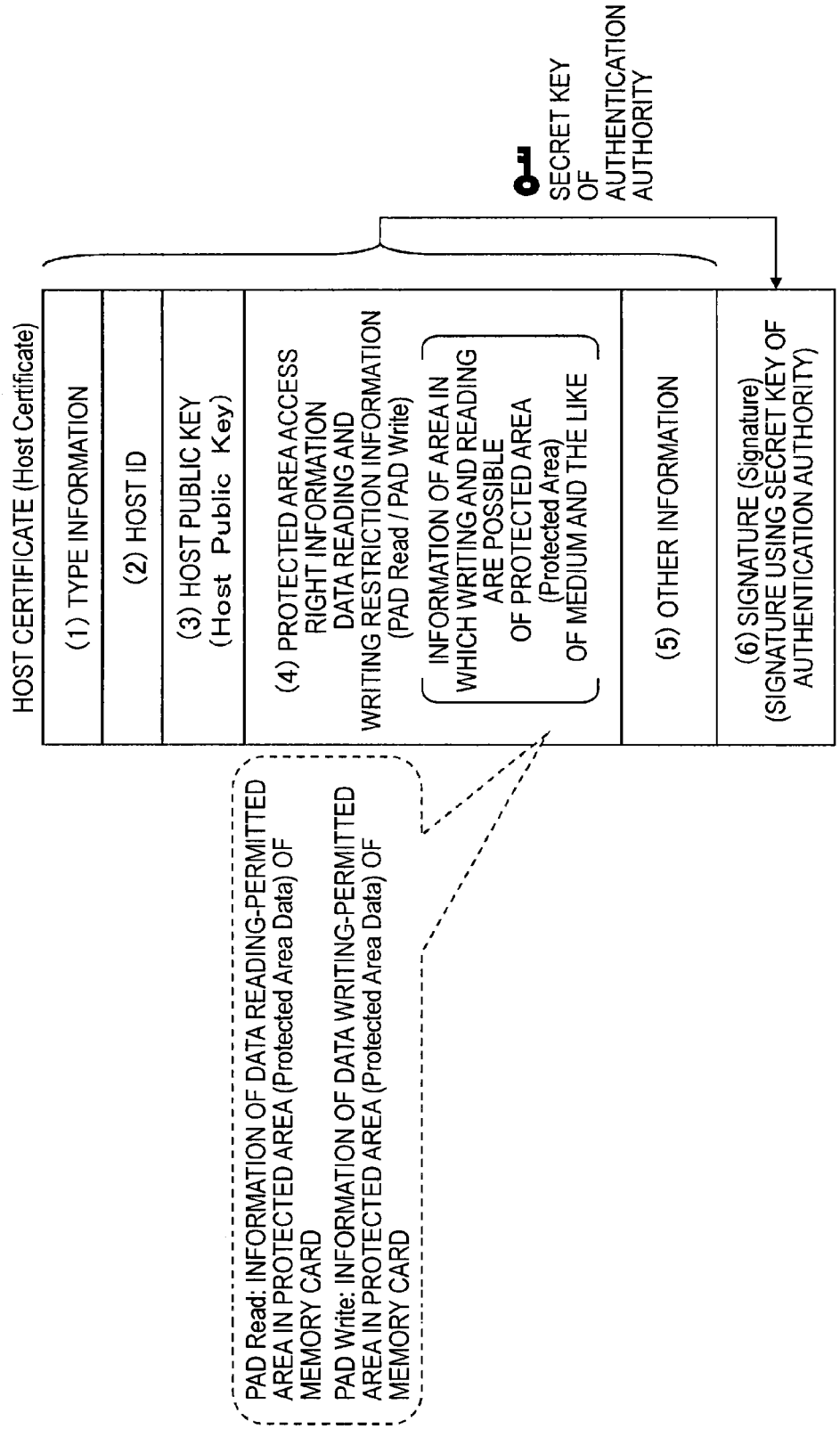
FIG. 4 is a diagram for describing a host certificate (Host Certificate).

FIG. 4 shows a specific example of the host certificate (Host Cert) provided to each host device (user device) by the authentication authority.

The host certificate (Host Cert) includes the following data as shown in FIG. 4.

(1) Type information
(2) Host ID (user device ID)
(3) Host public key (Host Public Key)
(4) Protected area access right information (reading and writing restriction information with respect to the protected area of a medium (PAD Read/PAD Write))
(5) Other information
(6) Signature Hereinafter, each piece of the data from No. (1) to (6) described above will be described.

(1) Type Information

The type information is information indicating a type of a certificate and a type of a user device, and data indicating that, for example, a present certificate is a host certificate, information indicating a type of a device like a PC, or a type of device like a music reproduction player, and the like is recorded.

(2) Host ID

The host ID is an area in which a device ID is recorded as device identification information.

(3) Host Public Key (Host Public Key)

The host public key (Host Public Key) is a public key of a host device. The key constitutes a pair of keys with a secret key provided to a host device (user device) according to a public key encryption scheme.

(4) Protected Area Access Right Information (Reading and Writing Restriction Information with Respect to the Protected Area of a Medium (PAD Read/PAD Write))

The protected area access right information includes a record of information of unit of blocks (segmented areas) for which data reading (Read) or writing (Write) is permitted within the protected area (PDA: Protected Area) 51 set in the storage area of a medium in which content is recorded, for example, the memory card 31 shown in FIG. 3.

An access right is recorded as an access right in units of blocks (segmented areas) within the protected area.

(5) Other Information and (6) Signature (Signature)

In the host certificate, various kinds of information are recorded in addition to No. (1) to (4) described above, and signature data for the information of No. (1) to (5) is recorded.

A signature is performed using the secret key of the authentication authority. When information recorded in the host certificate, for example, a host public key, is taken out and used, a signature verification process to which the public key of the authentication authority is applied is first executed, non-tampering with the host certificate is confirmed, and under the condition that the confirmation has been made, certificate storing data such as a host public key is used.

FIG. 4 shows the host certificate in which the access permission information of a user device (host device) to the protected area of the memory card is recorded; however, to a server, for example, a content provision server providing content to the memory card or the like that has to access the protected area, a certificate in which access permission information to the protected area of the memory card (server certificate (for example, a public key certificate in which a server public key is stored)) the same as the host certificate shown in FIG. 4 is recorded is provided.

A configuration example of the server certificate (Server Cert) provided to servers will be described with reference to FIG. 5. Note that the servers will hereinafter be described as devices including all of the content provision devices illustrated in FIG. 1, in other words, those that provide content to the user devices, such as the broadcasting station 11, the content server 12, and the like.

The server certificate (Server Cert) is provided to devices, for example, the content server and the like that provide content by, for example, the authentication authority that is a principal entity of public key certificate issuance. The server certificate (Server Cert) is, for example a certificate for a server issued to a server of which a content provision process is approved by the authentication authority, and a certificate in which the a server public key and the like are stored. The server certificate (Server Cert) is set with a signature using a secret key of the authentication authority, and configured as anti-tampering data.

Figure 5:
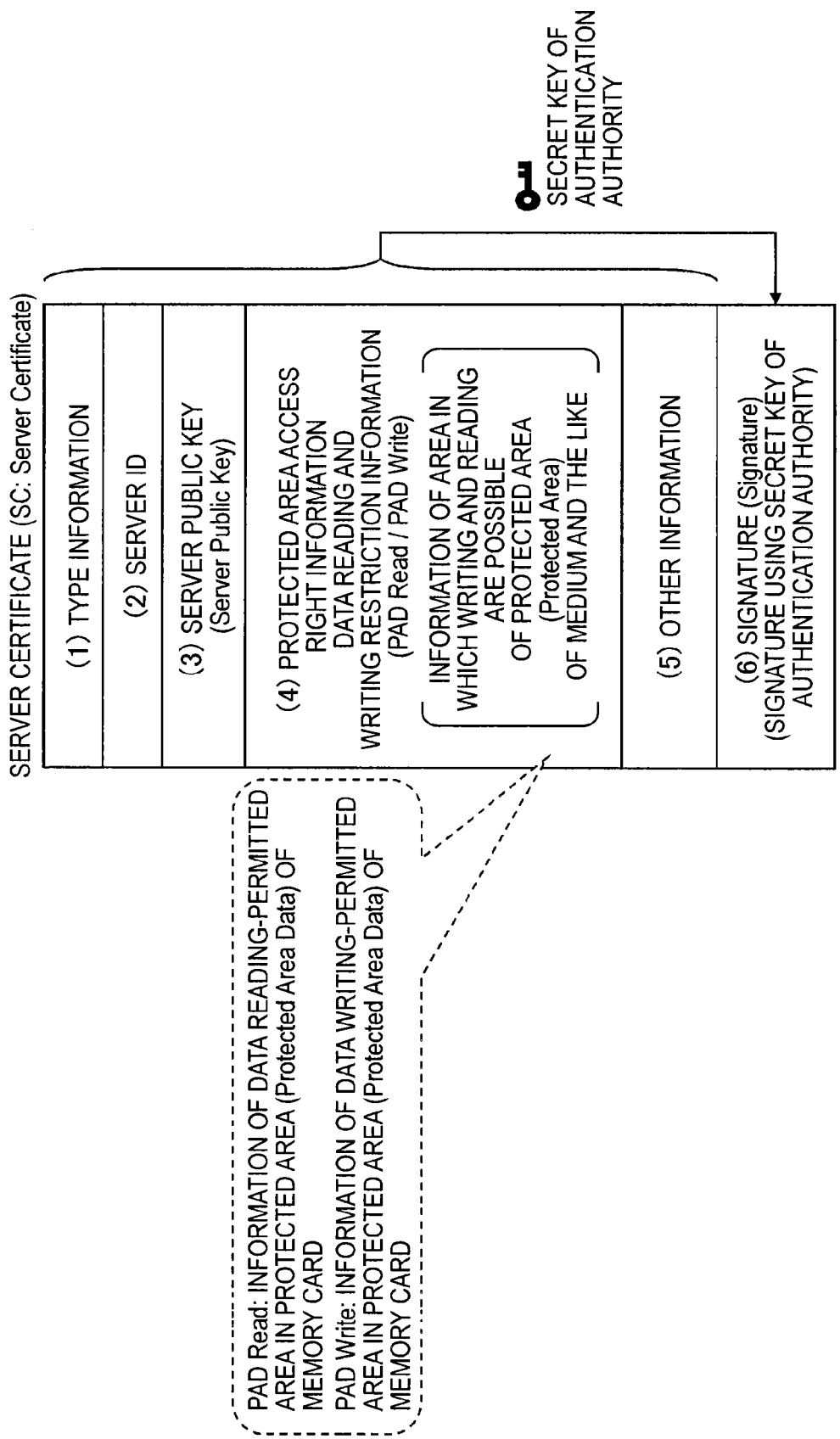
FIG. 5 is a diagram for describing a server certificate (Server Certificate).

FIG. 5 shows a specific example of the server certificate (Server Cert) provided to each content server by the authentication authority.

The server certificate (Server Certificate) includes the following data as shown in FIG. 5 the same as the host certificate described with reference to FIG. 4.

(1) Type Information
(2) Server ID
(3) Server public key (Server Public Key)
(4) Reading and writing restriction information with respect to a medium (PAD Read/PAD Write))
(5) Other information
(6) Signature Each piece of the information is the same information as the information described with reference to FIG. 4, and thus detailed description thereof will be omitted.

Note that, with regard to "(4) Reading and writing restriction information with respect to a medium (PAD Read/PAD Write))," access rights in units of blocks (segmented areas) (Data reading (Read) and writing (Write) permission information) of the protected area 51 of the memory card 31 are recorded in units of servers.

Note that, when the information recorded in the server certificate, for example, the server public key is taken out and used, a signature verification process to which the public key of the authentication authority is applied is first executed, non-tampering with the server certificate is confirmed, and under the condition that the confirmation has been made, certificate storing data such as a server public key is used.

[4. Regarding an Example of an Access Process to a Memory Card to which a Certificate of Each Device is Applied]

As described with reference to FIGS. 4 and 5, when a server or a host device (a user device such as a recording and reproduction device) accesses a block of the protected area (Protected Area) 51 of the memory card 31, it is necessary to present the certificate as shown in FIG. 4 or 5 to the memory card.

The memory card examines the certificates shown in FIG. 4 or 5, and then determines whether or not access to the memory card 31 in units of blocks of the protected area (Protected Area) 51 shown in FIG. 3 is possible.

The host device retains a host certificate (Host Certificate) described with reference to, for example, FIG. 4, and the server that provides content and the like retains a server certificate (Server Certificate) described with reference to FIG. 5.

When each of the devices accesses the protected area (Protected Area) of the memory card, it is necessary to provide the certificate held by each device to the memory card and to receive determination of feasibility of access based on verification performed by the memory card.

Figure 6:
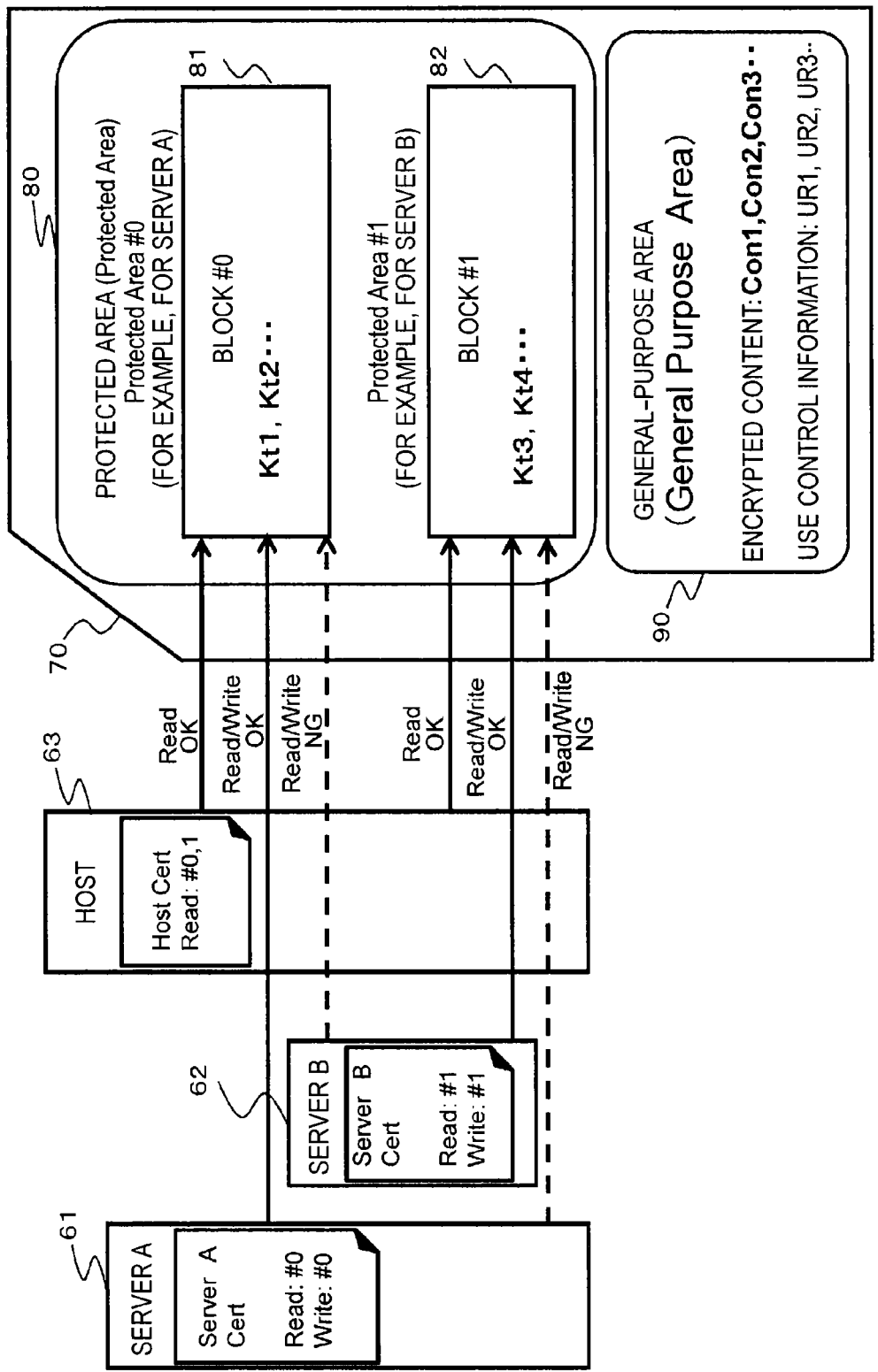
FIG. 6 is a diagram for describing a specific configuration example of stored data of a memory card and an example of an access control process.

With reference to FIG. 6, a set example of access restriction when an access requesting device to a memory card is a server and when the device is a host device such as a recording and reproduction device will be described.

FIG. 6 shows a server A 61, a server B 62, and a host device 63 that are access requesting devices to a memory card, and the memory card 70 from the left.

The server A 61 and the server B 62 provide, for example, encrypted content (Con1, Con2, Con3, . . . ) that is recorded content in the memory card 70.

The servers further provide title keys (Kt1, Kt2, . . . ) which are keys for decrypting the encrypted content, and provide use control information (Usage Rule: UR1, UR2, . . . ) corresponding to the content.

The host device 63 is a device that performs a reproduction process for the content stored in the memory card 70.

The host device 63 reads the encrypted content (Con1, Con2, Con3, . . . ) recorded in a general-purpose area (General Purpose Area) 90 of the memory card 70 and the user control information (Usage Rule: UR1, UR2, . . . ). Furthermore, the host device reads the title keys (Kt1, Kt2, . . . ) to be applied to a content decryption process from blocks (segmented areas) 81 and 82 of a protected area (Protected Area) 80, executes the decryption process using the title keys, and thereby uses the content according to the use control information (Usage Rule).

The memory card 70 has the protected area (Protected Area) 80 and the general-purpose area (General Purpose Area) 90, and the encrypted content, the use control information (Usage Rule), and the like are recorded in the general-purpose area (General Purpose Area) 90.

The title keys necessary when content is reproduced are recorded in the protected area (Protected Area) 80.

As previously described with reference to FIG. 3, the protected area (Protected Area) 80 is segmented into a plurality of blocks (segmented areas).

In the example shown in FIG. 6, only the following two blocks are shown:
a block #0 (Protected Area #0) 81; and
a block #1 (Protected Area #1) 82.

In the protected area (Protected Area) 80, a number of blocks are set in addition to the blocks.

Various settings are possible as forms of block setting.

In the example shown in FIG. 6, the block #0 (Protected Area #0) 81 is set to be a block dedicated to the server A 61, in other words, an area in which title keys for decrypting content provided by the server A 61 are stored.

The block #1 (Protected Area #1) 82 is set to be a block dedicated to the server B 62, in other words, an area in which title keys for decrypting content provided by the server B 62 are stored.

In such a setting, for example, the server A 61 that provides content records title keys necessary for decrypting the provided content in the block #0 (Protected Area #0) 81.

In this case, writing permission area information (PAD Write) recorded in a server certificate (Server Certificate) of the server A 61 is configured as a certificate for which writing (Write) permission with respect to the block #0 (Protected Area #0) is set.

Note that the example of the drawing shows that reading (Read) is also set to be permitted with respect to blocks for which writing (Write) is permitted.

In addition, the server B 62 records title keys necessary for decrypting provided content in the block #1 (Protected Area #1) 82.

In this case, writing permission area information (PAD Write) recorded in a server certificate (Server Certificate) of the server B 62 is configured as a certificate for which writing (Write) permission with respect to the block #1 (Protected Area #1) 82 is set.

A host certificate (Host Certificate) retained by the host device 63 that is a reproduction device executing content reproduction by reading the title keys recorded in the blocks #0 and #1 is configured as a certificate for which reading (Read) permission with respect to the blocks #0 and #1 is set.

In this example, writing (Write) permission with respect to the blocks #0 and #1 is not set in the host certificate (Host Certificate).

However, when content is deleted, a title key corresponding to the deleted content is set to be deletable, and thus the deletion process may be set to be permitted.

In addition, in other processes, when it is necessary for the host device 63 to perform data writing in the protected area, writing (Write) permission may be set in the host certificate (Host Certificate).

When a data processing unit of the memory card 70 receives an access request with respect to the protected area (Protected Area) 80 from an access requesting device such as a server that provides content or a host that uses the content, the data processing unit verifies access permission information in units of blocks with reference to a device certificate of each device, and then determines whether or not access to each block should be permitted.

The memory card 70 determines a type of writing or reading request data according to an input of a data writing or reading request from the access requesting device, and selects a block (#0, #1, #2, . . . ) as a data writing destination or reading destination.

As described with reference to FIGS. 4 and 5, access control information is recorded in the certificate (server certificate, host certificate, or the like) of each access requesting device, and the memory card first verifies a signature of the certificate received from the access requesting device, then confirms legitimacy of the certificate, and then reads the access control information described in the certificate, in other words, the following information:
reading permission area information (PAD Read); and
writing permission area information (PAD Write).

Based on the information, only a process approved for the access requesting device is permitted and executed.

[5. Regarding a Content Provision System Using an Encrypted Content Signature (ECS) Issuer]

As previously described with reference to FIG. 1, content provided to a user device is provided from a content provision device. However, there are cases in which such a content provision device itself distributes unauthorized copied content. Hereinbelow, a configuration that can prevent unauthorized execution by a configuration other than a user device such as an unauthorized process by a server will be described.

An overall configuration of an information processing system of the present disclosure for preventing unauthorized content uses will be described with reference to FIG. 7.

Figure 7:
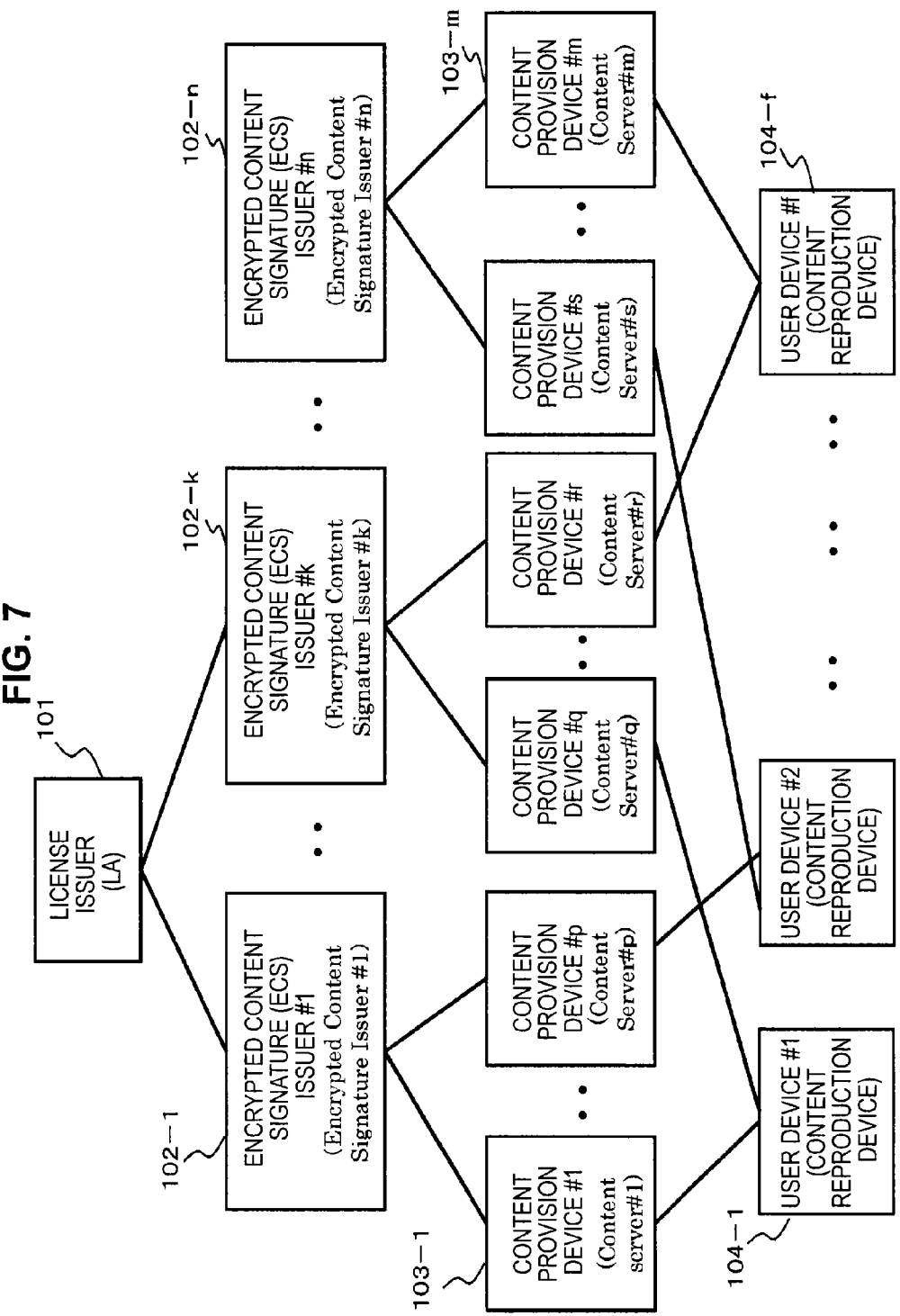
FIG. 7 is a diagram for describing an overall configuration of an information processing system of the present disclosure for preventing an unauthorized content use.

FIG. 7 shows the overall configuration example of the information processing system. In FIG. 7, the following four kinds of devices are shown as a hierarchical structure.

(A) License issuer (LA) 101

(B) Encrypted content signature (ECS) issuers (Encrypted Content Signature Issuers) 102-1 to n

(C) Content provision devices (Content Servers) 103-1 to m

(D) User devices (Content reproduction devices) 104-1 to f

The (C) content provision devices (Content Servers) 103-1 to m shown in FIG. 7 correspond to the broadcasting station 11, the content server 12, and the like shown in FIG. 1.

In addition, the (D) user devices (Content reproduction devices) 104-1 to f shown in FIG. 7 correspond to user devices such as the recording and reproduction dedicated device 21, the PC 22, the mobile terminal 23, and the like shown in FIG. 1.

The (C) content provision devices (Content Servers) 103-1 to m include a content server and a broadcasting station and further include various kinds of information processing devices such as a device that transfers content such as a media provision company that provides media such as discs for storing content, a device that executes content recording on a medium, and the like. There are many such devices.

The (D) user devices (Content reproduction devices) 104-1 to f are devices that execute reproduction processes by receiving or reading content, for example, movies, music, and various other kinds of content from the content provision devices (Content Servers) 103-1 to m via the Internet, broadcast waves, or media such as discs. To be specific, various kinds of information processing devices such as PCs, mobile terminals, DVD players, BD players, and television that can reproduce content are included.

The (B) encrypted content signature (ECS) issuers (Encrypted Content Signature Issuers) 102-1 to n generate encrypted content signature files (ECS files: Encrypted Content Signature Files) corresponding to content provided by the (C) content provision devices (Content Servers) 103-1 to m.

When the (C) content provision devices (Content Servers) 103-1 to m provide, for example, content such as new movie content to the user devices 104, a request for generating encrypted content signature files (ECS files) corresponding to the content is made to the encrypted content signature (ECS) issuers (Encrypted Content Signature Issuers) 102.

The (B) encrypted content signature (ECS) issuers (Encrypted Content Signature Issuers) 102-1 to n generate encrypted content signature files (ECS files) in response to the request, and then provide the files to the (C) content provision devices (Content Servers) 103.

Note that a specific configuration and a generation process of the encrypted content signature files (ECS files) will be described in detail later.

The (C) content provision devices (Content Servers) 103 receive the encrypted content signature files (ECS files) from the (B) encrypted content signature (ECS) issuers (Encrypted Content Signature Issuers) 102, and then provide the files to the (D) user devices (Content reproduction devices) 104 together with encrypted content.

Before performing reproduction of the content, the (D) user devices (Content reproduction devices) 104 perform a signature verification process of the encrypted content signature files (ECS files), and decryption and reproduction of the content are permitted only when establishment of the signature verification process is confirmed.

Note that the user devices (Content reproduction devices) 104 store a reproduction processing program that follows a sequence for executing decryption and reproduction of the content under the condition of signature verification of the encrypted content signature files (ECS files), and according to the reproduction processing program, a content reproduction feasibility determination process such as the signature verification of the encrypted content signature files (ECS files) and content reproduction are executed.

For example, when the signature verification of the encrypted content signature files (ECS files) does not succeed, reproduction of the content is prohibited.

The (A) license issuer (LA) 101 provides the (B) encrypted content signature (ECS) issuers (Encrypted Content Signature Issuers) 102-1 to n with a license as an issuance permit for the ECS files.

The (A) license issuer (LA) 101 checks legitimacy of the (B) encrypted content signature (ECS) issuers (Encrypted Content Signature Issuers) 102-1 to n in a pre-defined sequence of issuing a license, and issues the license to the encrypted content signature (ECS) issuers when the legitimacy is confirmed.

Note that, to be specific, a license is a public key certificate to which a signature is given using, for example, a secret key of the license issuer (LA) 101. In the public key certificate, a public key of the encrypted content signature (ECS) issuers (Encrypted Content Signature Issuers) 102 is stored. Note that a secret key corresponding to the public key stored in the public key certificate is also provided to the encrypted content signature (ECS) issuers (Encrypted Content Signature Issuers) 102 from the (A) license issuer (LA) 101.

Next, a process executed between the following three devices will be described with referent to FIG. 8.

(A) License issuer (LA) 101

(B) Encrypted content signature (ECS) issuer (Encrypted Content Signature Issuer) 102

(C) Content provision device (Content Server) 103

Figure 8:
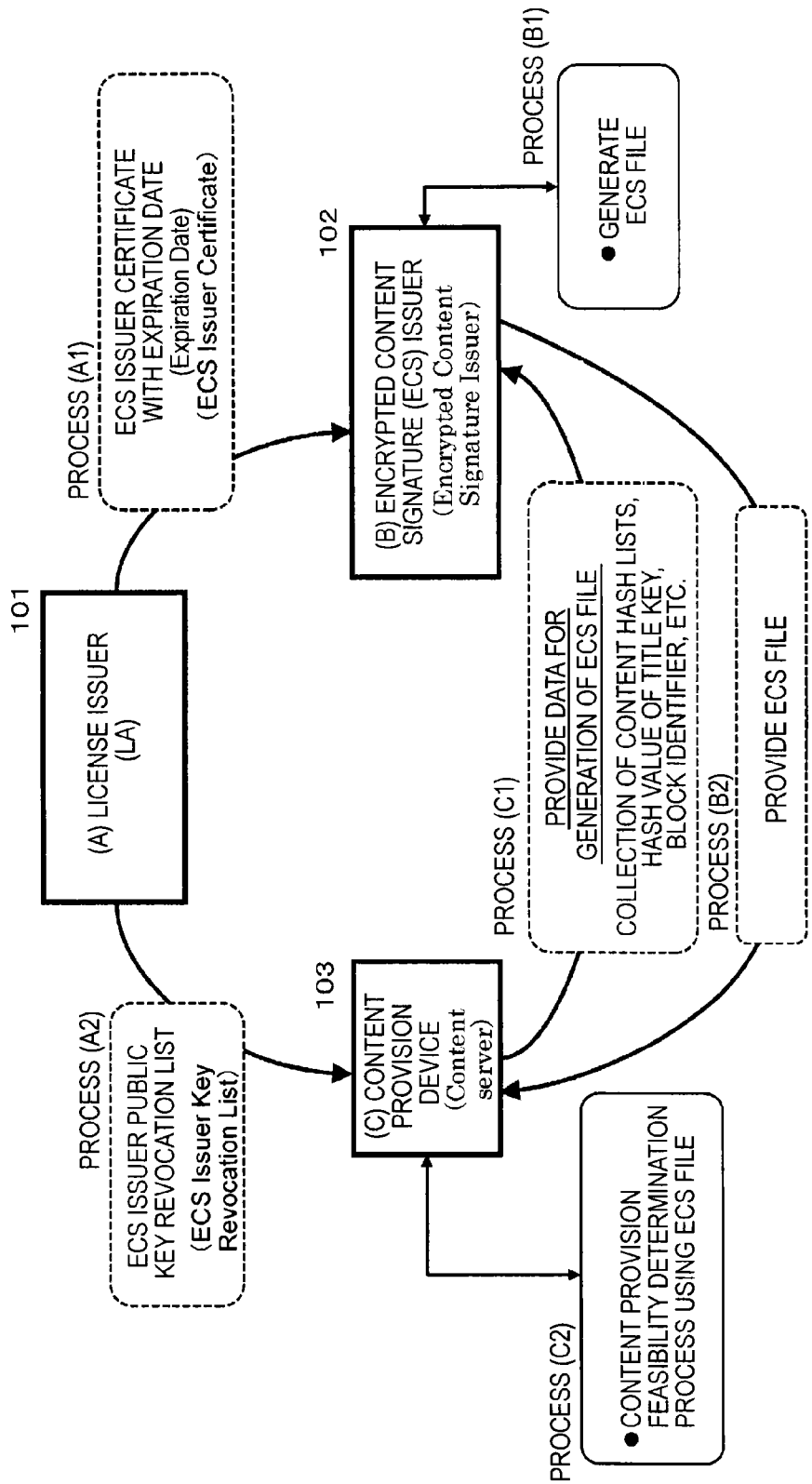
FIG. 8 is a diagram for describing a flow of data between devices applied to prevent an unauthorized content use.

FIG. 8 shows the three devices:

(A) License issuer (LA) 101;

(B) Encrypted content signature (ECS) issuer (Encrypted Content Signature Issuer) 102; and (C) Content provision device (Content Server) 103, and representative processes executed in each of the devices.

Processes executed by the license issuer (LA) 101 are indicated as processes (A1) and (A2).

The license issuer (LA) 101 executes the following processes.

Process (A1): Providing the encrypted content signature (ECS) issuer 102 with an ECS issuer certificate (ECS Issuer Certificate) having an expiration date (Expiration Date)

Process (A2): Providing the content provision device 103 with an ECS issuer certificate revocation list (ECS Issuer Key Revocation List)

Processes executed by the encrypted content signature (ECS) issuer 102 are indicated as processes (B1) and (B2).

The encrypted content signature (ECS) issuer 102 executes the following processes.

Process (B1): Generating an encrypted content signature file (ECS file: Encrypted Content Signature File)

Process (B2): Providing the encrypted content signature file (ECS file: Encrypted Content Signature File) to the content provision device 103

Processes executed by the content provision device 103 are indicated as processes (C1)) and (C2).

The content provision device 103 executes the following processes.

Process (C1): Providing the encrypted content signature (ECS) issuer 102 with data for generating ECS files. For example, providing collections of content hash lists, hash values of title keys, block identifiers, and the like.

Process (C2): Content provision feasibility determination process using an ECS file

[6. Regarding a Configuration Example of an ECS File]

Next, a configuration example of an ECS file generated by the encrypted content signature (ECS) issuer 102 will be described.

Figure 9:
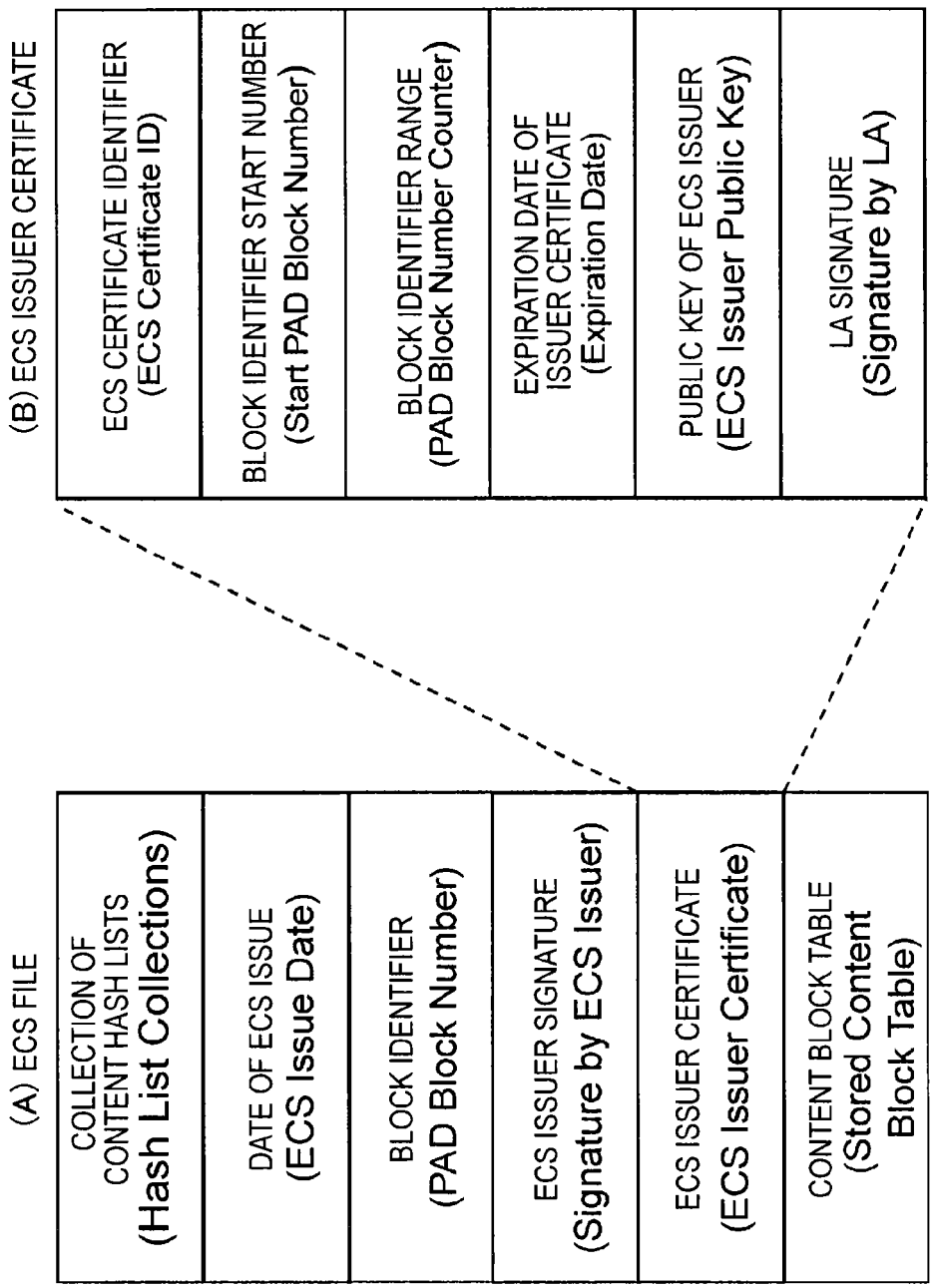
FIG. 9 is a diagram for describing a configuration example of an encrypted content signature file (ECS file).

FIG. 9 shows an ECS file and a data configuration example of an ECS issuer certificate that is also set as constituent data of the ECS file.

The ECS file is a file generated by the encrypted content signature (ECS) issuer 102, and a file in which a collection of content hash lists, a hash value of a title key, a block identifier, and the like received from the content provision device 103 are stored as constituent data.

As shown in (A) of FIG. 9, the ECS file is a file that includes the following elements.

(1) Collection of content hash lists (Hash list Collections)
(2) Date of ECS issue (ECS Issue Date)
(3) Block identifier (PAD Block Number)
(4) ECS issuer signature (Signature by ECS Issuer)
(5) ECS issuer certificate (ECS Issuer Certificate)
(6) Content block table (Stored Content Block Table)

The (1) collection of content hash lists (Hash List Collections) is data generated by the content provision device (Content Server) 103 and received by the encrypted content signature (ECS) issuer 102. The data is data that includes hash values generated based on constituent data of content generated based on content to be provided to the user device, specifically, content such as a movie or the like to be reproduced by the user device, and attribute information of the values (information of an offset, a length, and the like indicating a position of a content block and the like of a hash value generation source).

The (2) date of ECS issue (ECS Issue Date) is date information of when the encrypted content signature (ECS) issuer 102 generates an ECS file.

The date information corresponds to, for example, a generation date of (4) ECS issuer signature (ECS Signature).

The (3) block identifier (PAD Block Number) is data of which the content provision device (Content Server) 103 notifies the encrypted content signature (ECS) issuer 102, and is an identifier of a block of a protected area of a medium in which a title key that is an encryption key corresponding to content provided by the content provision device 103 to the user device 104 is stored. This is an identifier of a block in a protected area of a medium that can be used by the content provision device 103.

As previously described with reference to FIGS. 3 and 6, a block of a protected area of a medium that can be used by the content provision device is set in advance, and access permission block information thereof is recorded.

(4) ECS issuer signature (ECS Signature)

The ECS issuer signature (ECS Signature) is an electronic signature of the ECS issuer.

Signature target data is constituent data of the collection of content hash list, the date of ECS issue, the block identifier, the title key (hash value), and the like.

(5) ECS issuer certificate (ECS Issuer Certificate)

The ECS issuer certificate (ECS Issuer Certificate) is a public key certificate corresponding to the ECS issuer 102, in which a public key of the ECS issuer 102 and the like are stored as shown in (B) of FIG. 9. This configuration will be described later.

(6) Content block table (Stored Content Block Table)

The content block table (Stored Content Block Table) is set as fields in which correspondence information of each hash list and content is recorded when hash lists corresponding to a plurality of pieces of content are recorded in the collection of content hash lists (Hash List Collections).

Next, a data configuration of the ECS issuer certificate (ECS Issuer Certificate) shown in (B) of FIG. 9 will be described.

The ECS issuer certificate (ECS Issuer Certificate) is generated by the license issuer (LA) 101 and provided to the ECS issuer 102. The ECS issuer 102 requests generation of the ECS issuer certificate (ECS Issuer Certificate) while providing the license issuer (LA) 101 with data necessary for generating the ECS issuer certificate (ECS Issuer Certificate)

The license issuer (LA) 101 generates the ECS issuer certificate (ECS Issuer Certificate) according to the request.

As shown in (B) of FIG. 9, the ECS issuer certificate is a file that includes the following pieces of data.

(1) ECS certificate identifier (ECS Certificate ID)
(2) Block identifier start number (Start PAD Block Number)
(3) Block identifier range (PAD Block Number Counter)
(4) Expiration date of the issuer certificate (Expiration Date)
(5) Public key of the ECS issuer (ECS Issuer Public Key)
(6) LA signature (Signature by LA)

The (1) ECS certificate identifier (ECS Certificate ID) is an identifier of the ECS certificate.

The (2) block identifier start number (Start PAD Block Number) is a start number of access-permitted blocks of a protected area of a medium that the ECS issuer 102 can permit to the content provision device 103.

The (3) block identifier range (PAD Block Number Counter) is information indicating a range from the start number of the access-permitted blocks of the protected area of the medium that the ECS issuer 102 can permit to the content provision device 103.

The (4) expiration date of the issuer certificate (Expiration Date) is information of the expiration date of the issuer certificate.

The (5) public key of the ECS issuer (ECS Issuer Public Key) is a public key of the ECS issuer.

The (6) LA signature (Signature by LA) is an electronic signature of the license issuer (LA) shown in FIGS. 7 and 8. The signature is an electronic signature generated based on the constituent data of No. (1) to (5) of the ECS issuer certificate.

Figure 10:
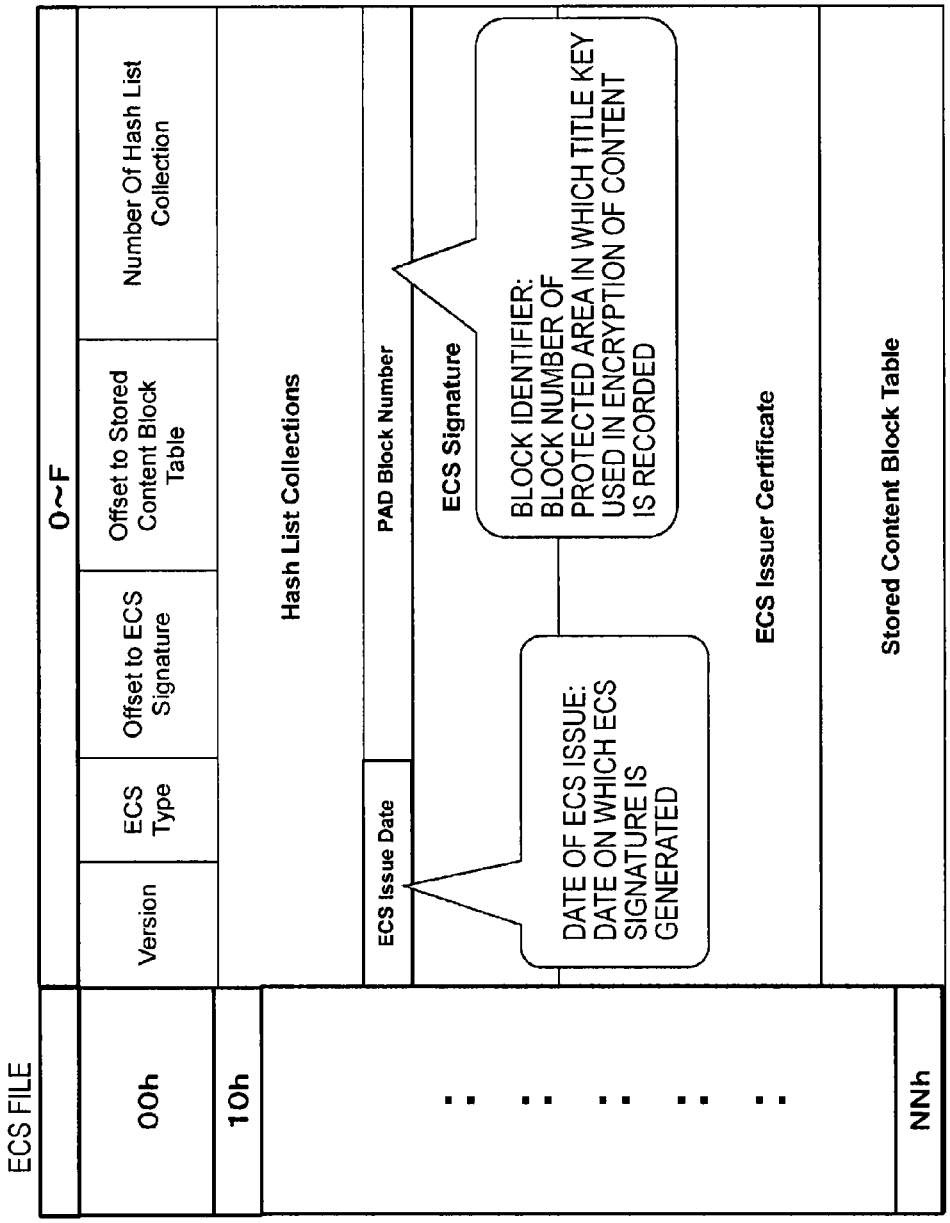
FIG. 10 is a diagram for describing another configuration example of the encrypted content signature file (ECS file).

FIG. 10 is a diagram showing syntax of the ECS file, and FIG. 11 is a diagram showing syntax of the ECS issuer certificate.

Note that the following two pieces of data recorded in the ECS issuer certificate, which are:

(2) block identifier start number (Start PAD Block Number); and (3) block identifier range (PAD Block Number Counter), are information indicating the access-permitted block of the protected area of the medium that the ECS issuer 102 can permit to the content provision device 103 as described above.

To be specific, it is equivalent to the fact that, for example, all values satisfying the condition of the block identifier start number≤N≤the block identifier start number+the block identifier range are set as block identifiers.

In addition, a setting of the block identifier start number=0xFFFFFFFF indicates that all blocks of the protected area of the medium are access-permitted blocks.

Note that, although the example described with reference to FIGS. 9 to 11 has been described as the configuration in which the ECS file includes the ECS issuer certificate, the ECS file may not include the ECS issuer certificate and the ECS file and the ECS issuer certificate may also be configured as individual files.

[7. Regarding a Configuration of an ECS Issuer Certificate Revocation List]

Next, a configuration of the ECS issuer certificate revocation list will be described with reference to FIG. 12.

The ECS issuer certificate revocation list (ECS Issuer Key Revocation List) is a list issued by the license issuer (LA) 101 as previously described with reference to FIG. 8. This list is used in, for example, the content provision device 103.

The license issuer (LA) 101 generates the ECS issuer certificate revocation list as a list obtained by nullifying the ECS issuer certificate (see (B) of FIG. 9) in which the public key of the ECS issuer determined to be unauthorized is stored and registering an identifier (ID) of the nullified ECS issuer (specifically, ECS issuer certificate).

As shown in FIG. 12, the ECS issuer certificate revocation list stores the following pieces of data.

(1) Version (Version)
(2) Number of entries (Number of entries)
(3) ID of the revoked (nullified) ECS issuer certificate
(4) Date of revocation of the revoked (nullified) ECS issuer certificate
(5) Electronic signature of the license issuer (LA) 101

The (5) electronic signature of the license issuer (LA) 101 is a signature for the data of No. (1) to (4).

Note that, with regard to the ECS issuer certificate revocation list, when an unauthorized ECS issuer is newly found, an updated list of a new version to which the ID of the ECS issuer is added is sequentially issued, and provided to the content provision device 103.

[8. Regarding a Generation Process of an Encrypted Content Signature File (ECS File)]

Next, a generation process of the encrypted content signature file (ECS file) will be described with reference to FIG. 13.

The encrypted content signature file (ECS file) is generated by the encrypted content signature (ECS) issuer (Encrypted Content Signature Issuer) 102 based on a request for the generation from the content provision device (Content Server) 103.

When the content provision device (Content Server) 103 provides the user device 104 with content, for example, new movie content or the like, the request for the generation of an encrypted content signature file (ECS file) corresponding to the content is made to the encrypted content signature (ECS) issuer (Encrypted Content Signature Issuer) 102.

The encrypted content signature (ECS) issuer (Encrypted Content Signature Issuer) 102 generates the encrypted content signature file (ECS file) in response to the request, and provides the content provision device (Content Server) 103 with the encrypted content signature file.

FIG. 13 is a diagram for describing a process executed by the content provision device (Content Server) 103 and the encrypted content signature (ECS) issuer (Encrypted Content Signature Issuer) 102 in the generation process of the encrypted content signature file (ECS file).

When a request for generation of a new encrypted content signature file (ECS file) is made, the content provision device (Content Server) 103 generates a collection of content hash lists (Hash List Collections) 183 that includes hash values generated based on constituent data (content blocks) of content 181 as shown in FIG. 13.

Note that the collection of content hash lists (Hash List Collections) 183 is generated as a collection of content hash lists in which the hash values generated based on the constituent data (content blocks) of the encrypted content to be provided to the user device 104 are stored.

The content provision device (Content Server) 103 provides the encrypted content signature (ECS) issuer (Encrypted Content Signature Issuer) 102 with the generated collection of content hash lists (Hash List Collections) 183.

Furthermore, a title key 182 that is an encryption key applied to encryption of the content 181 or a hash value of the title key is provided to the encrypted content signature (ECS) issuer (Encrypted Content Signature Issuer) 102.

The collection of content hash lists (Hash List Collections) 183 is data that includes hash values generated based on the constituent data of content generated based on content to be provided to the user device, specifically, content such as a movie or the like to be reproduced in the user device and attribute information of the hash values.

Note that the attribute information includes, for example, attribute information of position information of the content blocks for which the hash values are computed and the like.

In Step S11 shown in FIG. 13, the encrypted content signature (ECS) issuer (Encrypted Content Signature Issuer) 102 generates a signature for data received from the content provision device (Content Server) 103 and the constituent data of the ECS file, to be specific, for example, the following data:

the collection of content hash lists;
the date of ECS issue;
the block identifier; and
the title key (hash).

With regard to the generation of the signature data, the signature is generated by applying a secret key retained by the encrypted content signature (ECS) issuer (Encrypted Content Signature Issuer) 102. For example, signature generation according to an ECDSA algorithm is performed.

The generated signature is set as constituent data of an encrypted content signature file (ECS file) as shown in FIG. 13.

As previously described with reference to FIG. 9, the encrypted content signature file (ECS file) 200 generated by the encrypted content signature (ECS) issuer (Encrypted Content Signature Issuer) 102 has the following pieces of data as constituent data.

(1) Collection of content hash list (Hash List Collections)
(2) Date of ECS issue (ECS Issue Date)
(3) Block identifier (PAD Block Number)
(4) ECS issuer signature (Signature by ECS Issuer)
(5) ECS issuer certificate (ECS Issuer Certificate)
(6) Content block table (Stored Content Block Table)

The encrypted content signature file is a file in which the above data is included.

[9. Regarding a Process to which an ECS File and Date Information of an ECS Issuer Certificate are Applied]

Next, a process to which an ECS file and date information of an ECS issuer certificate are applied will be described.

As described with reference to FIG. 9, various kinds of date information are recorded in the following data:

(1) ECS file generated by the ECS issuer 102 and provided to the content provision device; and (2) ECS issuer certificate generated by the license issuer (LA) 101 and provided to the ECS issuer 10.

For example, in the ECS file, the date of ECS issue (ECS Issue Date) is recorded.

In addition, in the ECS issuer certificate, the expiration date of the issuer certificate (Expiration Date) is recorded.

The content provision device 103 executes a process of determining feasibility of a content provision process with respect to the user device 104 by applying the date information recorded in the ECS file and the ECS issuer certificate or the ECS issuer certificate revocation list previously described with reference to FIG. 12.

In addition, the user device that receives the content from the content provision device 103 also executes a process of determining feasibility of content reproduction in the user device 104 by applying the date information recorded in the ECS file and the ECS issuer certificate or the ECS issuer certificate revocation list previously described with reference to FIG. 12.

Hereinafter, the processes will be described.

First, process sequences of generation of the encrypted content signature file (ECS file), and provision and use of the content will be described with reference to sequence diagrams shown in FIGS. 14 and 15.

First, FIG. 14 shows the devices from the left which are:
the license issuer 101;
the encrypted content signature (ECS) issuer 102; and
the content provision device 103, and
shows processes of Step S111 and Steps S121 to S128 as a time series process.

Each step of the processes will be described.

Step S111

Step S111 is a process of the license issuer 101 issuing a license (ECS issuer certificate) to the encrypted content signature (ECS) issuer 102.

As previously described with reference to FIG. 8 and so on, the license issuer 101 provides the encrypted content signature (ECS) issuer 102 with the license as an issuance permit for the ECS file, i.e., the ECS issuer certificate.

The license issuer (LA) 101 checks legitimacy of the encrypted content signature (ECS) issuer 102 according to a pre-defined license issuing sequence, and issues the ECS issuer certificate to the encrypted content signature (ECS) issuer when the legitimacy is confirmed.

The ECS issuer certificate is a public key certificate with the data configuration described with reference to (B) of FIG. 9. In the ECS issuer certificate, a public key of the encrypted content signature (ECS) issuer (Encrypted Content Signature Issuer) 102 is stored. Note that a secret key corresponding to the public key stored in the ECS issuer certificate is also provided to the encrypted content signature (ECS) issuer (Encrypted Content Signature Issuer) 102 from the (A) license issuer (LA) 101.

Steps S121 to S124 are a sequence of the generation process of the encrypted content signature file (ECS file) described with reference to FIG. 13.

When the content provision device 103 provides the user device with, for example, new content, the processes are sequentially executed according to the provided content in order to acquire the encrypted content signature file (ECS file) corresponding to the new content.

The processes are executed between the encrypted content signature (ECS) issuer 102 and the content provision device 103.

First, in Step S121, the content provision device 103 generates data necessary for creating the encrypted content signature file (ECS file).

To be specific, the process of generating the collection of content hash lists (Hash List Collections) 183 and the like described with reference to FIG. 13 is executed.

As described above, the collection of content hash lists (Hash List Collections) is data that includes hash values generated based on constituent data of content generated based on content to be provided to the user device, specifically, content such as a movie or the like to be reproduced by the user device and attribute information of the values.

The attribute information includes, for example, attribute information of position information of the content blocks for which the hash values are computed and the like.

Note that the content provision device 103 also generates a title key or a hash value of the title key applied to encryption and decryption processes of the content as data to be provided to the encrypted content signature (ECS) issuer 102.

Next, the content provision device 103 transmits the generated data to the encrypted content signature (ECS) issuer 102 to request generation and transmission of the encrypted content signature file (ECS file) in Step S122.

Next, in Step S123, the encrypted content signature (ECS) issuer 102 performs a signature generation process with respect to the data received from the content provision device 103.

In other words, the ECS issuer executes the signature generation process of Step S11 described with reference to FIG. 13.

Furthermore, the encrypted content signature file (ECS file) with the data configuration previously described in (A) of FIG. 9 is generated, and in Step S124, the generated encrypted content signature file (ECS file) is transmitted to the content provision device 103.

As previously described with reference to (A) of FIG. 9, the encrypted content signature file (ECS file) or the ECS file includes the following pieces of data.

(1) Collection of content hash list (Hash List Collections)
(2) Date of ECS issue (ECS Issue Date)
(3) Block identifier (PAD Block Number)
(4) ECS issuer signature (Signature by ECS Issuer)
(5) ECS issuer certificate (ECS Issuer Certificate)
(6) Content block table (Stored Content Block Table)

The content provision device 103 that has received the encrypted content signature file (ECS file) executes a content provision feasibility determination process of determining whether or not content provision to which the encrypted content signature file (ECS file) is applied should be permitted in Step S125.

When the content provision is determined to be permitted in Step S126, a content provision process to the user device is executed in Step S127.

When the content provision is determined not to be permitted in Step S126, the process proceeds to Step S128, and the content provision process stops.

Note that the processes of Steps S125 to S128 will be described in more detail later with reference to FIG. 16 and succeeding drawings.

Next, a sequence of content provision from the content provision device 103 to the user device 104 and content reproduction in the user device 104 will be described with reference to FIG. 15.

Figure 15:
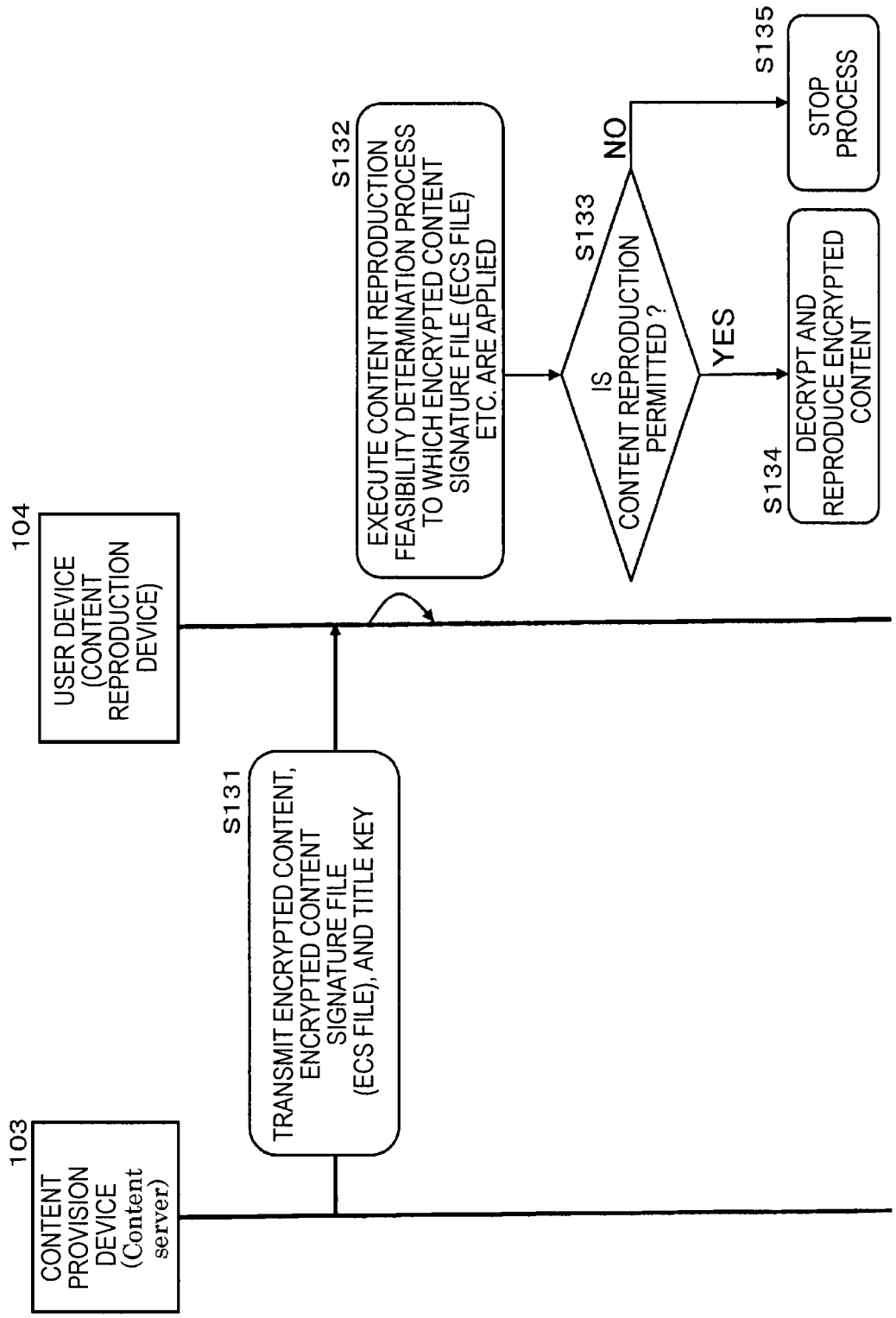
FIG. 15 is a sequence diagram for describing the processing sequence of generation of the encrypted content signature file (ECS file), and provision and use of content.

FIG. 15 shows the content provision device 103 and the user device 104 from the left.

First, the content provision device 103 transmits the following pieces of data to the user device in Step S131:

(1) the encrypted content;
(2) the encrypted content signature file (ECS file); and
(3) the title key.

Note that, as a pre-process of Step S131, for example, a content transmission request from the user device 104 to the content provision device 103 is assumed to be made. The content provision device 103 provides the content according to the request from the user device.

Note that (1) the encrypted content that the content provision device 103 transmits in Step S131 is content encrypted using "(3) the title key" set corresponding to the content.

In addition, (2) the encrypted content signature file (ECS file) is a file generated corresponding to (1) the encrypted content, in which the constituent data of the encrypted content signature file (ECS file) previously described with reference to FIG. 9 is stored.

The user device 104 receives and stores the data in, for example, a medium such as a hard disk.

Then, when the reproduction process of the content is executed, the processes of Step S132 and thereafter shown in FIG. 15 are executed.

The user device 104 reads the encrypted content signature file (ECS file) corresponding to the content to be reproduced in Step S132, and then executes the content reproduction feasibility determination process of whether or not the content reproduction should be permitted by applying the encrypted content signature file (ECS file).

When the content reproduction is determined to be permitted in Step S133, the content reproduction process is executed in Step S134.

When the content reproduction is determined not to be permitted in Step S133, the process proceeds to Step S135, and the content reproduction process stops.

Note that the processes of Steps S132 to S135 will be described in more detail later with reference to FIG. 18.

Next, a detailed sequence of the processes of Steps S125|S128 performed in the content provision device described with reference to FIG. 14, in other words, the content provision feasibility determination process to which the encrypted content signature file (ECS file) is applied, will be described with reference to the flowcharts shown in FIGS. 16 and 17.

Figure 16:
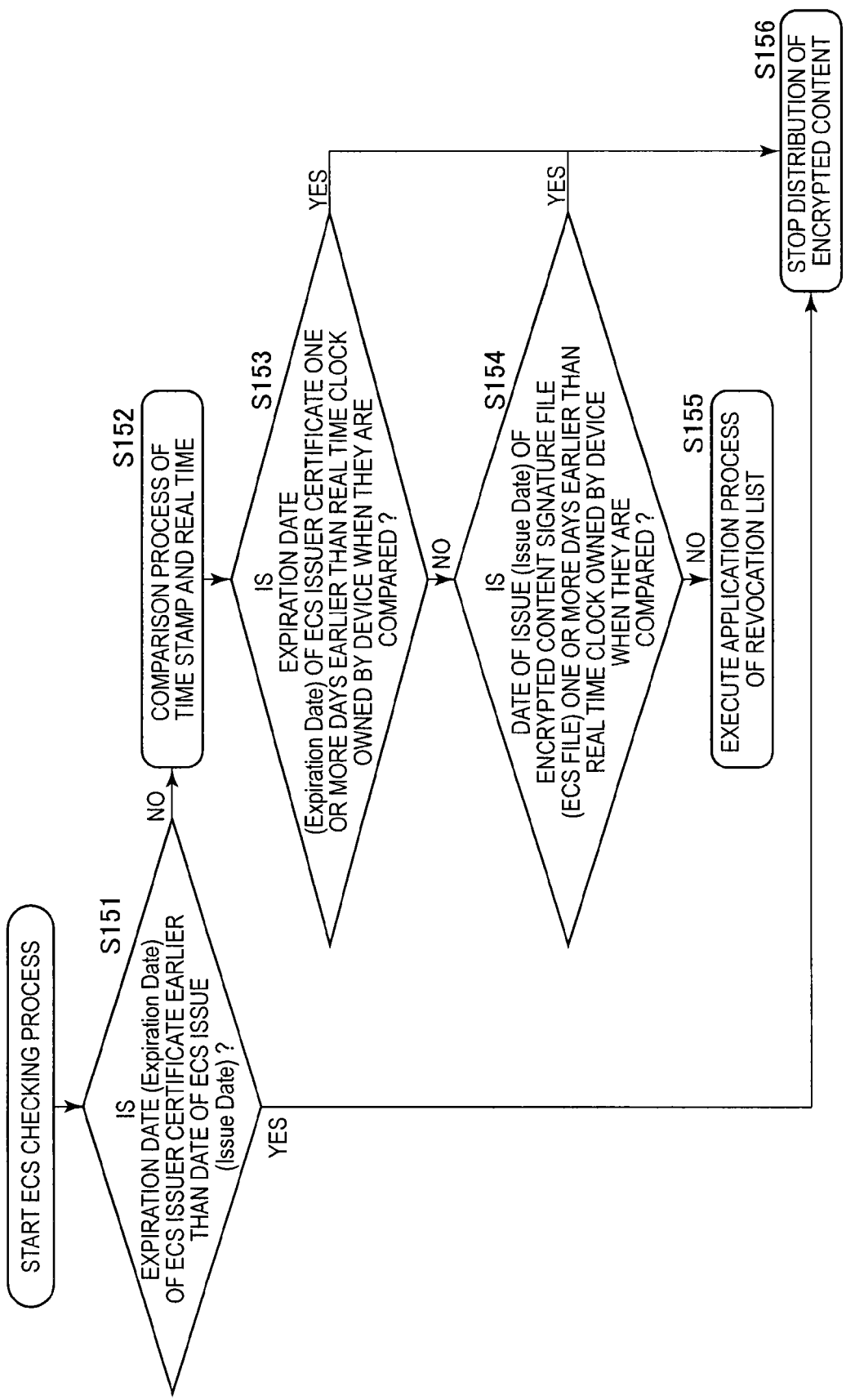
FIG. 16 is a diagram showing a flowchart describing a content provision feasibility determination process to which date data recorded in the encrypted content signature file (ECS file) is applied.
Figure 17:
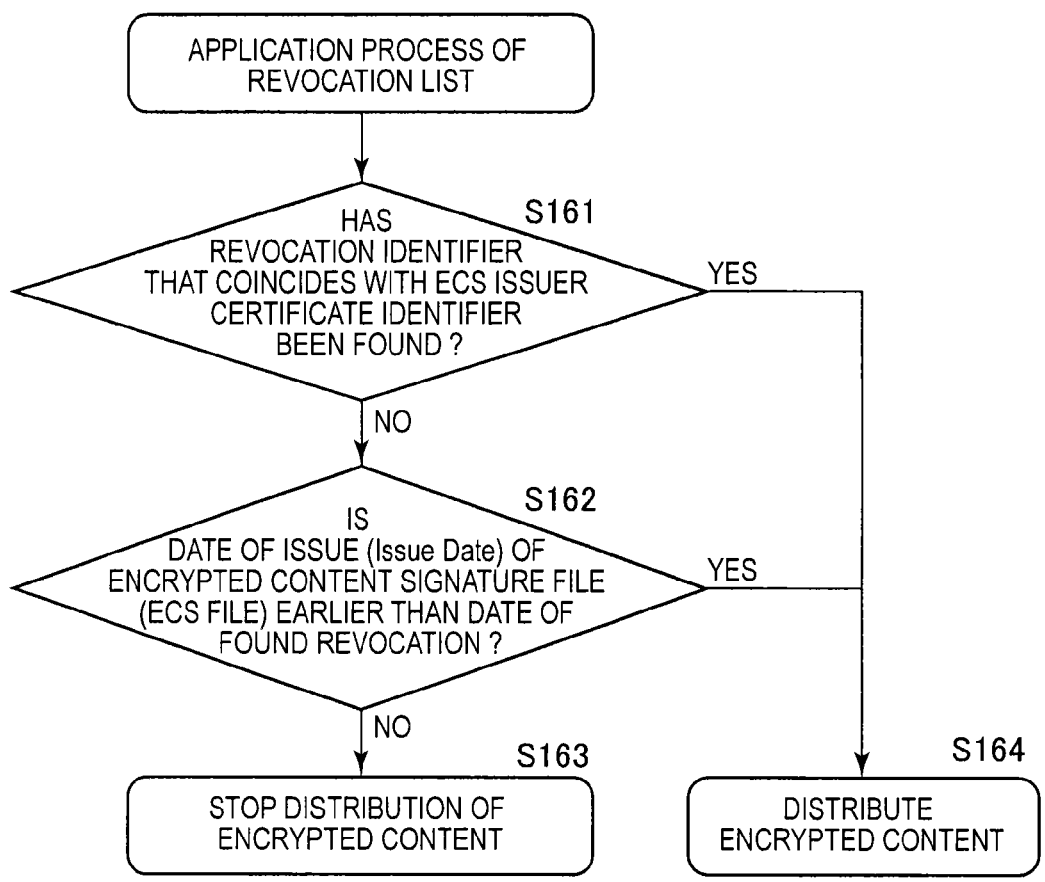
FIG. 17 is a diagram showing a flowchart describing another content provision feasibility determination process to which date data recorded in the encrypted content signature file (ECS file) is applied.

As a pre-process of Step S151 of the flowchart shown in FIG. 16, the content provision device executes signature verification to which the ECS issuer signature set in the encrypted content signature file (ECS file) received from the encrypted content signature file (ECS file) issuer is applied.

When the signature verification is established and legitimacy of the encrypted content signature file (ECS file) is confirmed, verification of the signature of the ECS issuer certificate stored in the encrypted content signature file (ECS file) is further executed. Under the condition that the two times of signature verification have been established, the process of Step S151 and succeeding processes are performed.

When at least one of the two times of signature verification is not established, legitimacy of the encrypted content signature file (ECS file) or the ECS issuer certificate is not confirmed, and thus the process of Step S151 and the succeeding processes are not executed. In this case, a content provision process is not executed either.

When the two times of signature verification for the encrypted content signature file (ECS file) and the ECS issuer certificate are established, and thus legitimacy of the encrypted content signature file (ECS file) and the ECS issuer certificate is confirmed, the content provision device executes the process of Step S151.

The content provision device reads the date of ECS issue (ECS Issue Date) that is recorded data of the encrypted content signature file (ECS file). Furthermore, the expiration date of the ECS issuer certificate (Expiration Date) that is recorded data of the ECS issuer certificate is read.

Furthermore, the date information is compared to determine whether or not the expiration date of the ECS issuer certificate (Expiration Date) is earlier than the date of ECS issue (ECS Issue Date).

When the expiration date of the ECS issuer certificate (Expiration Date) is earlier than the date of ECS issue (ECS Issue Date) (Yes), the process proceeds to Step S156, and distribution of the encrypted content is halted.

When the expiration date of the ECS issuer certificate (Expiration Date) is not earlier than the date of ECS issue (ECS Issue Date) (No), the process proceeds to Step S152, and the content provision feasibility determination process to which the date information (time stamp) recorded in the encrypted content signature file (ECS file) and the ECS issuer certificate is applied in Step S153 and thereafter starts.

In Step S153, the expiration date of the ECS issuer certificate (Expiration Date) is compared to a time clock owned by the content provision device or a real time acquired from a reliable time information provision server.

When the expiration date of the ECS issuer certificate (Expiration Date) is one or more days earlier than the real time, the process proceeds to Step S156, and the content provision process stops.

On the other hand, when the expiration date of the ECS issuer certificate (Expiration Date) is not one or more days earlier than the real time, the process proceeds to Step S154.

In Step S154, the date of ECS issue (ECS Issue Date) is compared to the time clock owned by the content provision device or a real time acquired from a reliable time information provision server.

When the date of ECS issue (ECS Issue Date) is one or more days earlier than the real time, the process proceeds to Step S156, and the content provision process stops.

On the other hand, when the date of ECS issue (ECS Issue Date) is not one or more days earlier than the real time, the process proceeds to Step S155.

Next, the content provision feasibility determination process to which a revocation list is applied executed in Step S155 and thereafter will be described with reference to the flowchart shown in FIG. 17.

Note that the content provision device is assumed to have acquired the ECS issuer public key revocation list described before with reference to FIG. 12. The list can be acquired from, for example, the license issuer (LA) 101.

The content provision device acquires an ECS certificate identifier from the ECS issuer certificate in Step S161, and then determines whether or not the identifier (ID) has been registered in the ECS issuer public key revocation list.

When the identifier has not been registered (No), the ECS issuer certificate is confirmed to be valid rather than to be nullified (revoked), and in this case, the process proceeds to Step S164, and the content provision process is executed.

On the other hand, when the ECS certificate identifier (ID) is determined to have been registered in the ECS issuer public key revocation list in Step S161 (Yes), the process proceeds to Step S162 in this case.

In Step S162, two pieces of date data which are the date when the ECS issuer certificate registered in the ECS issuer public key revocation list is nullified (revoked), i.e., the date of revocation, and the date of ECS issue (ECS Issue Date) that is the recorded data of the encrypted content signature file (ECS file) are compared to each other.

When the date of ECS issue (ECS Issue Date) that is the recorded data of the encrypted content signature file (ECS file) is earlier than the date of revocation (Yes), the process proceeds to Step S164, and the content provision process is executed.

This is because the process can be determined to be a process based on the authorized ECS issuer certificate before revocation.

On the other hand, when the date of ECS issue (ECS Issue Date) that is the recorded data of the encrypted content signature file (ECS file) is not earlier than the date of revocation in Step S162 (No), the process proceeds to Step S163, and the content provision process stops.

This is because the process can be determined to be a process based on the unauthorized ECS issuer certificate after revocation.

Next, details of the content reproduction permission determination process of the user device 104 to which the encrypted content signature file (ECS file) is applied as previously described with reference to Steps S132 to S135 of FIG. 14 will be described with reference to FIG. 18.

Figure 18:
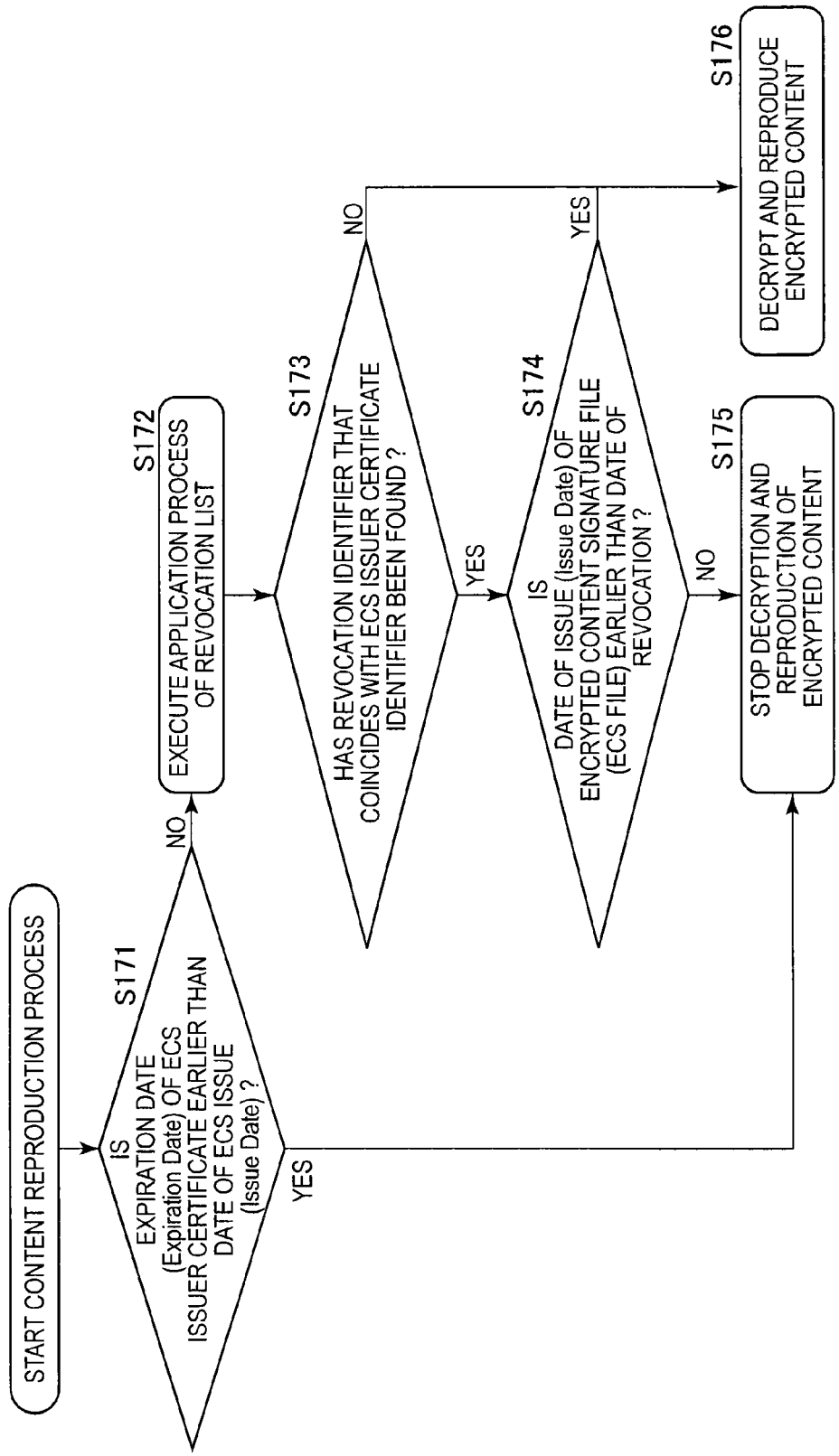
FIG. 18 is a diagram showing a flowchart describing a content reproduction feasibility determination process to which date data recorded in the encrypted content signature file (ECS file) is applied.

Note that, before Step S171 shown in FIG. 18, the user device executes signature verification to which the ECS issuer signature set in the encrypted content signature file (ECS file) received from the content provision device is applied.

When the signature verification is established and legitimacy of the encrypted content signature file (ECS file) is confirmed, verification of the signature of the ECS issuer certificate stored in the encrypted content signature file (ECS file) is further executed. Under the condition that the two times of signature verification have been established, the process of Step S171 and succeeding processes are performed.

When at least one of the two times of signature verification has not been established, legitimacy of the encrypted content signature file (ECS file) or the ECS issuer certificate is not confirmed, and thus the process of Step S171 and succeeding processes are not performed. In this case, a content reproduction process is not performed either.

When the two times of signature verification for the encrypted content signature file (ECS file) and the ECS issuer certificate are established and legitimacy of the encrypted content signature file (ECS file) and the ECS issuer certificate is confirmed, the user device executes the process of Step S171.

In Step S171, the user device reads the date of ECS issue (ECS Issue Date) that is recorded data of the encrypted content signature file (ECS file). Furthermore, the user device reads the expiration date of the ECS issuer certificate (Expiration Date) that is recorded data of the ECS issuer certificate.

Furthermore, the date information is compared to determine whether or not the expiration date of the ECS issuer certificate (Expiration Date) is earlier than the date of ECS issue (ECS Issue Date).

When the expiration date is earlier (Yes), the process proceeds to Step S175, and decryption and reproduction processes of the content are not executed.

This is because the certificate is confirmed to be an ECS issuer certificate of which the term of validity has already expired.

On the other hand, when the expiration date of the ECS issuer certificate (Expiration Date) is not earlier than the date of ECS issue (ECS Issue Date) in Step S171 (No), the process proceeds to Step S172, and the content provision feasibility determination process to which the revocation list is applied is performed in Step S173 and thereafter.

Note that the user device is assumed to have acquired the ECS issuer public key revocation list described before with reference to FIG. 12. The list can be acquired from, for example, the license issuer (LA) 101.

The user device acquires an ECS certificate identifier from the ECS issuer certificate in Step S173, and determines whether or not the identifier (ID) has been registered in the ECS issuer public key revocation list.

When the ID has not been registered (No), the ECS issuer certificate is confirmed to be valid rather than to be nullified (revoked), and in this case, the process proceeds to Step S176, and the content reproduction process is executed.

Note that, before the start of the content reproduction process, acquisition and generation processes of a title key to be applied to decryption of the encrypted content and a hash value collation process to which a content hash list included in the encrypted content signature file is applied are further executed. When the collation is established in the hash value collation and non-tampering of the content is confirmed, reproduction of the content is permitted.

On the other hand, when the ECS certificate identifier (ID) is determined to have been registered in the ECS issuer public key revocation list in Step S173 (Yes), the process proceeds to Step S174 in this case.

In Step S174, two pieces of date data which are the date when the ECS issuer certificate registered in the ECS issuer public key revocation list is nullified (revoked), i.e., the date of revocation, and the date of ECS issue (ECS Issue Date) that is the recorded data of the encrypted content signature file (ECS file) are compared to each other.

When the date of ECS issue (ECS Issue Date) that is the recorded data of the encrypted content signature file (ECS file) is earlier than the date of revocation (Yes), the process proceeds to Step S176, and the content reproduction process is executed.

This is because the process can be determined to be a process based on the authorized ECS issuer certificate before revocation.

On the other hand, when the date of ECS issue (ECS Issue Date) that is the recorded data of the encrypted content signature file (ECS file) is not earlier than the date of revocation in Step S173 (No), the process proceeds to Step S175, and the content reproduction process stops.

This is because the process can be determined to be a process based on the unauthorized ECS issuer certificate after revocation.

[10. Regarding a Configuration of Association of an Encryption Key and an ECS Issuer Signature]

Next, a configuration of association of an encryption key and an ECS issuer signature will be described.

First, content and the like are recorded in a memory card or the like configured by, for example, a flash memory so as to be used in the user device 104 as described with reference to FIGS. 3 and 6.

As described with reference to FIG. 3, the storage area of the memory card 31 includes the following two areas:
(a) protected area (Protected Area) 51; and
(b) general-purpose area (General Purpose Area) 52.

The (b) general-purpose area (General Purpose Area) 52 is an area that a recording and reproduction device used by a user can freely access, in which content, use control information (Usage Rule) corresponding to the content, other general content management data and the like are recorded.

The general-purpose area (General Purpose Area) 52 is an area in which, for example, a server or a recording and reproduction device of a user can freely perform data writing and reading.

On the other hand, the (a) protected area (Protected Area) 51 is an area to which free access is not permitted.

The protected area (Protected Area) 51 is divided into blocks (#0, #1, #2, . . . ) as a plurality of segmented areas, and access rights are set in units of blocks.

For example, when data writing or reading is attempted to be performed by a recording and reproduction device used by a user, a server connected via a network, or the like, the data processing unit of the memory card 31 decides feasibility of reading (Read) or writing (Write) in units of blocks for each device according to the program stored in the memory card 31 in advance.

The memory card 31 has the data processing unit for executing the program stored in advance and an authentication processing unit that executes an authentication process, and the memory card 31 first performs the authentication process with respect to a device that attempts to execute data writing or reading on the memory card 31.

In the stage of the authentication process, a device certificate such as the public key certificate is received from a counterpart device, i.e., an access requesting device.

When the access requesting device is a server, for example, the server certificate (Server Certificate) retained by the server which has been described with reference to FIG. 5 is received, and using information described in the certificate, it is determined whether or not access should be permitted in units of blocks (segmented areas) of the protected area (Protected Area) 51.

In addition, when the access requesting device is a host device that is, for example, a recording and reproduction device (host) serving as a user device that executes recording and reproduction of content, the host certificate (Host Certificate) retained by the recording and reproduction device (host) which has been described with reference to FIG. 4 is received, and using information described in the certificate, it is determined whether or not access to each block (segmented area) of the protected area (Protected Area) 51 should be permitted.

This access right determination process is performed in units of blocks (areas #0, #1, #2, . . . shown in FIG. 3) within the protected area (Protected Area) 51 shown in the drawing. The memory card 31 allows the server or the host to execute only a process (process of data reading, writing, or the like) permitted in units of blocks.

A data recording configuration example of when the user device 104 is loaded with a medium and records content received from the content provision device 103 will be described with reference to FIG. 19.

Figure 19:
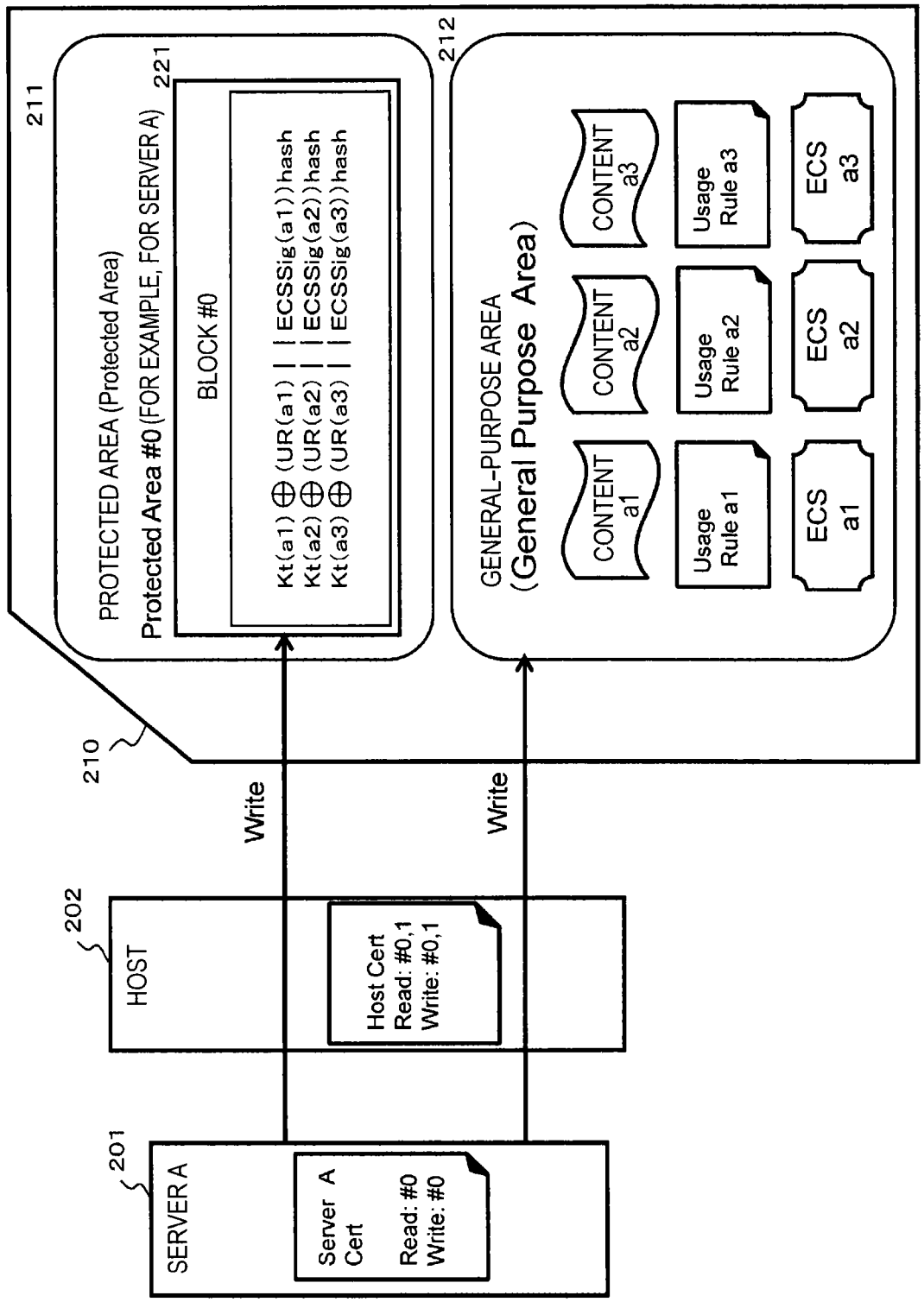
FIG. 19 is a diagram for describing an example of a data recording process performed by a server with respect to a memory card.

FIG. 19 shows a process example in which a server A 201 serving as a content provision device provides and records encrypted content to and on a memory card 210 loaded in a host 202 serving as a user device.

The memory card 210 has the following areas:
a protected area (protected Area) 211; and
a general-purpose area (General Purpose Area) 212.

The server A 201 as a content provision device records title keys to be applied to encryption and decryption of provided content in a predetermined block of the protected area (Protected Area) at the time of an encrypted content provision process.

The server A 201 retains the server certificate (Server Certificate) as previously referred to in FIG. 5.

First, the server A 201 executes a mutual authentication process with the memory card 210. At this time, the server certificate is output to the memory card 210.

The memory card 210 checks protected area access right information recorded in the server certificate received from the server A 201.

In the checking process, the server A 201 can perform data writing on the block #0 of the protected area 211 set in the memory card 210 only when the server A 201 is determined to have an access right to the block #0 (right to write).

As shown in the drawing, the server A 201 stores the title keys applied to decryption of the provided content in the block #0 221 of the protected area (Protected Area) 211.

Note that, rather than storing the title keys as they are, the protected area stores results of arithmetic operations of exclusive OR for the title keys Kt and hash values of connected data of (a) and (b) which are:
(a) use control information (UR: Usage Rule); and
(b) ECS issuer signature (Signature by ECS Issuer) that is constituent data of the ECS file described with reference to FIG. 9.

For example, a title key of Kt (a1) with regard to content (a1) is stored in the protected area as the following title key conversion data.

$$Kt(a1)(+)(UR(a1)\|ECSSig(a1))hash$$

Wherein, the elements have the following meanings.
UR (a1): Use control information corresponding to the content a1
ECSSig (a1): ECS issuer signature (Signature by ECS Issuer) that is constituent data of the ECS file corresponding to the content a1
In addition, the operational symbols have the following meanings.
(+): Arithmetic operation of exclusive OR
∥: Connection of data
a∥b: Connected data of data a and data b
hash: Hash value
(a∥b) hash: Hash value of connected data of data a and data b In the example shown in FIG. 19, the server A records content, user control information, and ECS files as follows in the general-purpose area (General Purpose Area) 212 of the memory card.
Content: Con (a1), Con (a2), Con (a3)
Use control information (Usage Rule) corresponding to the content: UR (a1), UR (a2), UR (a3)
ECS files (ECS File) corresponding to the content: ECS (a1), ECS (a2), ECS (a3)
The set of the content, the use control information, and the ECS files is recorded.

Furthermore, the server A records the following data in the block #0 221 of the protected area (Protected Area) 211 of the memory card.
The title keys corresponding to the content
Results of arithmetic operations of exclusive OR (XOR) with hash values of the connected data of the use control information (Usage Rule) corresponding to the content and the ECS issuer signatures (ECSSig)

$$Kt(a1)(+)(UR(a1)\|ECSSig(a1))\text{hash}$$

$$Kt(a2)(+)(UR(a2)\|ECSSig(a2))\text{hash}$$

$$Kt(a3)(+)(UR(a3)\|ECSSig(a3))\text{hash}$$

Note that a process example of the server A 201 is shown in FIG. 19; however, a different server B, for example, stores title key conversion data the same as content provided by the server B, such as the following data, in a predetermined block, for example, the block #1 of the protected area (Protected Area) which has been permitted as a storage area of title keys corresponding to content (bx) provided by the server B.

$$Kt(bx)(+)(UR(bx)\|ECSSig(bx))\text{hash}$$

Figure 20:
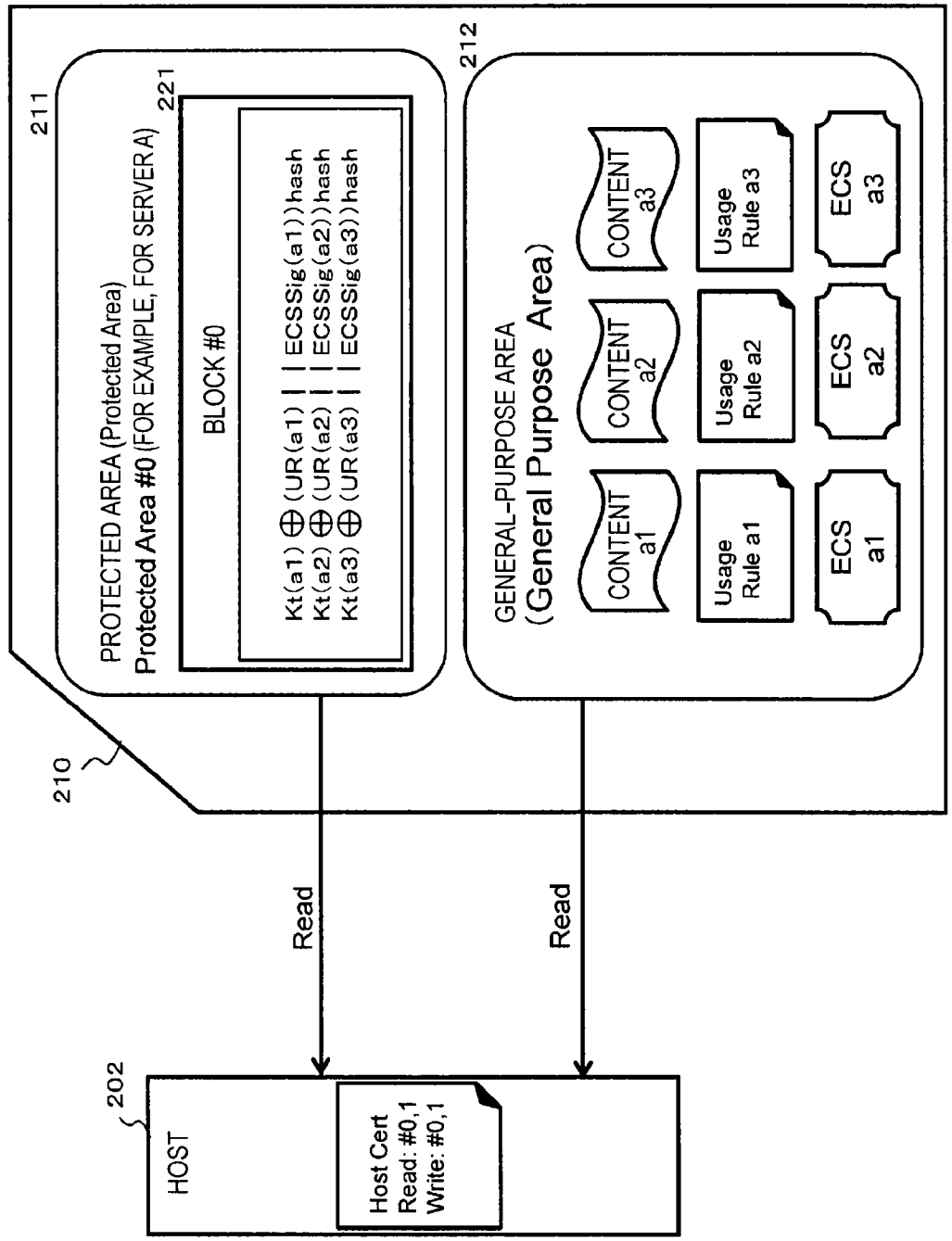
FIG. 20 is a diagram for describing an example of a reading process performed by a host with regard to recorded data of the memory card.

FIG. 20 shows the user device (host) 202 that uses content and the memory card 210 in which the content and the like are stored.

The user device (host) 202 retains the host certificate (Host Certificate) previously referred to in FIG. 4.

First, the user device (host) 202 executes a mutual authentication process with the memory card 210. At this moment, the host certificate is output to the memory card 210.

The memory card 210 checks protected area access right information recorded in the host certificate received from the user device (host) 202.

In the checking process, the user device (host) 202 can perform data reading from the block #0 of the protected area 211 set in the memory card 210 only when the user device (host) 202 is determined to have an access right to (right to read) the block #0.

After the mutual authentication and checking of the access right are completed, the user device (host) 202 executes the following processes when content is used.

First, content of Con (xy) to be used, use control information of UR (xy) corresponding thereto, and an ECS file of ECS (xy) are acquired from the general-purpose area (General Purpose Area) 212 of the memory card.

Next, with reference to the use control information of UR (xy), it is checked in which block among the blocks of the protected area the title key of the content of Con (xy) to be used is stored.

In the use control information: UR (xy), an identifier of the block in which the title key of the content of Con (xy) to be used is stored is recorded.

When the block of the protected area 211 in which the title key is stored is specified, a reading process of recorded data of the block is performed.

For example, the following data is read from the selected block.

$$Kt(xy)(+)(UR(xy)\|ECSSig(xy))\text{hash}$$

Next, a connection process and a hash value computation process are performed with respect to the following pieces of data read from the general-purpose area 212:

the use control information: UR (xy); and the ECS file: ECS issuer signature stored in ECS (xy) (ECSSig (xy)).

In other words, the following data is computed.

$$(UR(xy)\|ECSSig(xy))\text{hash}$$

The result of the computation is set to be P (xy).

Then, the title key Kt (xy) is obtained by calculating the following expression.

[Read data from the block (title key conversion data)](+)P(xy) =

$$(Kt(xy)(+)(UR(xy)\|ECSSig(xy))\text{hash})(+)P(xy) =$$

$$(Kt(xy)(+)(UR(xy)\|ECSSig(xy))\text{hash})$$

$$(+)(UR(xy)\|ECSSig(xy))\text{hash}) = Kt(xy)$$

The title key Kt (xy) is acquired through the calculation process and encrypted content is decrypted using the acquired title key to be used.

An example of recorded data of the memory card will be described with reference to FIG. 21.

FIG. 21 shows an example of data written in the memory card by two different servers of the server A and the server B.

The server A has an access right to the block #0 of the protected area of the memory card.

The server B has an access right to the block #1 of the protected area of the memory card.

Each server records data other than the content in the memory card loaded in the host device as a user device.

Content provided by the server A is set to Con (a1), Con (a2), and Con (a3).

Content provided by the server B is set to Con (b1) and Con (b2).

As shown in FIG. 21, the server A records the following pieces of data in the general-purpose area (General Purpose Area) of the memory card.

Content: Con (a1), Con (a2), Con (a3)

Use control information (Usage Rule) corresponding to the above content: UR (a1), UR (a2), UR (a3)

ECS files (ECS file) corresponding to the above content: ECS (a1), ECS (a2), ECS (a3)

Furthermore, the server A records the following pieces of data in the block #0 of the protected area (Protected Area) of the memory card.

The following pieces of converted data of title keys of Kt (a1), Kt (a2), and Kt (a3) to be applied to decryption of the above content are recorded.

$$Kt(a1)(+)(UR(a1)\|ECSSig(a1))\text{hash}$$

$$Kt(a2)(+)(UR(a2)\|ECSSig(a2))\text{hash}$$

$$Kt(a3)(+)(UR(a3)\|ECSSig(a3))\text{hash}$$

On the other hand, the server B records the following pieces of data in the general-purpose area (General Purpose Area) of the memory card.

Content: Con (b1), Con (b2)

Use control information (Usage Rule) corresponding to the above content: UR (b1), UR (b2)

ECS files (ECS file) corresponding to the above content: ECS (b1), ECS (b2)

Furthermore, the server B records the following pieces of data in the block #1 of the protected area (Protected Area) of the memory card.

The following pieces of converted data of the title keys of Kt (a1) and Kt (a2) to be applied to decryption of the above content are recorded.

$$Kt(b1)(+)(UR(b1)\|ECSSig(b1))\text{hash}$$

$$Kt(b2)(+)(UR(b2)\|ECSSig(b2))\text{hash}$$

When each of the servers records the data in the blocks of the protected area (Protected Area) of the memory card, the memory card executes checking of access rights based on the record on the server certificate described above, and performs checking of writing rights on the blocks, and data writing is executed only when the access rights are confirmed.

FIG. 22 shows a data recording example of when the server A and the server B have access rights to the block #0 of the protected area of the memory card and a server C and a server D have access rights to the block #1 of the protected area of the memory card.

The server A records the following pieces of data in the general-purpose area (General Purpose Area) of the memory card.

Content: Con (a1), Con (a2), Con (a3)

Use control information (Usage Rule) corresponding to the above content: UR (a1), UR (a2), UR (a3)

ECS files (ECS file) corresponding to the above content: ECS (a1), ECS (a2), ECS (a3)

Furthermore, the server A records the following pieces of data in the block #0 of the protected area (Protected Area) of the memory card.

The following pieces of converted data of the title keys of Kt (a1), Kt (a2), and Kt (a3) to be applied to decryption of the above content are recorded.

$$Kt(a1)(+)(UR(a1)\|ECSSig(a1))hash$$

$$Kt(a2)(+)(UR(a2)\|ECSSig(a2))hash$$

$$Kt(a3)(+)(UR(a3)\|ECSSig(a3))hash$$

The server B records the following pieces of data in the general-purpose area (General Purpose Area) of the memory card.

Content: Con (b1), Con (b2)

Use control information (Usage Rule) corresponding to the above content: UR (b1), UR (b2)

ECS files (ECS file) corresponding to the above content: ECS (b1), ECS (b2)

Furthermore, the server B records the following pieces of data in the block #0 of the protected area (Protected Area) of the memory card.

The following pieces of converted data of the title keys of Kt (b1) and Kt (b2) to be applied to decryption of the above content are recorded.

$$Kt(b1)(+)(UR(b1)\|ECSSig(b1))hash$$

$$Kt(b2)(+)(UR(b2)\|ECSSig(b2))hash$$

The server C records the following pieces of data in the general-purpose area (General Purpose Area) of the memory card.

Content: Con (c1)

Use control information (Usage Rule) corresponding to the above content: UR (c1)

ECS file (ECS file) corresponding to the above content: ECS (c1)

Furthermore, the server C records the following piece of data in the block #1 of the protected area (Protected Area) of the memory card.

The following piece of converted data of the title keys of Kt (c1) to be applied to decryption of the above content is recorded.

$$Kt(c1)(+)(UR(c1)\|ECSSig(c1))hash$$

The server D records the following pieces of data in the general-purpose area (General Purpose Area) of the memory card.

Content: Con (d1), Con (d2)

Use control information (Usage Rule) corresponding to the above content: UR (d1), UR (d2)

ECS files (ECS file) corresponding to the above content: ECS (d1), ECS (d2)

Furthermore, the server D records the following pieces of data in the block #1 of the protected area (Protected Area) of the memory card.

The following pieces of converted data of the title keys of Kt (d1) and Kt (d2) to be applied to decryption of the above content are recorded.

$$Kt(d1)(+)(UR(d1)\|ECSSig(d1))hash$$

$$Kt(d2)(+)(UR(d2)\|ECSSig(d2))hash$$

The above pieces of data are recorded.

Note that, when the user device (host) that executes content reproduction selects content to be reproduced from the general-purpose area, it is necessary to specify a block of the protected area in which a title key for the content is stored.

This block specification information is acquired from use control information (UR) corresponding to respective content.

Figure 23:
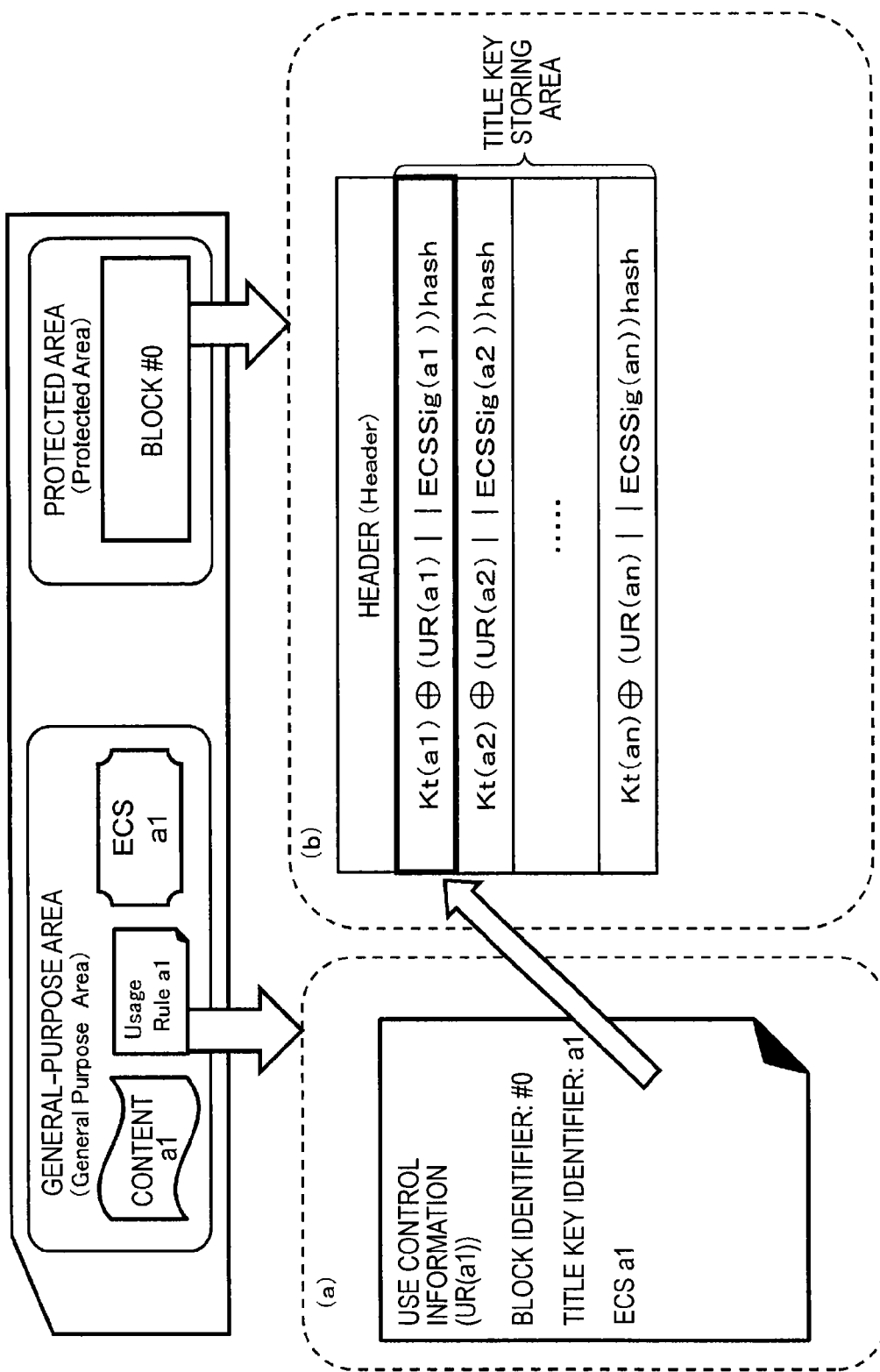
FIG. 23 is a diagram for describing a configuration example of recorded data of use control information recorded in a general-purpose area of the memory card.

A use example of the use control information will be described with reference to FIG. 23. (a) of FIG. 23 shows a specific example of the use control information (Usage Rule) a1 corresponding to the content a1 recorded in the general-purpose area (General Purpose Area) of the memory card.

The following pieces of data are recorded in the use control information (Usage Rule).

(1) Block identifier (#0)
(2) Title key identifier (a1)
(3) ECS file identifier (a1)

The (1) block identifier is information indicating a block in which the title key Kt (a1) for the content of Con (a1) corresponding to the use control information (Usage Rule) UR-(a1) is stored.

In the present example, the block identifier is #0 and the user device (host device) that executes content reproduction can select the block #0.

The (2) title key identifier is information indicating which title key among a number of title keys stored in the block #0 is the title key for the content of Con (a1) corresponding to the use control information (Usage Rule) UR (a1).

In the present example, the title key identifier is a1, and the title key Kt (a1) can be selected.

The (3) ECS file identifier (a1) is information for identifying an ECS file corresponding to the content (a1).

The user device (host) checks which block is the block of the protected area in which the title key for the content of Con (a1) to be used is stored with reference to the use control information of UR (a1), and then reads the following data from the block.

$$Kt(a1)(+)(UR(a1)\|ECSSig(a1))hash$$

Next, a connection process and a hash value computation process are performed with respect to the following pieces of data read from the general-purpose area:

the use control information: UR (a1); and the ECS file: ECS issuer signature stored in ECS (a1) (ECSSig (xy)).

In other words, the following data is computed.

$$P(a1)=(UR(a1)\|ECSSig(a1))hash$$

Then, the title key Kt (xy) is obtained by performing the following calculation.

$$[\text{Data read from the block (title key conversion data)}](+)P(xy) =$$

$$(Kt(a1)(+)(UR(a1)\|ECSSig(a1))hash)(+)P(a1) =$$

-continued $$(Kt(a1)(+)(UR(a1)\|ECSSig(a1))\text{hash})$$

$$(+)(UR(a1)\|ECSSig(a1))\text{hash}) = Kt(a1)$$

The title key Kt (a1) is acquired through the calculation process as described above and encrypted content is decrypted and used using the acquired title key.

As described above, the title key recorded in the protected area of the memory card is stored as an arithmetic operation of exclusive OR (XOR) with the hash value of the connected data of the use control information (UR) and the ECS issuer signature (ECSSig).

By performing the process described above, it is possible to prevent unauthorized uses of content even when disclosure of a signature key (secret key) of an ECS issuer to be applied to the ECS issuer signature (ECSSig) occurs.

For example, a content provision server or a user device can prevent unauthorized content uses through an unauthorized process to which a disclosed signature key (secret key) of the ECS issuer is applied, to be specific, a replacement process of encrypted content, or the like.

Note that the replacement is a process of implementing encryption of pieces of content (C2), (C3), (C4), . . . using a title key (Kt1) corresponding to, for example, certain content (C1) and providing the content to a user.

If the process described above is performed, a user device having the title key (Kt1) can decrypt and reproduce the pieces of the content (C2), (C3), (C4), . . . without formally purchasing it.

By storing the title keys recorded in the protected area of the memory card as the arithmetic operation result of the exclusive OR (XOR) with the hash values of the connected data of the use control information (UR) and the ECS issuer signature (ECSSig), the replacement described above can be prevented.

The replacement prevention effect will be described with reference to FIG. 24 and the succeeding drawings.

Figure 24:
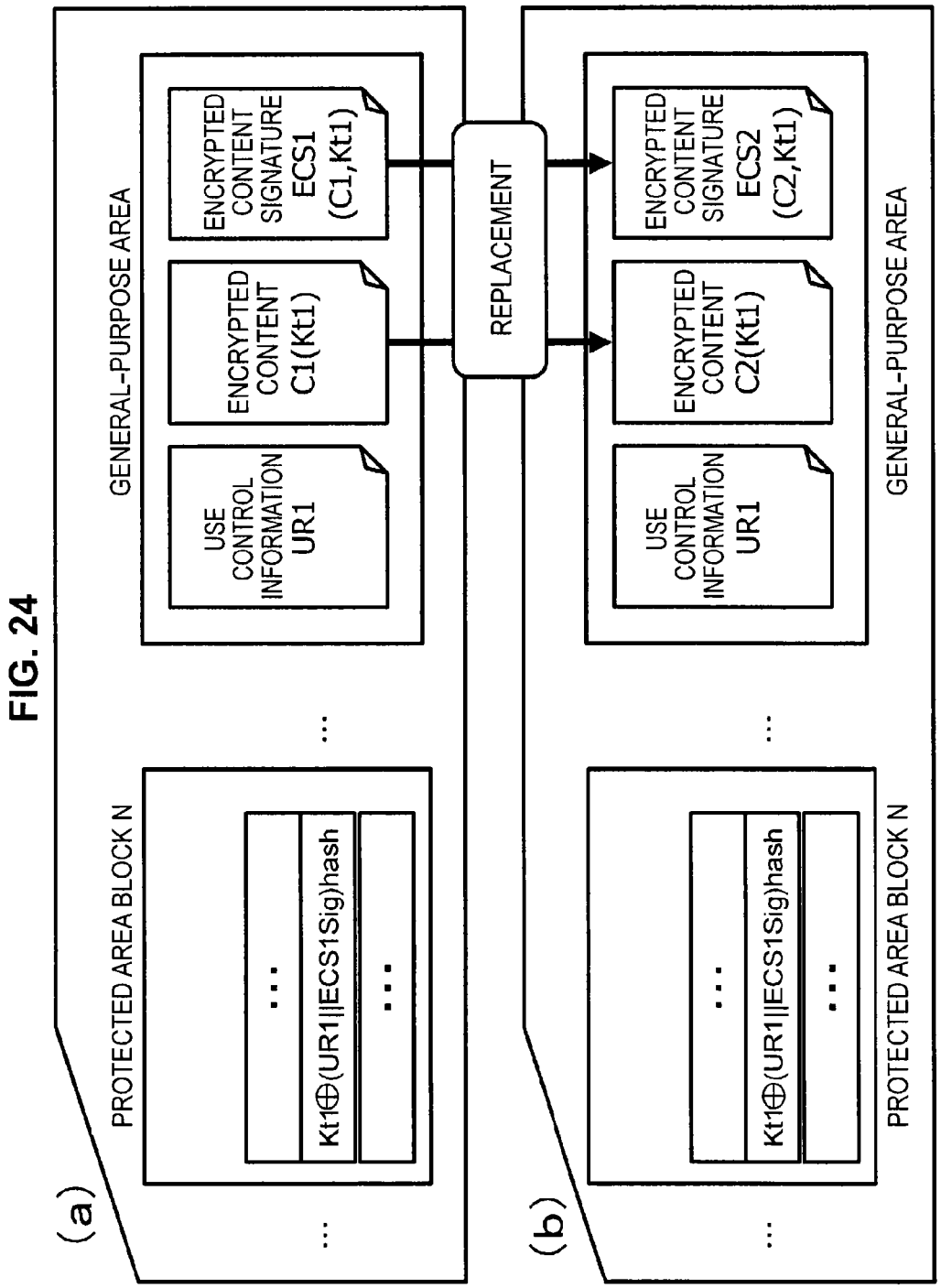
FIG. 24 is a diagram for describing an example of an unauthorized use of content through a replacement process.

In FIG. 24, (a) shows an authorized data storage configuration corresponding to content (C1) and (b) shows a data storage configuration of replaced data obtained by encrypting content (C2) using the title key (Kt1) corresponding to the content (C1).

In the authorized data storage configuration shown in (a) of FIG. 24, the following is stored in the general-purpose area of the memory card:

(a1) encrypted content (C1 (Kt1)) which is encrypted with the authorized title key (Kt1) corresponding to the content (C1);

(a2) authorized use control information (UR1) corresponding to the content (C1); and (a3) authorized encrypted content signature file (ECS file: ECS1 (C1, Kt1)) corresponding to the content (C1)

Note that the ECS issuer signature (ECSSig) is stored in the ECS file, and the ECS issuer signature (ECSSig) includes a collection of hash lists of the content (C1) and an electronic signature generated based on data including the hash value of the title key (Kt1) as previously described with reference to FIG. 13. In order to clarify generation source data of the signature data, the ECS file is described as ECS1 (C1, Kt1).

In addition, in the authorized data storage configuration shown in (a) of FIG. 24, conversion data of the title key (Kt1), i.e., the following data, is recorded in a block N of the protected area of the memory card.

$$Kt1(+)(UR1\|ECS1Sig)\text{hash}$$

Wherein the elements have the following meanings.

UR1: Use control information corresponding to the content 1

ECS1Sig: ECS issuer signature (Signature by ECS Issuer) that is constituent data of the ECS file corresponding to the content 1

In addition, the operational symbols have the following meanings.

(+): Arithmetic operation of Exclusive OR

∥: Connection of data a∥b: Connected data of data a and data b hash: Hash value (a∥b) hash: Hash value of connected data of data a and data b For example, an ill-intentioned content provision server uses the title key (Kt1) of the content (C1) as an encryption key for other content (C2) and provides the key to a user.

As a result of the unauthorized content distribution, "replaced data" shown in (b) of FIG. 24 is stored in the memory card.

In the "replaced data" storage configuration shown in (b) of FIG. 24, the following is stored in the general-purpose area of the memory card:

(b1) unauthorized encrypted content (C2 (Kt1)) which is encrypted with the unauthorized title key (Kt1) corresponding to the content (C2);

(b2) use control information (UR1) corresponding to the content (C2) [use control information (UR1) corresponding to the content (C1)] without authorization; and (ba3) unauthorized generated encrypted content signature file corresponding to the content (C2) (ECS2 [=ECS2 (C2, Kt1)]

Note that, in the unauthorized ECS file, the ECS issuer signature (ECSSig) stored in the ECS2 includes an electronic signature generated using the disclosed signature key (secret key) of the ECS issuer based on the data including a collection of hash lists of the content (C2) and the hash value of the title key (Kt1) corresponding to the content (C1). In order to clarify generation source data of the signature data, the ECS file is described as ECS2 (C2, Kt1).

In addition, in the "replaced data" storage configuration shown in (b) of FIG. 24, the conversion data of the title key (Kt1), i.e., the following data, is recorded in the block N of the protected area of the memory card.

$$Kt1(+)(UR1\|ECS1Sig)\text{hash}$$

A sequence of the recording process of the "replaced data" shown in (b) of FIG. 24 will be described with reference to the flowchart shown in FIG. 25.

Figure 25:
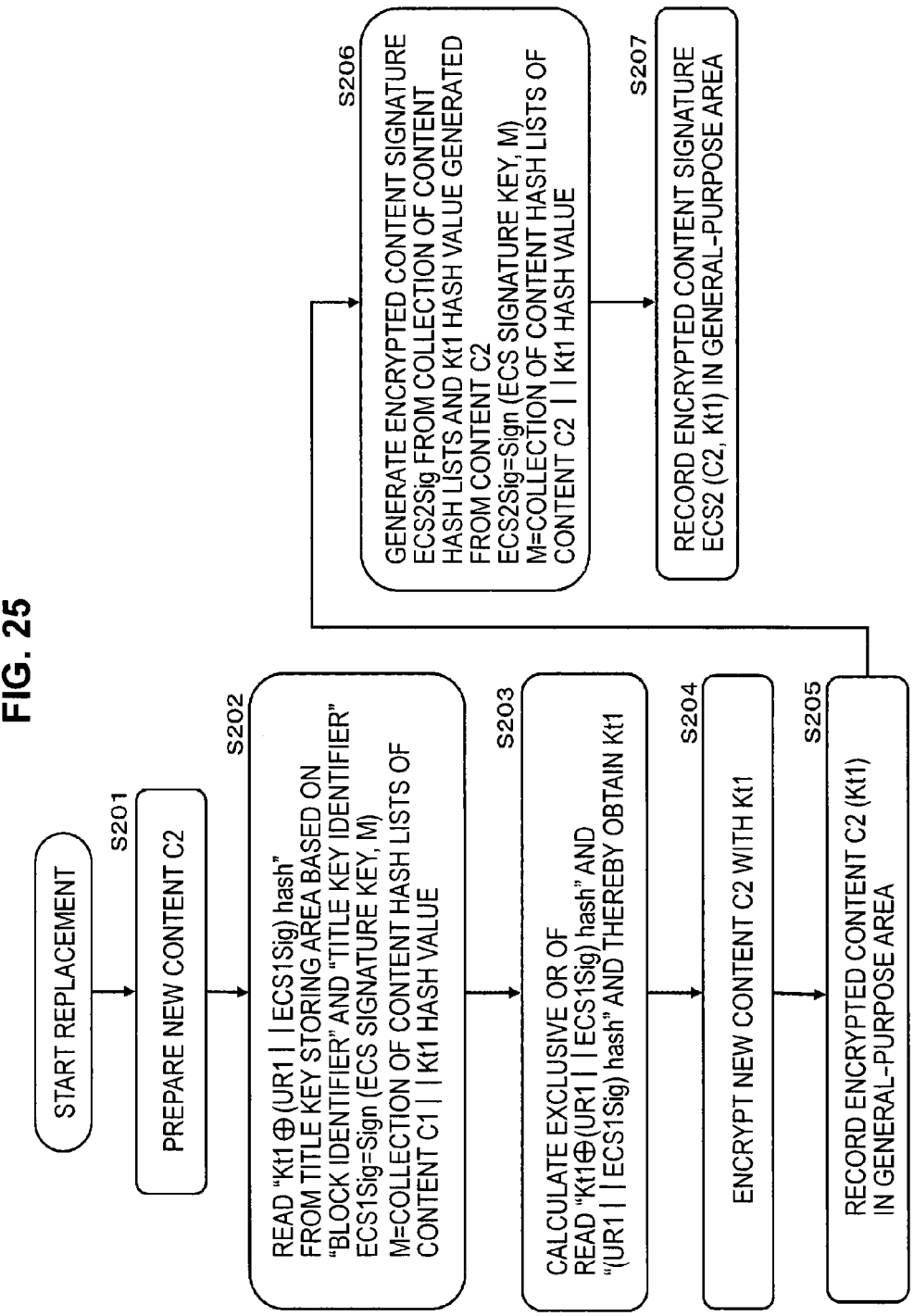
FIG. 25 is a diagram showing a flowchart describing an example of an unauthorized content recording process through a replacement process.

Note that the process shown in FIG. 25 is executed using the memory card in which an authorized data set corresponding to the content (C1) shown in (a) of FIG. 24 is stored, and is a process executed by a device having a right to read data as an access right to the block N of the protected area of the memory card, for example, the content provision server or the user device.

First, in Step S201, new content C2 is prepared.

Next, in Step S202, a "block identifier" and a "title key identifier" are acquired from the user control information (UR1) of the content (C1) recorded in the general-purpose area of the memory card, and based on the acquired information, the following title key conversion data corresponding to the authorized content (C) is read from a predetermined block of the protected area, i.e., a title key storing block.

Note that ECS1Sig=Sign (ECS signature key, M); and

M=a set of content hash lists of content C1‖Kt1 hash value.

Next, in Step S203, the hash value of the connected data of the use control information (UR1) corresponding to the authorized content (C1) read from the general-purpose area and the ECS file (ECS1 (C1, Kt1)) is computed, an arithmetic operation of exclusive OR (XOR) of the computation result and the above-described title key conversion data read from the protected area is executed, and thereby the authorized title key (Kt1) corresponding to the content (C1) is acquired.

In other words, the title key (Kt1) is acquired according to the following expression.

$$Kt1=(\text{data read from the protected area})(+)(\text{data read from the general-purpose area})=Kt1(+)\\(UR1\|ECS1Sig)hash(+)(UR1\|ECS1Sig)hash$$

Note that (+) means an arithmetic operation of exclusive OR (XOR).

Next, in Step S204, encryption of the new content C2 is executed by applying the title key (Kt1) acquired in Step S203.

Encrypted content C2 (Kt1) is generated.

Next, in Step S205, the encrypted content C2 (Kt1) is recorded in the general-purpose area of the memory card.

Next, in Step S206, an encrypted content signature ECS2Sig for a collection of content hash lists and the Kt1 hash value generated from the content C2 is generated. It is the following signature data.

$$ECS2Sig=Sign(ECS\text{ signature key},M)$$

Wherein M=the collection of content hash lists of the content C2‖Kt1 hash value.

Note that a disclosed signature key (secret key) of an encrypted content signature issuer is applied to signature generation.

Finally, in Step S207, an ECS file that includes the ECS signature (ECS2Sig (C2, Kt1) generated without authorization in Step S206 is generated and recorded in the general-purpose area of the memory card.

The recording process of the "replaced data" shown in (b) of FIG. 24 is completed through the series of processes shown in FIG. 25.

Through the replacement process as described above, the content C2 (Kt1) that is obtained by encrypting the content C2 is generated by applying the title key (Kt1) of the different content (C1).

Note that, in the present example, as use control information corresponding to the unauthorized recorded content C2 (Kt1), the use control information (UR1) of the content C1 is set to be used without change.

Next, a process of the user device that reproduces the content C2 using the "replaced data" shown in (b) of FIG. 24 will be described with reference to the flowchart shown in FIG. 26.

First, in Step S221, the user device reads the encrypted content C2 (Kt1) that is scheduled to be reproduced and the ECS file (ECS2 (C2, Kt1)) generated for the content from the general-purpose area of the memory card.

Next, in Step S222, the block identifier indicating the block storing the title key is read from the user control information (UR1) recorded in association with the content C2 from the general-purpose area of the memory card.

As described above, in the present example, as use control information corresponding to the unauthorized recorded content C2 (Kt1), the use control information (UR1) of the content C1 is used without change.

As previously described with reference to FIG. 23, in the use control information (UR), block identifiers storing title keys, title key identifiers, and the like are recorded.

In Step S222, a block identifier and a title key identifier are read from the use control information (UR1) of the content C1.

The block identifier and title key identifier are identifiers corresponding to the block storing the authorized title key Kt1 for the content C1 and the title key stored in the block.

Thus, the read data is title key conversion data for the content C1, that is, $$Kt1(+)(UR1\|ECS1Sig)hash.$$

Next, in Step S223, the hash value of the use control information (UR1) read from the general-purpose area and the ECS file (ECS2 (C2, Kt1)) generated corresponding to the content C2 without authorization is computed, and by executing an arithmetic operation of exclusive OR (XOR) of the computation result and the above-described title key conversion data read from the protected area, acquisition of a title key Kt2 for decryption corresponding to the content C2 is attempted.

Here, if the title key Kt2 that satisfies Kt2=Kt1 is obtained, the acquisition of the title key is assumed to succeed.

In other words, the title key computation process is attempted according to the following expression.

$$Kt2=(\text{data read from the protected area})(+)(\text{data read from the general-purpose area})=Kt1(+)\\(UR1\|ECS2Sig)hash(+)(UR1\|ECS1Sig)hash$$

The acquisition of the title key (Kt2) is attempted according to the above-described title key computation expression.

Note that (+) means the arithmetic operation of exclusive OR (XOR).

However, in the title key computation expression, since the following condition is satisfied:

$$ECS2Sig \neq ECS1Sig,$$

the value: Kt2 obtained from the computation expression is a value different from Kt1, in other words, $$Kt2 \neq Kt1.$$

As a result, the user device is not able to acquire the title key Kt1 applied to encryption of the content C2, and thus decryption and reproduction of the content C2 fail. This is the process of Step S224.

In addition, in Step S225, the user device executes a verification process of the ECS issuer signature (ECSSig) included in the ECS file read from the general-purpose area according to a reproduction sequence defined in advance.

The signature verification process is performed according to the following expression.

$$\text{Verify}(ECS\text{ issuer public key},ECS2Sig,M)$$

Wherein Verify (k, S, M) indicates a process of verifying an electronic signature S for data M using a verification key k.

M=a collection of content hash lists of the content C2‖Kt2 hash

For Kt2, the value computed in Step S223 is used.

ECS2Sig stored in the ECS file is an unauthorized signature generated in Step S206 of the flow shown in FIG. 25, and is the following data.

$$ECS2Sig=Sign(ECS\text{ signature key},M)$$

Wherein M=a collection of content hash lists of the content C2‖Kt1 hash value.

As described above, the signature data ECS2Sig stored in the ECS file is generated for M that includes the Kt1 hash, whereas the data M applied to the signature verification is data that includes the Kt2 hash value.

Thus, the signature verification in Step S225 fails. The process is as described in Step S226 of FIG. 26.

In this manner, even if the user device attempts to decrypt and reproduce the content C2 by applying the "replaced data" shown in (b) of FIG. 24, the following results are obtained:
  failure in decryption of the content C2; and
  failure in signature verification of the ECS
and as a result, it is not possible to use the content C2.

Figure 26:
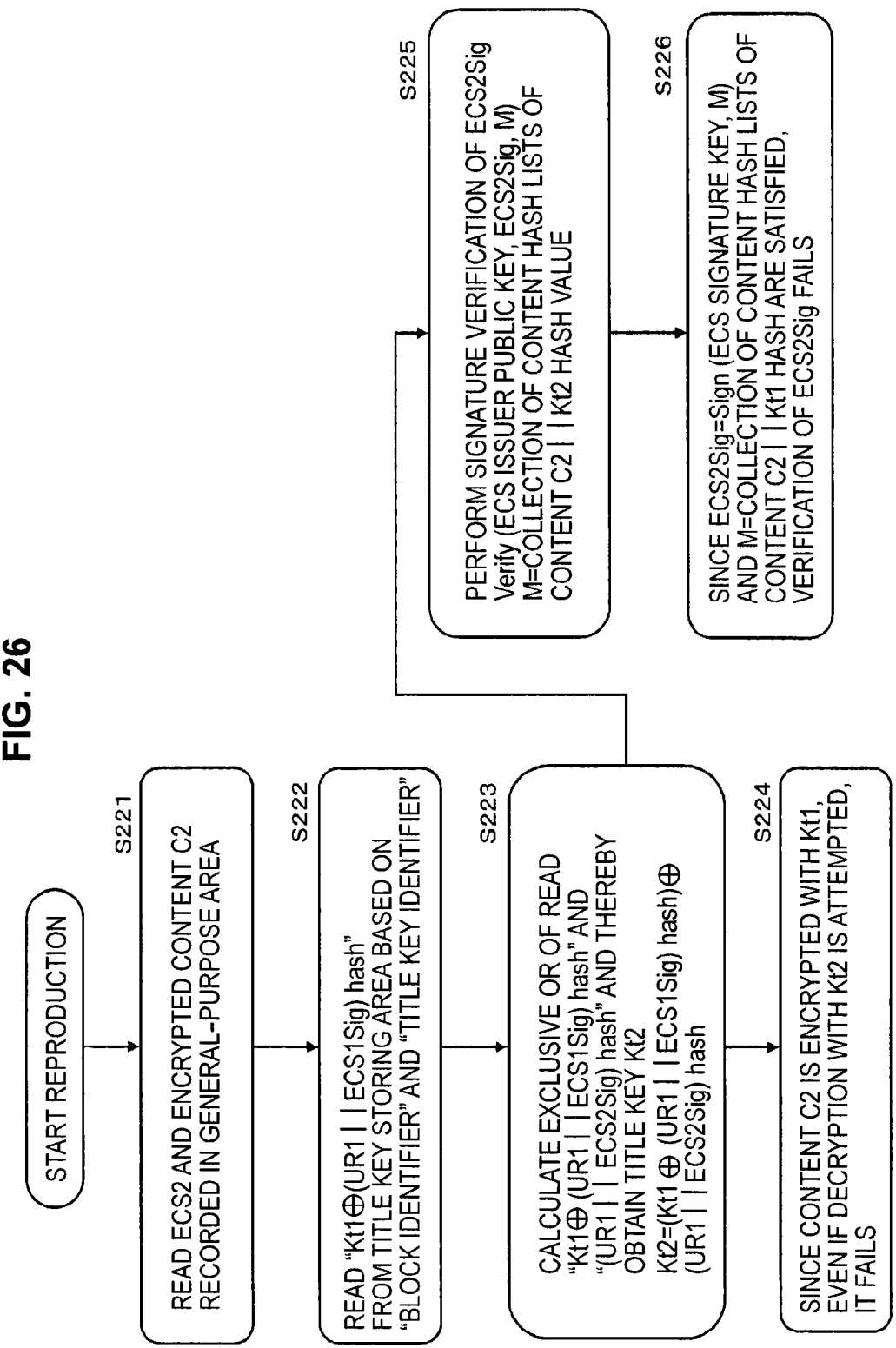
FIG. 26 is a diagram showing a flowchart describing that reproduction of unauthorized content recorded through the replacement process is not possible.

The process examples described with reference to FIGS. 24 to 26 are process examples in which encryption and decryption of the new content C2 are attempted by applying the title key Kt1 of the content C1.

Next, an example when an unauthorized process in which new use control information (UR2) is generated through illegitimate tampering of correct use control information (UR1) corresponding to the content C1 is performed will be described with reference to FIG. 27 and succeeding drawings.

In use control information, for example, information of a content use period, information of copy restriction, and the like are recorded, and there is a possibility of illegitimacy such as lengthening an available period by re-writing the use control information.

Figure 27:
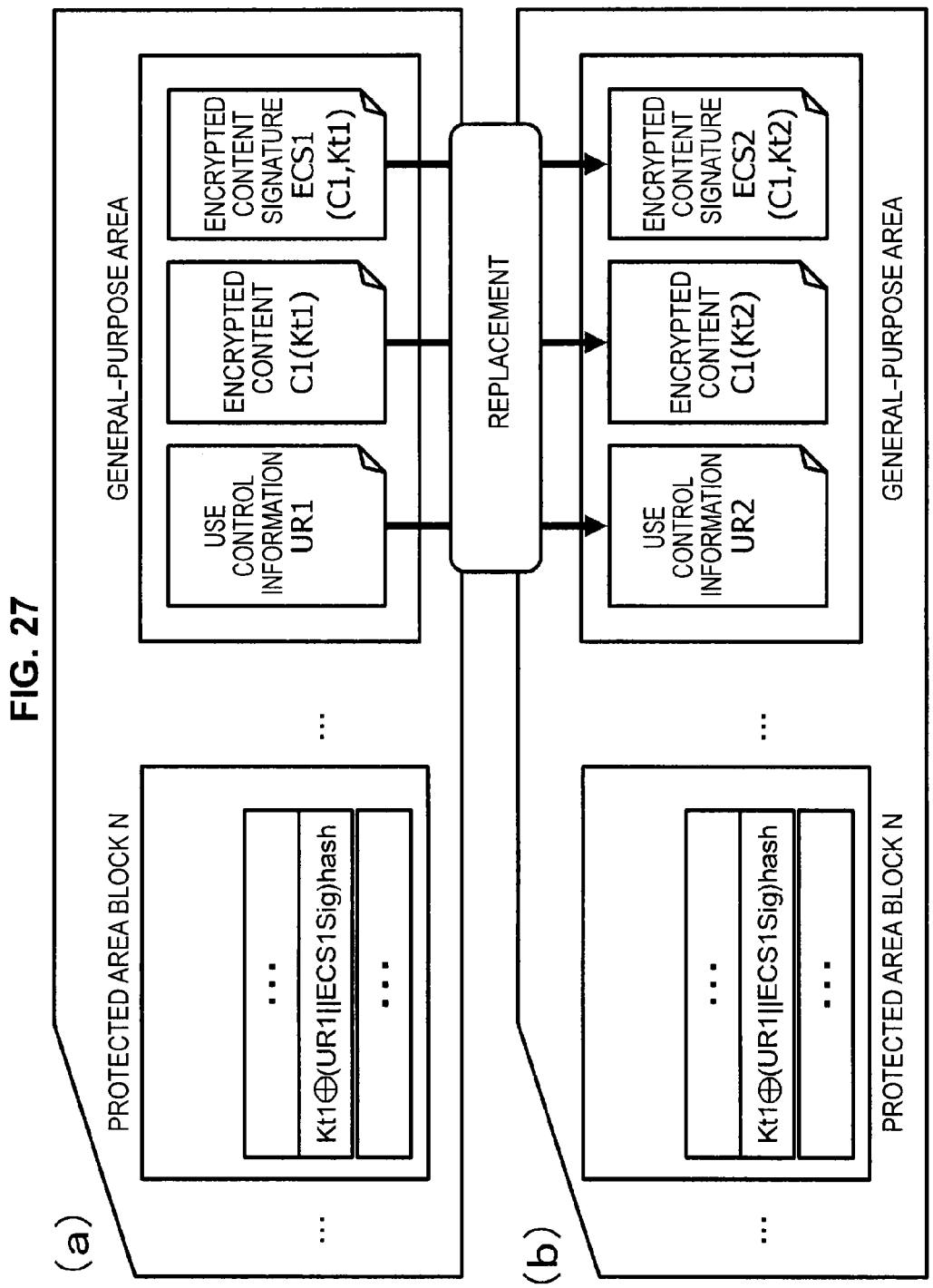
FIG. 27 is a diagram for describing an example of an unauthorized use of content through the replacement process.

In FIG. 27, (a) shows an authorized data storage configuration corresponding to the content (C1) and (b) shows a data storage configuration of replaced data obtained by encrypting the content (C2) using the title key (Kt1) corresponding to the content (C1) in the same manner as FIG. 24 previously described.

In the authorized data storage configuration shown in (a) of FIG. 24, the following is stored in the general-purpose area of the memory card:
  (a1) encrypted content (C1 (Kt1)) which is encrypted with the authorized title key (Kt1) corresponding to the content (C1);
  (a2) authorized use control information (UR1) corresponding to the content (C1); and
  (a3) authorized encrypted content signature file (ECS file: ECS1 (C1, Kt1)) corresponding to the content (C1)

Note that the ECS issuer signature (ECSSig) is stored in the ECS file, and the ECS issuer signature (ECSSig) includes a collection of hash lists of the content (C1) and an electronic signature generated based on data including the hash value of the title key (Kt1) as previously described with reference to FIG. 13. In order to clarify generation source data of the signature data, the ECS file is described as ECS1 (C1, Kt1).

In addition, in the authorized data storage configuration shown in (a) of FIG. 27, conversion data of the title key (Kt1), i.e., the following data, is recorded in the block N of the protected area of the memory card.

Kt1(+)(UR11∥ECS1Sig)hash

Wherein the elements have the following meanings.

UR1: Use control information corresponding to the content 1

ECS1Sig: ECS issuer signature (Signature by ECS Issuer) that is constituent data of the ECS file corresponding to the content 1

In addition, the operational symbols have the following meanings.
  (+): Arithmetic operation of Exclusive OR
  ∥: Connection of data
  a∥b: Connected data of data a and data b
  hash: Hash value
  (a∥b) hash: Hash value of connected data of data a and data b For example, an ill-intentioned content provision server or user device performs re-writing of the use control information (UR1) of the content (C1).

As a result of the unauthorized process, "replaced data" shown in (b) of FIG. 27 is stored in the memory card.

In the "replaced data" storage configuration shown in (b) of FIG. 27, the following is stored in the general-purpose area of the memory card:
  (b1) unauthorized encrypted content (C2 (Kt2)) which is encrypted with the illegitimately generated title key (Kt2) with regard to the content (C1);
  (b2) use control information (UR2) illegitimately generated corresponding to the content (C1); and
  (b3) encrypted content signature file illegitimately generated corresponding to the content (C1) (ECS2 [=ECS2 (C1, Kt2)]

Note that the ECS issuer signature (ECSSig) stored in the unauthorized ECS file of ECS2 includes an electronic signature generated using a disclosed signature key (secret key) of the ECS issuer based on the data including the collection of hash lists of the content (C1) and the hash value of the illegitimately generated title key (Kt2). In order to clarify generation source data of the signature data, the ECS file is described as ECS2 (C1, Kt2).

In addition, in the "replaced data" storage configuration shown in (b) of FIG. 27, the conversion data of the title key (Kt1), i.e., the following data, is recorded in the block N of the protected area of the memory card.

Kt1(+)(UR1∥ECS1Sig)hash

A sequence of the recording process of the "replaced data" shown in (b) of FIG. 27 will be described with reference to the flowchart shown in FIG. 28.

Figure 28:
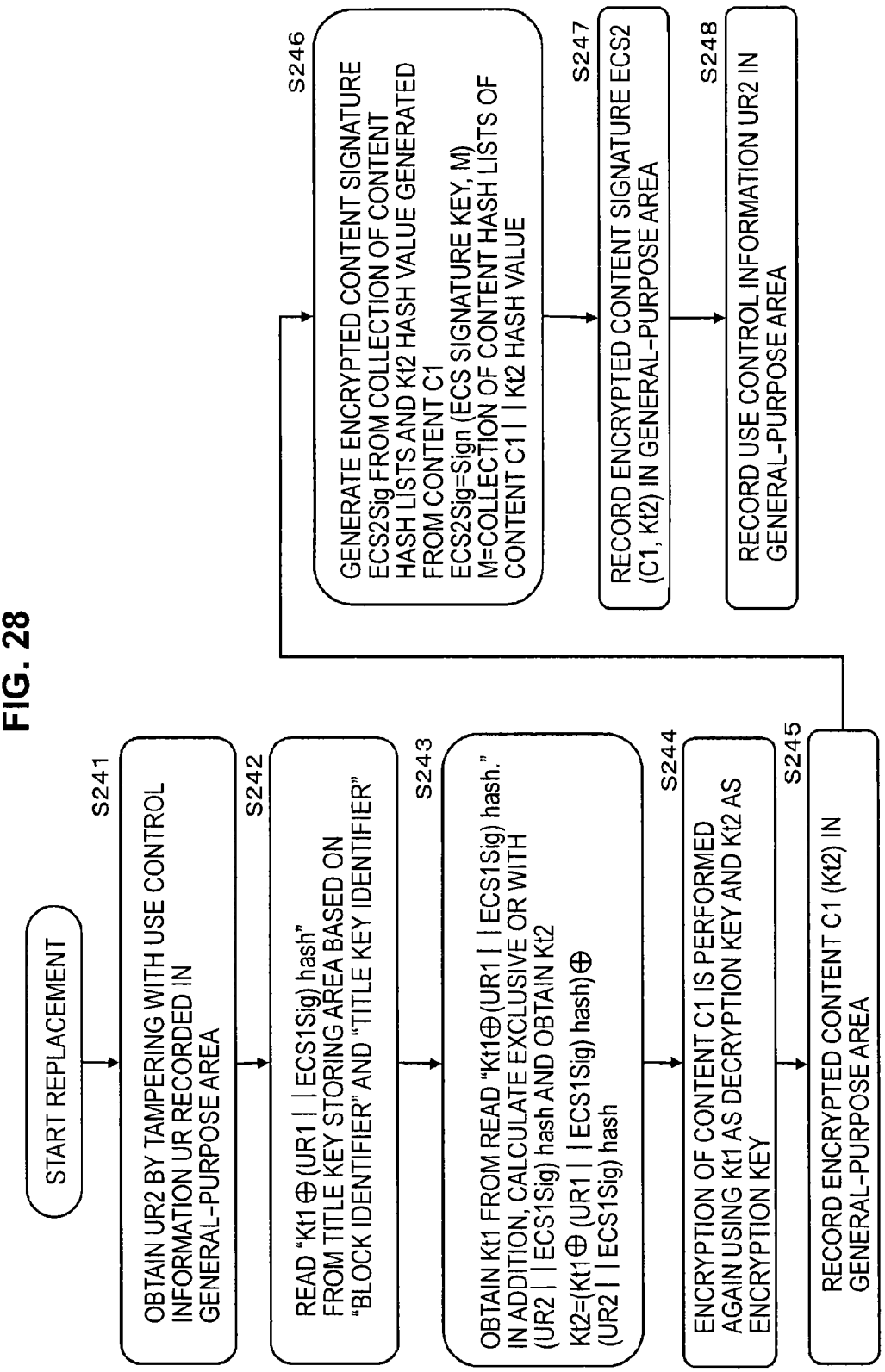
FIG. 28 is a diagram showing a flowchart describing an example of an unauthorized content recording process through the replacement process.

Note that the process shown in FIG. 28 is executed using the memory card in which the authorized data set corresponding to the content (C1) already shown in (a) of FIG. 27 is stored, and is a process executed by a device having a right to a data recording process as an access right to the block N of the protected area of the memory card, for example, the content provision server or the user device.

First, in Step S241, the use control information UR1 corresponding to the content C1 is read from the general-purpose area, thereby generating unauthorized use control information (UR2) that is subject to tampering, for example, re-writing of use period information or the like.

Next, in Step S242, a "block identifier" and a "title identifier" are acquired from the use control information (UR1) of the content (C1) recorded in the general-purpose area of the memory card, and based on the acquired information, the following title key conversion data corresponding to the authorized content (C1) is read from a predetermined block of the protected area, i.e., a title key storing block.

Kt1(+)(UR1∥ECS1Sig)hash

Note that the following conditions are satisfied.

ECS1Sig=Sign(ECS signature key,M)

M=A collection of content hash lists of the content C1∥Kt1 hash value

Next, in Step S243, the hash value of the connected data of the use control information (UR1) corresponding to the authorized content (C1) read from the general-purpose area and the ECS file (ECS1 (C1, Kt1)) is computed, then arithmetic operation of exclusive OR (XOR) of a computation result and the above-described title key conversion data read from the protected area is executed, and thereby the authorized title key (Kt1) corresponding to the content (C1) is acquired.

In other words, the title key (Kt1) is acquired according to the following expression.

Kt1=(data read from the general-purpose area)(+)(data read from the protected area)=(UR1∥ECS1Sig) hash(+)Kt1(+)(UR1∥ECS1Sig)hash Note that (+) means the arithmetic operation of exclusive OR (XOR).

Furthermore, the title key K2 to be applied to encryption and decryption of the content C2 is computed according to the following expression.

Kt2=(Kt1(+)(UR1∥ECS1Sig)hash(+)(UR2∥ECS1Sig) hash

Next, in Step S244, the content C1 (Kt1) is decrypted by applying the title key Kt1 generated in Step S243, the content C1 is further encrypted by applying the new title key Kt2 generated in Step S243, and thereby encrypted content C1 (Kt2) is generated.

Next, in Step S245, the encrypted content C2 (Kt2) is recorded in the general-purpose area of the memory card.

Next, in Step S246, an encrypted content signature ECS2Sig with respect to the collection of content hash lists and the Kt2 hash value generated from the content C1 is generated. It is the following signature data.

ECS2Sig=Sign(ECS signature key,M)

Wherein M=the collection of content hash lists of the content C1∥Kt2 hash value.

Note that the disclosed signature key (secret key) of the encrypted content signature issuer is applied to signature generation.

Next, in Step S247, the ECS file that includes an ECS signature (ECS2Sig (C1, Kt1) illegitimately generated in Step S246 is generated and recorded in the general-purpose area of the memory card.

Finally, in Step S248, the use control information UR2 generated in Step S241 is recorded in the general-purpose area.

The recording process of the "replaced data" shown in (b) of FIG. 27 ends through the series of processes shown in FIG. 28.

Through the replacement process as described above, the illegitimately generated use control information (UR2) is associated with the content C1. Note that the content C1 is encrypted and recorded using the new title key Kt2.

Figure 29:
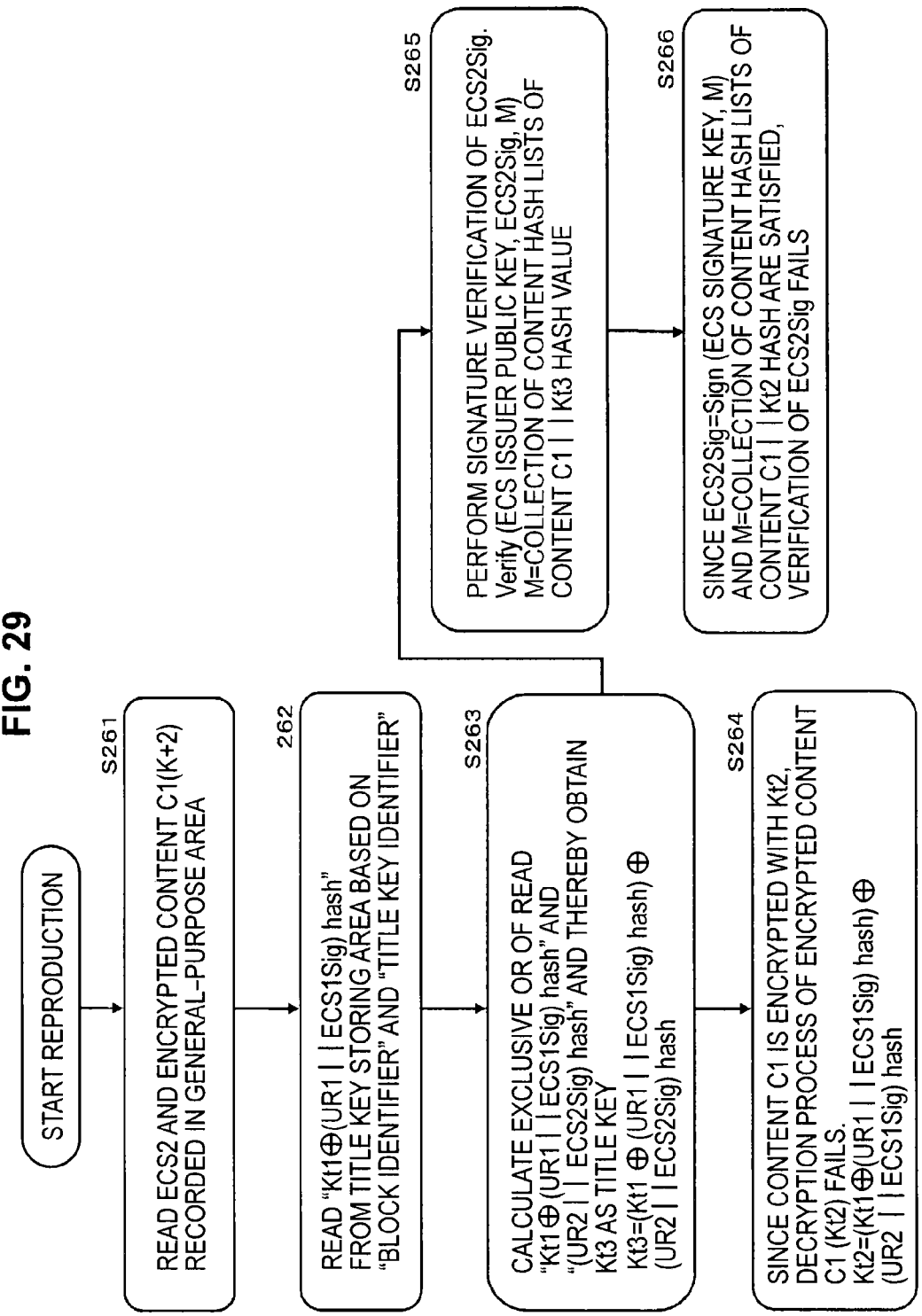
FIG. 29 is a diagram showing a flowchart describing that reproduction of unauthorized content recorded through the replacement process is not possible.

Next, a process performed by the user device for reproducing the content C1 using the "replaced data" shown in (b) of FIG. 27 will be described with reference to the flowchart shown in FIG. 29.

First, in Step S261, the user device reads the encrypted content C1 (Kt2) that is scheduled to be reproduced from the general-purpose area of the memory card and the ECS file (ECS2 (C1, Kt2) generated for the encrypted content.

Next, in Step S262, the block identifier and the title key identifier indicating the title key storing block are read from the new use control information (UR2) illegitimately generated in association with the content C1 from the general-purpose area of the memory card.

The block identifier and title key identifier are set for the authorized use control information (UR1) before tampering.

In other words, the block identifier and title key identifier are identifiers corresponding to the block in which the authorized title key Kt1 for the content C1 is stored and to the title key stored in the block.

Thus, the read data is the title key conversion data for the content C1, i.e.,

Kt1(+)(UR1∥ECS1Sig)hash.

Next, in Step S263, the hash value of the connected data of the illegitimately generated use control information (UR2) read from the general-purpose area and the illegitimately generated ECS file (ECS2 (C1, Kt2) is computed, an arithmetic operation of exclusive OR (XOR) of a computation result and the above-described title key conversion data read from the protected area is executed, and then acquisition of a title key Kt3 for description corresponding to the content C1 is attempted.

Here, if the title key Kt3 that satisfies Kt3=Kt2 is obtained, the acquisition of the title key is assumed to have succeeded.

In Step S263, a title key computation process is attempted according to the following expression.

Kt3=(data read from the protected area)(+)(data read from the general-purpose area)=Kt1(+) (UR1∥ECS1Sig)hash(+)(UR2∥ECS2Sig)hash The title key (Kt3) is generated according to the above-described title key computation expression.

Note that (+) means the arithmetic operation of exclusive OR (XOR).

However, in the above-described title key computation expression, Kt2 is not obtained.

The value of Kt3 obtained from the above-described computation expression is a value different from Kt1 and Kt2, in other words, Kt3≠Kt2; and Kt3≠Kt1.

As a result, the user device is not able to acquire the title key Kt2 applied to re-encryption of the content C1, and thus decryption and reproduction of the content C1 fail. This is the process of Step S264.

In addition, in Step S265, the user device executes a verification process of the ECS issuer signature (ECSSig) included in the ECS file read from the general-purpose area according to a reproduction sequence defined in advance.

The signature verification process is performed according to the following expression.

Verify(ECS issuer public key,ECS2Sig,M)

Wherein Verify (k, S, M) indicates a process of verifying an electronic signature S for data M using a verification key k.

M=a collection of content hash lists of the content C1∥Kt3 hash

For Kt3, the value computed in Step S263 is used.

ECS2Sig stored in the ECS file is an unauthorized signature generated in Step S246 of the flow shown in FIG. 28, and is the following data.

ECS2Sig=Sign(ECS signature key,M)

Wherein M=a collection of content hash lists of the content C1∥Kt2 hash value

As described above, the signature data ECS2Sig stored in the ECS file is generated for M that includes the Kt2 hash, whereas the data M applied to the signature verification is data that includes the Kt3 hash value.

Thus, the signature verification in Step S265 fails. The process is as described in Step S266 of FIG. 29.

In this manner, even if the user device attempts to decrypt and reproduce the content C1 by applying the "replaced data" shown in (b) of FIG. 27, the following results are obtained:

failure in decryption of the content C1; and
failure in signature verification of the ECS file,
and as a result, it is not possible to use the content C1.

As described above, by storing the title key recorded in the protected area of the memory card as a result of the arithmetic operation of exclusive OR (XOR) with the hash value of the connected data of the use control information (UR) and the ECS issuer signature (ECSSig), unauthorized uses of content can be prevented even when disclosure of the signature key (secret key) of the ECS issuer applied to the ECS issuer signature (ECSSig) occurs.

For example, the content provision server or the user device can prevent unauthorized content uses through an unauthorized process to which a disclosed signature key (secret key) of the ECS issuer is applied, to be specific, a replacement process of an encryption key of encrypted content, tampering of use control information, or the like.

[11. Regarding a Process of Applying a Block Identifier Recorded in an Encrypted Content Signature (ECS) File]

Next, a process of applying a block identifier (PAD Block Number) recorded in an encrypted content signature (ECS) file will be described.

As previously described with reference to FIG. 9, a block identifier (PAD Block Number) is recorded in an encrypted content signature (ECS) file.

The block identifier (PAD Block Number) is data of which the content provision device (Content Server) 103 notifies the encrypted content signature (ECS) issuer 102 as described with reference to FIG. 13, and is a block identifier of a protected area of a medium in which a title key that is an encryption key corresponding to content provided by the content provision device 103 to the user device 104 is stored. This is a block identifier of the protected area of the medium that can be used by the content provision device 103.

As previously described with reference to FIGS. 3, 6, and the like, the block of the protected area of the medium that can be used by the content provision device is set in advance, and access-permitted block information thereof is recorded therein.

In addition, information corresponding to the block identifier (PAD Block Number) is also recorded in the ECS issuer certificate as described with reference to FIG. 9.

As previously described with reference to FIG. 9, there are:
(a) block identifier start number (Start PAD Block Number); and
(b) block identifier range (PAD Block Number Counter).

The (a) block identifier start number (Start PAD Block Number) is a start number of access-permitted blocks of a protected area of a medium that the ECS issuer 102 can permit to the content provision device 103.

The (b) block identifier range (PAD Block Number Counter) is information indicating a range from the start number of the access-permitted blocks of the protected area of the medium that the ECS issuer 102 can permit to the content provision device 103.

Furthermore, as previously described with reference to FIG. 23, the block identifier is also recorded in use control information (UR) corresponding to content. The block identifier recorded in the use control information (UR) is a block identifier indicating a block in which a title key corresponding to content is stored.

Figure 30:
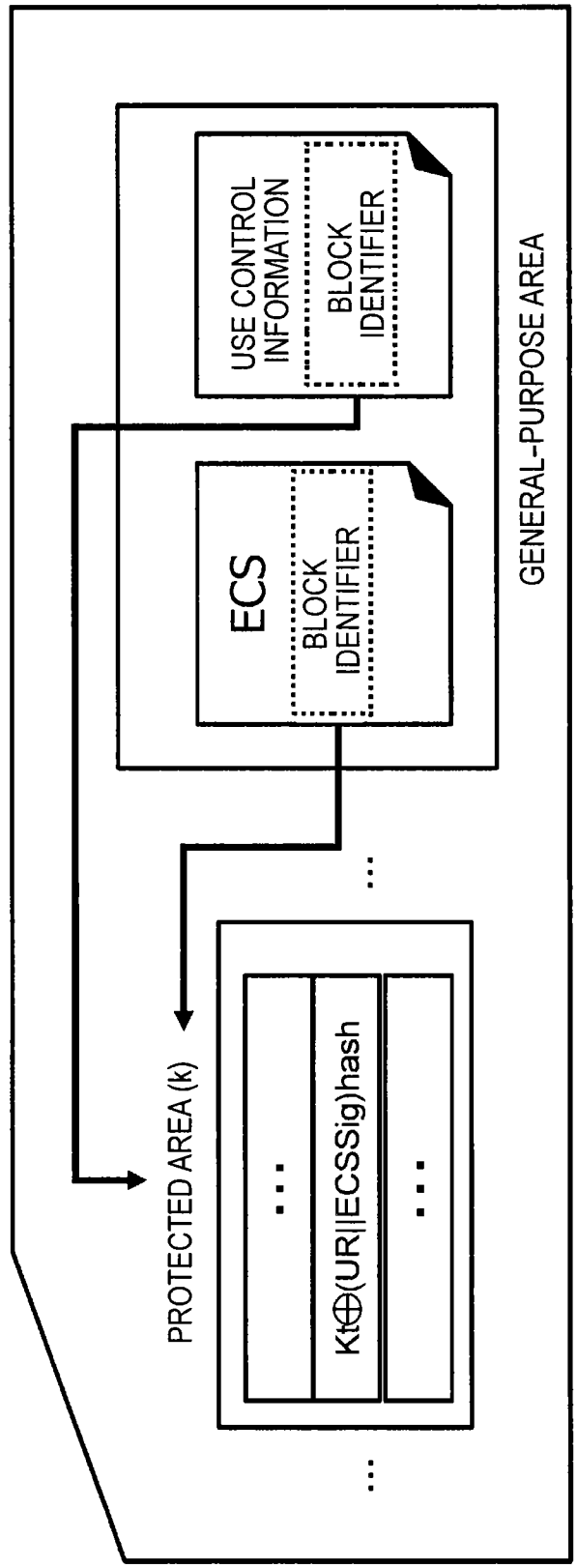
FIG. 30 is a diagram for describing a block identifier recorded in an encrypted content signature file (ECS file) and a block identifier recorded in a use control information file.

FIG. 30 shows the correspondence relationship of a title key storing block (the block k in the example shown in the drawing) of a protected area and block identifiers recorded in the following files which are:
an encrypted content signature (ECS) file; and
use control information (UR).

As shown in FIG. 30, the following pieces of data corresponding to content are stored in a general-purpose area of a memory card.

The encrypted content signature (ECS) file
The use control information (UR)

In addition, in the block k of the protected area, title key conversion data corresponding to the content, i.e., $Kt(+)UR\|ECSSig)hash$ is stored.

The content provision device that provides content to the user device compares a block identifier as protected area access right information recorded in the host certificate (see FIG. 5) of its own to writing-permitted block area information as a block identifier in an ECS issuer certificate.

Feasibility of provision of the content is determined according to the comparison result.

In addition, the user device that performs reproduction of the content compares the block identifier in the use control information and the block identifier in the ECS file.

Feasibility of the reproduction of the content is determined according to the comparison result.

First, a sequence of content provision feasibility determination using the block identifiers in the content provision server will be described with reference to the flowchart shown in FIG. 31.

Figure 31:
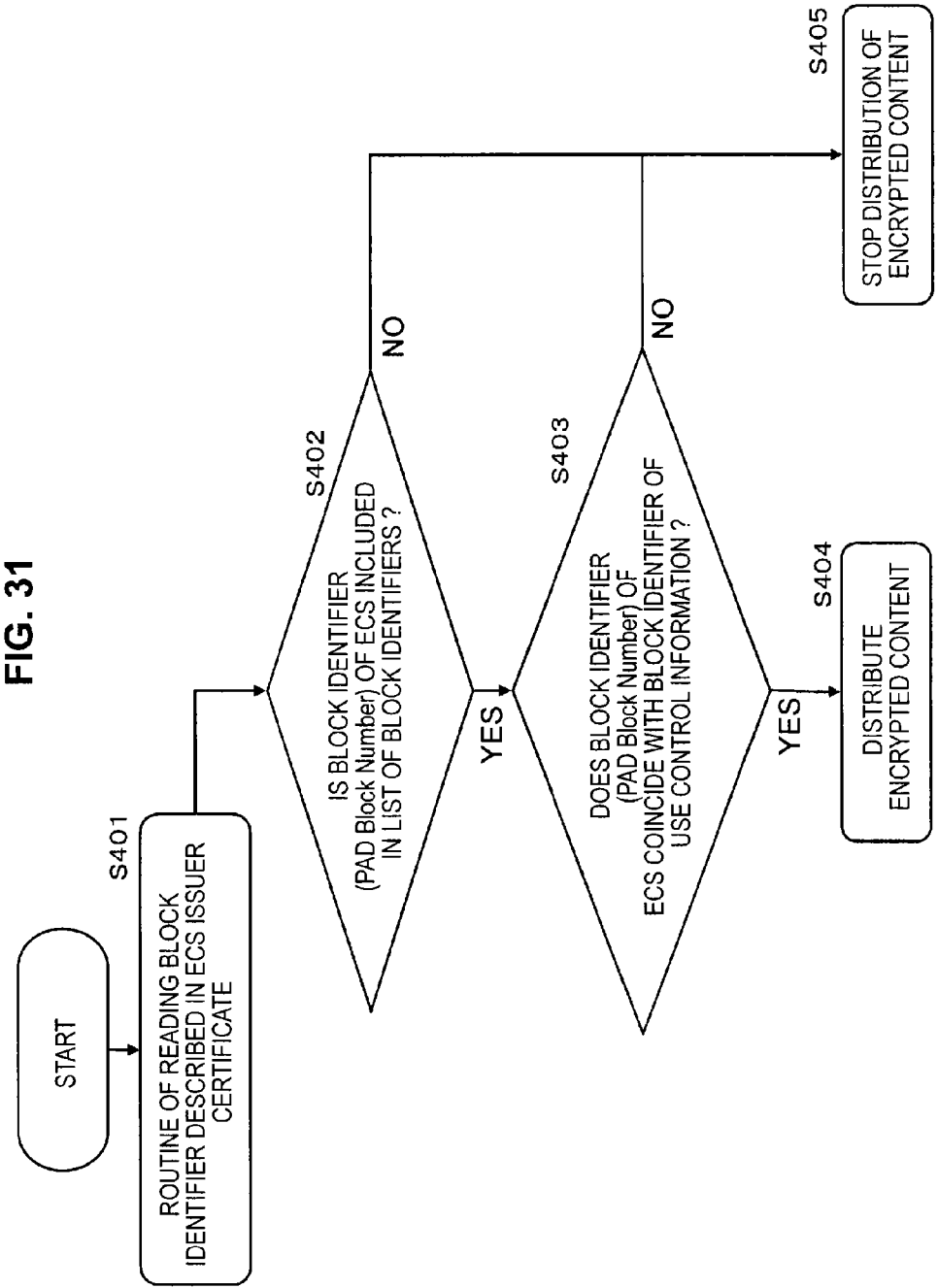
FIG. 31 is a diagram showing a flowchart describing a sequence of content provision feasibility determination to which the block identifier recorded in the encrypted content signature file (ECS file) and the block identifier recorded in the use control information file are applied.

Note that, as a pre-process of Step S401 of the flowchart shown in FIG. 31, the content provision device executes signature verification to which an ECS issuer signature set in the encrypted content signature file (ECS file) received from an encrypted content signature file (ECS file) issuer is applied.

When the signature verification is completed and legitimacy of the encrypted content signature file (ECS file) is confirmed, verification of the signature of the ECS issuer certificate stored in the encrypted content signature file (ECS file) is further executed. Under the condition that the two times of signature verification have been established, the process of Step S401 and succeeding processes are performed.

When at least one of the two times of signature verification is not established, legitimacy of the encrypted content signature file (ECS file) or the ECS issuer certificate is not confirmed, and thus the process of Step S401 and the succeeding processes are not executed. In this case, a content provision process is not executed either.

Note that content hash that is source data of the collection of content hash lists stored in the encrypted content signature file (ECS file) may be set to be any of hash of encrypted content or hash of content before encryption.

When the two times of signature verification for the encrypted content signature file (ECS file) and the ECS issuer certificate are established, and thus legitimacy of the encrypted content signature file (ECS file) and the ECS issuer certificate is confirmed, the content provision device executes the process of Step S401.

Figure 32:
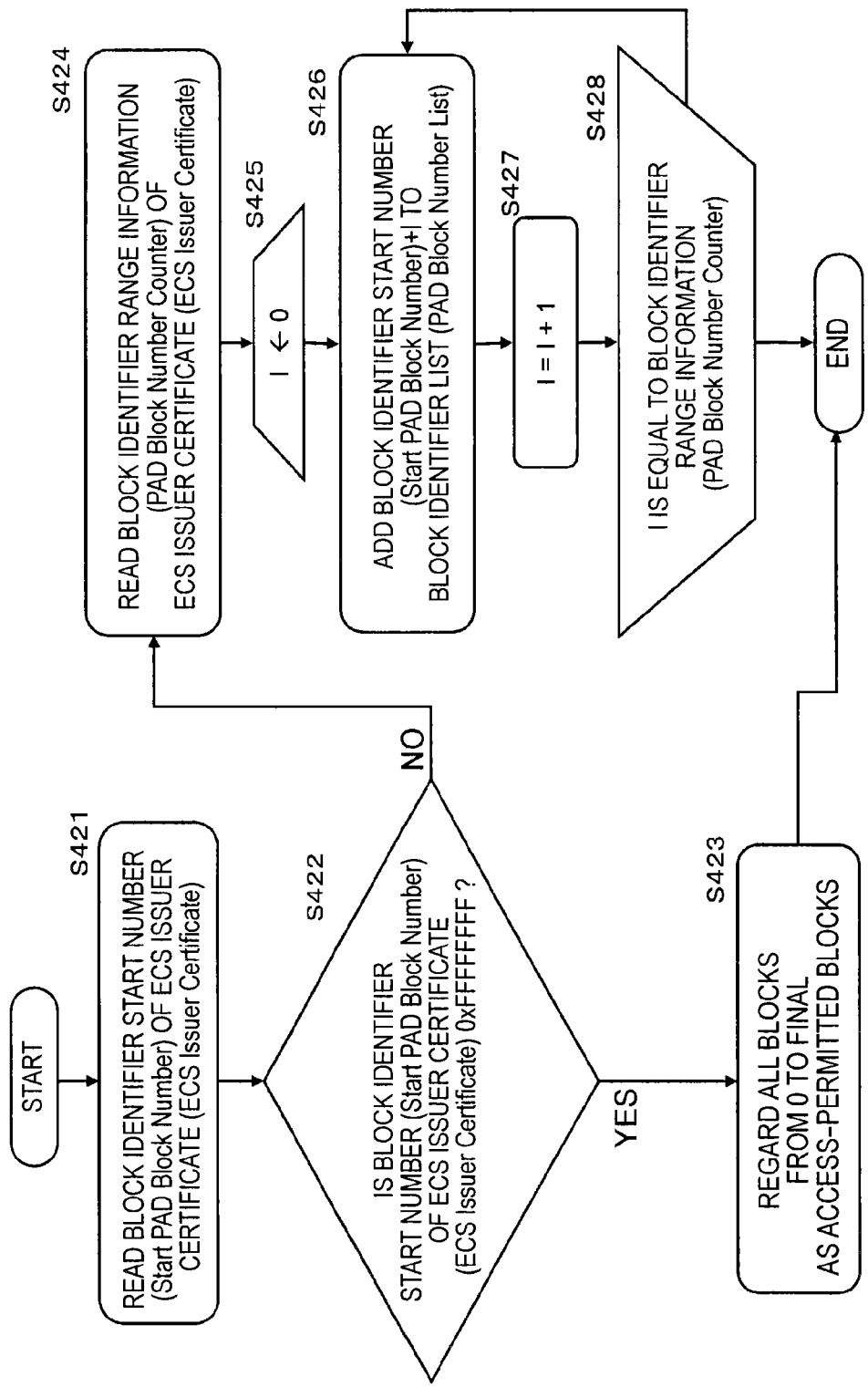
FIG. 32 is a diagram showing a flowchart describing a sequence of a block identifier reading process from an ECS issuer certificate.

The content provision device first reads the ECS issuer certificate in the ECS file in Step S401, and then reads block identifier information recorded in the ECS issuer certificate Details of the process of Step S401 will be described with reference to the flow shown in FIG. 32.

In Step S421, the block identifier start number (Start PAD Block Number) in the ECS issuer certificate is read.

The block identifier start number (Start PAD Block Number) is a start number of access-permitted blocks of the protected area of the medium that the ECS issuer 102 permits to the content provision device 103.

Next, in Step S422, it is determined whether or not the block identifier start number (Start PAD Block Number) in the ECS issuer certificate is 0xFFFFFFFF.

Note that the case in which the block identifier start number (Start PAD Block Number) is 0xFFFFFFFF corresponds to a state in which access permission is set for all blocks.

In Step S422, when the block identifier start number (Start PAD Block Number) is determined to be 0xFFFFFFFF, the process proceeds to Step S423, and the previous block set in the protected area of the medium is regarded as an access-permitted block.

On the other hand, in Step S422, when the block identifier start number (Start PAD Block Number) is determined not to be 0xFFFFFFFF, the process proceeds to Step S424.

In Step S424, the block identifier range information (PAD Block Number Counter) in the ECS issuer certificate is read.

The block identifier range (PAD Block Number Counter) is information indicating a range from the start number of the access-permitted blocks of the protected area of the medium that the ECS issuer 102 can permit to the content provision device 103.

The next processes from Steps S425 to S428 are a repetitive routine executed by increasing a variable I that indicates a block identifier from 0 to 1, 2, 3, . . . in order.

First, in Step S425, the variable I is set to be 1.

Next, in Step S426, the block identifier start number (Start PAD Block Number)+I is added to a block identifier list (PAD Block Number List).

Next, in Step S427, I=I+1 is set.

Next, in Step S428, it is determined whether or not I is equal to the block identifier range information (PAD Block Number Counter).

If I is equal to the information, the process ends. If I is not equal to the information, the process returns to Step S426 and is repeated.

The process of Step S401 of the flow shown in FIG. 31 is performed.

In Step S401, by applying the block identifier start number (Start PAD Block Number) in the ECS issuer certificate and the block identifier range information (PAD Block Number Counter), an access permission range defined in the ECS issuer certificate is computed, and the access permission range is set as a list of access permitted block identifiers.

Next, in Step S402, it is determined whether or not a block identifier (PAD Block Number) described as recorded data of the encrypted content signature (ECS) file is included in the list of access permitted block identifiers generated in Step S401.

If the identifier is not included, the process proceeds to Step S405, and the content provision process with respect to the user device is not executed.

On the other hand, if the identifier is included, the process proceeds to Step S403.

In Step S403, it is determined whether or not the block identifier (PAD Block Number) described as the recorded data of the encrypted content signature (ECS) file coincides with the block identifier recorded in the use control information (UR).

If the identifiers do not coincide, the process proceeds to Step S405, and the content provision process with respect to the user device is not executed.

On the other hand, if the identifiers coincide, the process proceeds to Step S404, and content provision with respect to the user device is executed.

As described above, the content provision device determines whether or not the following conditions of (a) and (b) are satisfied:

(a) the block identifier (PAD Block Number) recorded in the encrypted content signature (ECS) file is within the range of the access-permitted blocks recorded in the ECS issuer certificate; and (b) the block identifier (PAD Block Number) recorded in the encrypted content signature (ECS) file coincides with the block identifier recorded in the use control information (UR), and content provision with respect to the user device is executed only when the conditions are satisfied.

Next, an application process of the block identifiers in the user device that executes a content reproduction process will be described with reference to the flowchart shown in FIG. 33.

Figure 33:
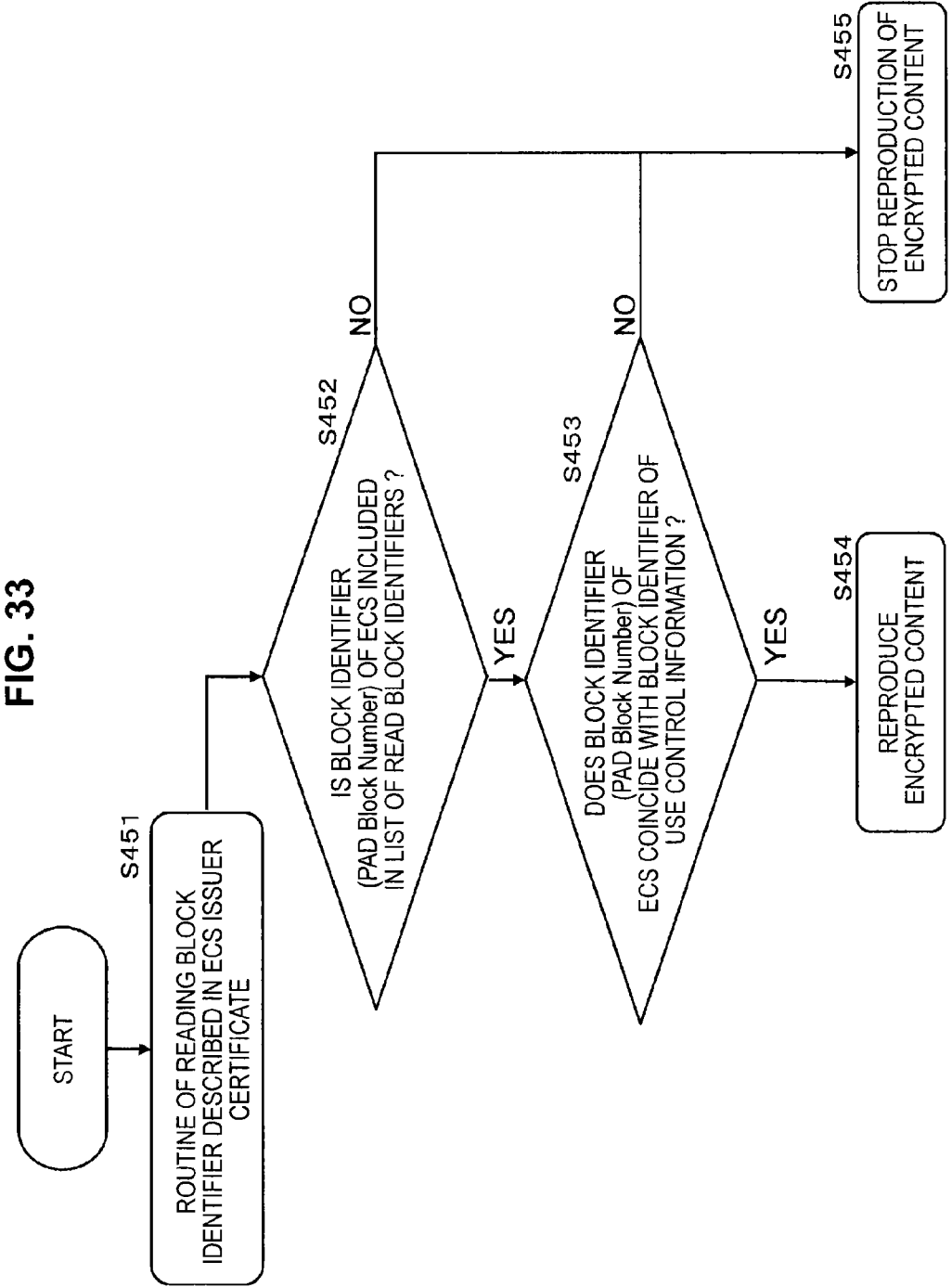
FIG. 33 is a diagram showing a flowchart describing a sequence of content reproduction feasibility determination to which the block identifier recorded in the encrypted content signature file (ECS file) and the block identifier recorded in the use control information file are applied.

Note that, prior to Step S451 shown in FIG. 33, the user device executes signature verification to which the ECS issuer signature set in the encrypted content signature file (ECS file) received from the content provision device is applied.

When the signature verification is established and legitimacy of the encrypted content signature file (ECS file) is confirmed, verification of the signature of the ECS issuer certificate stored in the encrypted content signature file (ECS file) is executed. Under the condition that the two times of signature verification have been established, the process of Step S451 and succeeding processes are performed.

When at least one of the two times of signature verification is not established, legitimacy of the encrypted content signature file (ECS file) or the ECS issuer certificate is not confirmed, and thus the process of Step S451 and the succeeding processes are not executed. In this case, a content reproduction process is not executed either.

When the two times of signature verification for the encrypted content signature file (ECS file) and the ECS issuer certificate are established, and thus legitimacy of the encrypted content signature file (ECS file) and the ECS issuer certificate is confirmed, the user device executes the process of Step S451.

Step S451 is the same process as the process of Step S401 of the flow shown in FIG. 31 previously described as a process of the server provision device. In other words, as described in detail with reference to the flow shown in FIG. 32, by applying the block identifier start number (Start PAD Block Number) in the ECS issuer certificate and the block identifier range information (PAD Block Number Counter), an access permission range defined in the ECS issuer certificate is computed, and the access permission range is set as a list of access permitted block identifiers.

Next, in Step S452, it is determined whether or not a block identifier (PAD Block Number) described as recorded data of the encrypted content signature (ECS) file is included in the list of access permitted block identifiers generated in Step S451.

If the identifier is not included, the process proceeds to Step S455, and the content reproduction process is not executed.

On the other hand, if the identifier is included, the process proceeds to Step S453.

In Step S453, it is determined whether or not the block identifier (PAD Block Number) described as the recorded data of the encrypted content signature (ECS) file coincides with the block identifier recorded in the use control information (UR).

If the identifiers do not coincide, the process proceeds to Step S455, and the content reproduction process is not executed.

On the other hand, if the identifiers coincide, the process proceeds to Step S454, and content reproduction is executed.

Note that, before the content reproduction process is started, acquisition and generation processes of the title key to be applied to decryption of the encrypted content, and a hash value collation process to which a list of content hash included in the encrypted content signature file is applied is further executed. When the collation is established in the hash value collation and non-tampering of the content is confirmed, reproduction of the content is permitted.

As described above, the user device that executes content reproduction determines whether or not the following conditions of (a) and (b) are satisfied:

(a) the block identifier (PAD Block Number) recorded in the encrypted content signature (ECS) file is within the range of the access-permitted blocks recorded in the ECS issuer certificate; and (b) the block identifier (PAD Block Number) recorded in the encrypted content signature (ECS) file coincides with the block identifier recorded in the use control information (UR), and content reproduction is executed only when the conditions are satisfied.

[12. Regarding a Hardware Configuration Example of Each Device]

Lastly, a hardware configuration example of each device that executes the above-described processes will be described with reference to FIG. 34.

Figure 34:
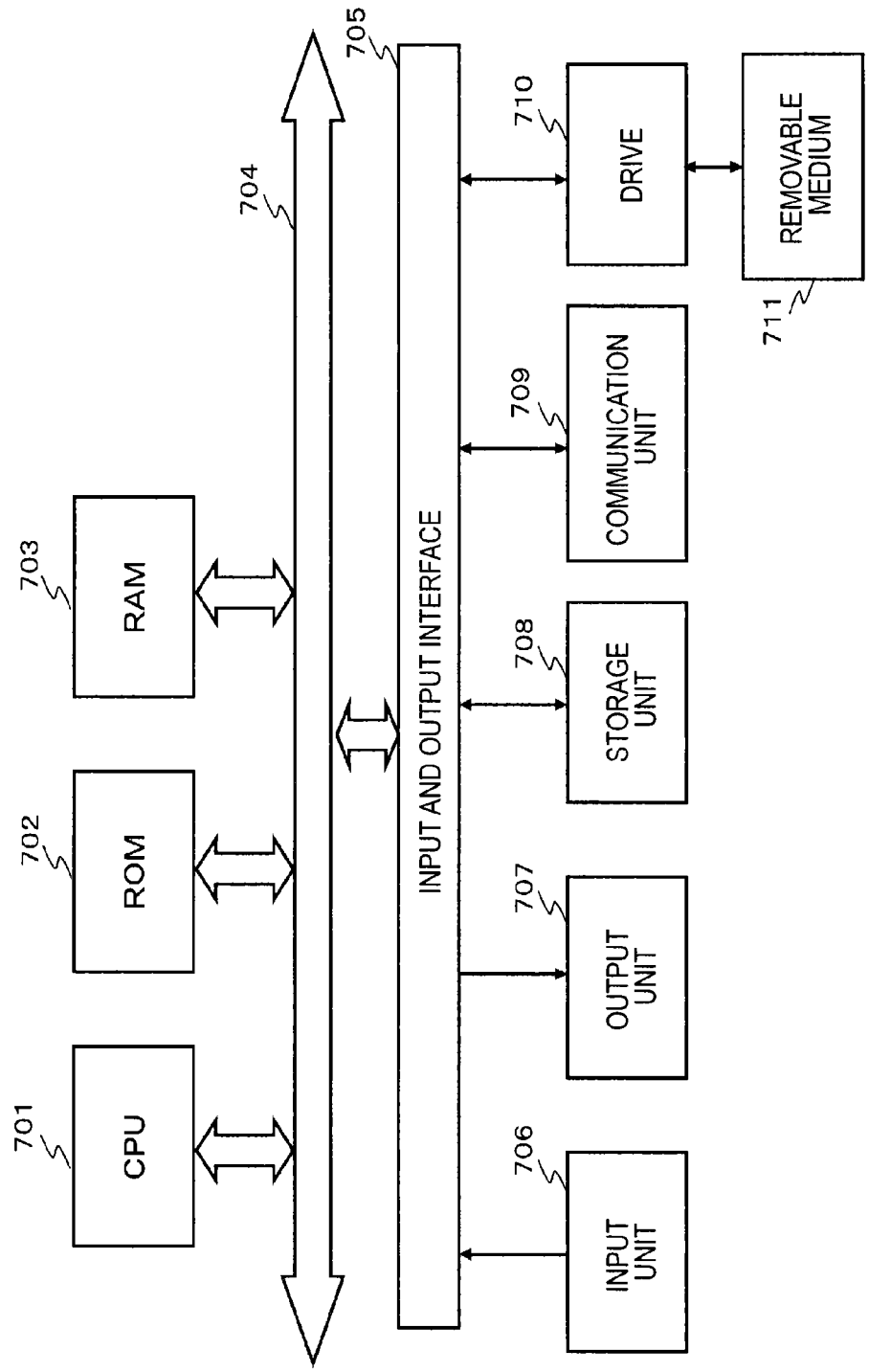
FIG. 34 is a diagram for describing a hardware configuration example of an information processing device.

FIG. 34 shows a hardware configuration example of an information processing device that can be applied to any of the user device 104, the content provision device 103, the encrypted content signature issuer 102, and the license issuer 101 shown in FIGS. 7 and 8.

A CPU (Central Processing Unit) 701 functions as a data processing unit that executes various kinds of processes according to programs stored in a ROM (Read Only Memory) 702 or a storage unit 708. For example, the CPU executes the processes according to the flowcharts described above. In a RAM (Random Access Memory) 703, programs executed by the CPU 701, data, and the like are appropriately stored. The CPU 701, the ROM 702, and the RAM 703 are connected to one another via a bus 704.

The CPU 701 is connected to an input and output interface 705 via the bus 704, and an input unit 706 that includes various switches, a keyboard, a mouse, a microphone, and the like and an output unit 707 that includes a display, a speaker, and the like are connected to the input and output interface 705. The CPU 701 executes various kinds of processes in response to commands input from the input unit 706 and outputs processing results to, for example, the output unit 707.

The storage unit 708 connected to the input and output interface 705 includes, for example, a hard disk or the like, and stores programs executed by the CPU 701 and various kinds of data. A communication unit 709 communicates with external devices via a network such as the Internet or a local area network.

A drive 710 connected to the input and output interface 705 drives a removable medium 711 such as a magnetic disk, an optical disc, a magneto-optical disc, or a semiconductor memory such as a memory card, and acquires various kinds of data such as recorded content or key information. For example, content decryption and reproduction processes and the like are performed according to a reproduction program executed by the CPU using such acquired content or key data.

Figure 35:
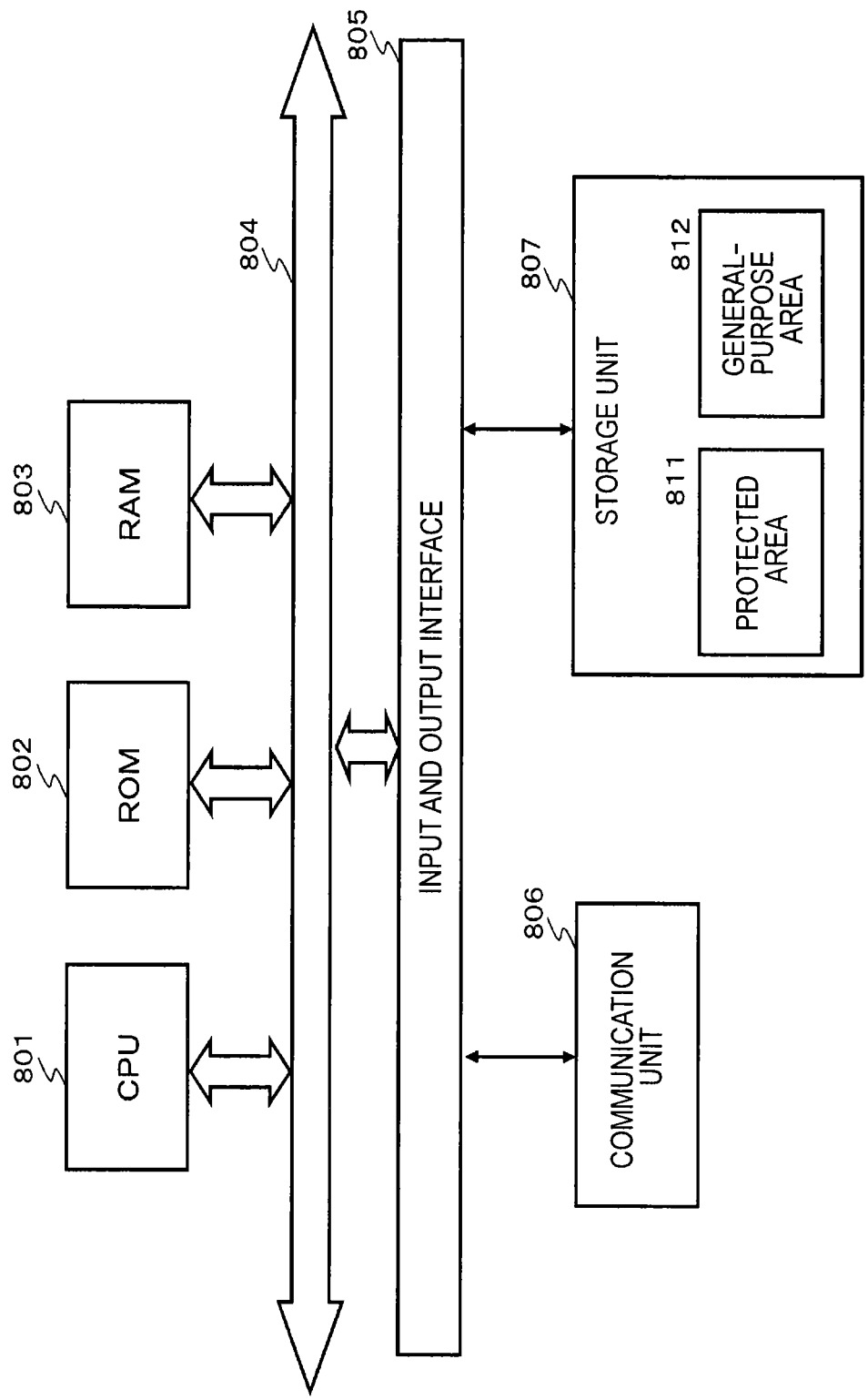
FIG. 35 is a diagram for describing a hardware configuration example of an information processing device as a memory card.

FIG. 35 shows a hardware configuration example of a memory card that is an information storage device.

A CPU (Central Processing Unit) 801 functions as a data processing unit that executes various kinds of processes according to programs stored in a ROM (Read Only Memory) 802 or a storage unit 807. For example, the CPU executes a communication process between a server or a host device described in each embodiment above, a process of writing or reading data on or from the storage unit 807, an access feasibility determination process in units of segment areas of a protected area 811 of the storage unit 807, and the like. A RAM (Random Access Memory) 803 appropriately stores programs executed by the CPU 801, data, and the like. The CPU 801, ROM 802, and RAM 803 are connected to one another via a bus 804.

The CPU 801 is connected to an input and output interface 805 via the bus 804, and a communication unit 806 and the storage unit 807 are connected to the input and output interface 805.

The communication unit 804 connected to the input and output interface 805 performs communication with, for example, a server or a host. The storage unit 807 is a data storing area, and has the protected area (Protected Area) 811 to which access is restricted as previously described and a general-purpose area (General Purpose Area) 812 in which free data recording and reading are possible.

Note that, although the example in which content provided by the content provision device is encrypted content has been described as a representative example in the embodiment described above, the configuration of the present disclosure is not limited to the case in which provided content is encrypted content, and can be applied to a case in which content is plain content that is not encrypted. Note that, when content is plain content, the title keys described in the above embodiment are known data strings, for example, key data all including the value of 0, and then the same process as the encrypted content provision process as described above can be performed.

[13. Conclusion of the Configuration of the Present Disclosure]

Hereinabove, the embodiments of the present disclosure have been described in detail with reference to specific embodiments. However, it is obvious that a person skilled in the art can make modifications and substitutions of the embodiments within the scope not departing from the gist of the present disclosure. In other words, the present disclosure is disclosed in the form of exemplification, and not subject to limited interpretation. In order to determine the gist of the present disclosure, the claims thereof should be considered.

Additionally, the present technology may also be configured as below.

(1) An information storage device including:

a storage unit configured to store encrypted content and an encryption key to be applied to decryption of the encrypted content, wherein the storage unit stores a converted encryption key generated through an arithmetic operation of the encryption key and an electronic signature that is constituent data of an encrypted content signature file set corresponding to the encrypted content, wherein the electronic signature is an electronic signature for data that includes constituent data of the encrypted content and the encryption key, and wherein a reproduction device configured to read the encrypted content from the storage unit and execute a decryption process is able to be caused to perform acquisition of the encryption key through an arithmetic operation of applying the electronic signature to the converted encryption key.

(2) The information storage device according to (1), wherein the converted encryption key is a result of an arithmetic operation of exclusive OR of the encryption key and a hash value of connected data of use control information set corresponding to the encrypted content and the electronic signature.

(3) The information storage device according to (1) or (2),
wherein the storage unit has a protected area to which access restriction is set, and
wherein the converted encryption key is configured to be stored in the protected area.

(4) The information storage device according to (3), further including:
a data processing unit configured to determine access feasibility to the protected area based on a certificate received from an access requesting device with respect to the protected area.

(5) The information storage device according to any one of (1) to (4),
wherein the storage unit has a protected area to which access restriction is set and a general-purpose area to which access restriction is not set,
wherein the converted encryption key is stored in the protected area, and
wherein the encrypted content and the encrypted content signature file are configured to be stored in the general-purpose area.

(6) The information storage device according to any one of (1) to (5), wherein the electronic signature is an electronic signature for data that includes the constituent data of the encrypted content, the encryption key, and even constituent data of the encrypted content signature file.

(7) The information storage device according to (6), wherein the electronic signature is an electronic signature for data that includes information of the date of issue of the encrypted content signature file that is the constituent data of the encrypted content signature file.

(8) An information processing device including:
a data processing unit configured to execute decryption and reproduction processes of encrypted content recorded in a medium,
wherein, when a decryption process of the encrypted content is to be executed, the data processing unit reads a converted encryption key that is converted data of an encryption key to be applied to decryption of the encrypted content recorded in the medium, executes an arithmetic operation process for the converted encryption key, and then executes an acquisition process of the encryption key,
wherein the converted encryption key is a converted encryption key generated through an arithmetic operation of the encryption key and the electronic signature that is constituent data of an encrypted content signature file set corresponding to the encrypted content, and
wherein the data processing unit acquires the electronic signature that is the constituent data of the encrypted content signature file recorded in the medium, executes an arithmetic operation process to which the acquired electronic signature is applied, and then executes the acquisition process of the encryption key.

(9) The information processing device according to (8), wherein the electronic signature is an electronic signature for data that includes constituent data of the encrypted content and the encryption key.

(10) The information processing device according to (8) or (9),
wherein the converted encryption key is a result of an arithmetic operation of exclusive OR of the encryption key and a hash value of connected data of use control information set corresponding to the encrypted content and the electronic signature,
wherein the data processing unit acquires the electronic signature that is the constituent data of the encrypted content signature file recorded in the medium and the use control information recorded in the medium, executes an arithmetic operation process to which the acquired data is applied, and then executes the acquisition process of the encryption key.

(11) The information processing device according to any one of (8) to (10),
wherein the data processing unit executes a signature verification process on the electronic signature that is the constituent data of the encrypted content signature file recorded in the medium, and
wherein, under a condition that the signature verification process succeeds and legitimacy of the encrypted content signature file is confirmed, the acquisition process of the encryption key is performed.

(12) An information processing device including:
a data processing unit configured to output encrypted content recorded in a medium and a converted encryption key that is converted data of an encryption key to be applied to decryption of the encrypted content,
wherein the data processing unit generates the converted encryption key through an arithmetic operation process of the encryption key and an electronic signature that is an electronic signature that is constituent data of an encrypted content signature file set corresponding to the encrypted content and for data that includes constituent data of the encrypted content and the encryption key.

(13) The information processing device according to (12), wherein the data processing unit generates the converted encryption key by executing an arithmetic operation of exclusive OR of the encryption key and a hash value of connected data of use control information set corresponding to the encrypted content and the electronic signature.

Further, a method of processing performed in the above apparatus and system and a program to execute the processing are included in the configuration of the present disclosure.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

INDUSTRIAL APPLICABILITY

Hereinabove, according to a configuration of an embodiment of the present disclosure, a device and a method that effectively prevent unauthorized uses of content are realized as described above.

To be specific, when a decryption process of encrypted content is to be executed, a converted encryption key that is converted data of an encryption key to be applied to decryption of the encrypted content recorded in a medium is read, an arithmetic operation process for the converted encryption key is executed, and thereby an acquisition process of the encryption key is executed. The converted encryption key is a converted encryption key generated from an arithmetic operation of the encryption key and an electronic signature that is constituent data of an encrypted content signature file set corresponding to the encrypted content, and a reproduction device acquires the electronic signature that is the constituent data of the encrypted content signature file recorded in the medium, and executes the acquisition process of the encryption key by executing the arithmetic operation process to which the acquired electronic signature is applied. The electronic signature is set as an electronic signature for data that includes the constituent data of the encrypted content and the encryption key.

By setting signature data of the encrypted content signature file to be constituent data of the converted encryption key, it is possible to prevent unauthorized uses of content caused by a key replacement process, or the like.

REFERENCE SIGNS LIST 11 broadcasting station
12 content server
21 recording and reproduction dedicated device
22 PC
23 mobile terminal
31 memory card
51 protected area (Protected Area)
52 general-purpose area (General Purpose Area)
61 server A
62 server B
63 host
64 server C
65 server D
70 memory card
80 protected area (Protected Area)
81 block #0
82 block #1
90 general-purpose area (General Purpose Area)
101 license issuer
102 encrypted content signature (ECS) issuer
103 content provision device
104 user device
181 content
182 title key
183 collection of content hash lists
201 content provision device (server)
202 user device (host)
210 memory card
211 protected area (Protected Area)
212 general-purpose area (General Purpose Area)
221 block #0
701 CPU
702 ROM
703 RAM
704 bus
705 input and output interface
706 input unit
707 output unit
708 storage unit
709 communication unit
710 drive
711 removable medium
801 CPU
802 ROM
803 RAM
804 bus
805 input and output interface
806 communication unit
807 storage unit
811 protected area (Protected Area)
812 general-purpose area (General Purpose Area)

The invention claimed is:

1. An information storage device comprising:
a storage unit configured to store encrypted content and an encryption key to be applied to decrypt the encrypted content,
wherein the storage unit is further configured to store a converted encryption key generated through an arithmetic operation of the encryption key and an electronic signature, wherein the electronic signature is constituent data of an encrypted content signature file set corresponding to the encrypted content,
wherein the electronic signature is an electronic signature for constituent data of the encrypted content and the encryption key, and
wherein a reproduction device is configured to read the encrypted content from the storage unit and execute a decryption process, wherein the decryption process comprises acquisition of the encryption key through an arithmetic operation of applying the electronic signature to the converted encryption key.

2. The information storage device according to claim 1, wherein the converted encryption key is a result of an arithmetic operation of exclusive OR of the encryption key and a hash value of constituent data of use control information set corresponding to the encrypted content and the electronic signature.

3. The information storage device according to claim 1, wherein the storage unit has a protected area to which access restriction is set, and wherein the converted encryption key is configured to be stored in the protected area.

4. The information storage device according to claim 3, further comprising: a data processing unit configured to determine access feasibility to the protected area based on a certificate received from an access requesting device with respect to the protected area.

5. The information storage device according to claim 1, wherein the storage unit has a protected area to which access restriction is set and a general-purpose area to which access restriction is not set, wherein the converted encryption key is stored in the protected area, and wherein the encrypted content and the encrypted content signature file are configured to be stored in the general-purpose area.

6. The information storage device according to claim 1, wherein the electronic signature is an electronic signature for the constituent data of the encrypted content, the encryption key, and constituent data of the encrypted content signature file.

7. The information storage device according to claim 6, wherein the electronic signature is an electronic signature for information of the date of issue of the encrypted content signature file, wherein the date of issue of the encrypted content signature file is included in the constituent data of the encrypted content signature file.

8. An information processing device comprising:
a data processing unit configured to execute decryption and reproduction processes of encrypted content recorded in a medium, wherein, when a decryption process of the encrypted content is to be executed, the data processing unit reads a converted encryption key stored in the medium, executes an arithmetic operation process for the converted encryption key, and then executes an acquisition process of the encryption key, wherein the converted encryption key is converted data generated through an arithmetic operation of the encryption key and an electronic signature, wherein the electronic signature is constituent data of an encrypted content signature file set corresponding to the encrypted content, wherein the electronic signature is an electronic signature for constituent data of the encrypted content and the encryption key, and wherein the data processing unit acquires the electronic signature from the encrypted content signature file recorded in the medium, executes an arithmetic operation process to which the acquired electronic signature is applied, and then executes the acquisition process of the encryption key.

9. The information processing device according to claim 8, wherein the converted encryption key is a result of an arithmetic operation of exclusive OR of the encryption key and a hash value of constituent data of use control information set corresponding to the encrypted content and the electronic signature, wherein the data processing unit acquires the electronic signature that is the constituent data of the encrypted content signature file recorded in the medium and the use control information recorded in the medium, executes an arithmetic operation process to which the acquired data is applied, and then executes the acquisition process of the encryption key.

10. The information processing device according to claim 8, wherein the data processing unit executes a signature verification process on the electronic signature that is the constituent data of the encrypted content signature file recorded in the medium, and wherein, under a condition that the signature verification process succeeds and legitimacy of the encrypted content signature file is confirmed, the acquisition process of the encryption key is performed.

11. An information processing device comprising:
a data processing unit configured to output encrypted content recorded in a medium and a converted encryption key that is converted data of an encryption key to be applied for decryption of the encrypted content, wherein the data processing unit is further configured to generate the converted encryption key through an arithmetic operation process of the encryption key and an electronic signature, wherein the electronic signature is constituent data of an encrypted content signature file set corresponding to the encrypted content, wherein the electronic signature is an electronic signature for constituent data of the encrypted content and the encryption key.

12. The information processing device according to claim 11, wherein the data processing unit generates the converted encryption key by executing an arithmetic operation of exclusive OR of the encryption key and a hash value of constituent data of use control information set corresponding to the encrypted content and the electronic signature.

13. An information processing method executed in an information processing device, the method comprising:
a data processing step, by a data processing unit, of reading a converted encryption key that is converted data of an encryption key to be applied for decryption, executing an arithmetic operation process for the converted encryption key, and then performing an acquisition process of the encryption key when a decryption process of encrypted content recorded in a medium is to be executed, wherein the converted encryption key is a converted encryption key generated through an arithmetic operation of the encryption key and an electronic signature, wherein the electronic signature is constituent data of an encrypted content signature file set corresponding to the encrypted content, wherein the electronic signature is an electronic signature for constituent data of the encrypted content and the encryption key, and wherein, in the data processing unit step, the data processing unit is further configured to acquire the electronic signature from the encrypted content signature file recorded in the medium, executes an arithmetic operation process to which the acquired electronic signature is applied, and then executes the acquisition process of the encryption key.

14. An information processing method executed in an information processing device, the method comprising:
a data processing step, by a data processing unit, of outputting encrypted content recorded in a medium and a converted encryption key that is converted data of an encryption key to be applied to decrypt the encrypted content, wherein, in the data processing step, the converted encryption key is generated through an arithmetic operation process of the encryption key and an electronic signature, wherein the electronic signature is constituent data of an encrypted content signature file set corresponding to the encrypted content, wherein the electronic signature is an electronic signature for constituent data of the encrypted content and the encryption key.

15. A non-transitory computer-readable recording medium having a set of computer-executable instructions recorded thereon, the instructions causing an information processing device to execute information processing including:
a data processing step of reading a converted encryption key that is converted data of an encryption key to be applied for decryption and acquiring the encryption key through an arithmetic operation process for the converted encryption key when a decryption process of encrypted content recorded in a medium is to be performed, wherein the converted encryption key is a converted encryption key generated through an arithmetic operation of the encryption key and an electronic signature, wherein the electronic signature is constituent data of an encrypted content signature file set corresponding to the encrypted content, wherein the electronic signature is an electronic signature for constituent data of the encrypted content and the encryption key, and wherein, in the data processing step, an acquisition process of the electronic signature from the encrypted content signature file recorded in the medium is executed, and then an acquisition process of the encryption key through an arithmetic operation process, in which the acquired electronic signature is applied, is executed.

16. A non-transitory computer-readable recording medium having a set of computer-executable instructions recorded thereon, the instructions causing an information processing device to execute information processing including:

a data processing step of outputting encrypted content recorded in a medium and a converted encryption key that is converted data of an encryption key to be applied for decryption of the encrypted content, wherein, in the data processing step, the converted encryption key is generated through an arithmetic operation process of the encryption key and an electronic signature, wherein the electronic signature is constituent data of an encrypted content signature file set corresponding to the encrypted content, wherein the electronic signature is an electronic signature for constituent data of the encrypted content and the encryption key.

* * * * *